US012585137B2

(12) United States Patent
Eddington et al.

(10) Patent No.: US 12,585,137 B2
(45) Date of Patent: Mar. 24, 2026

(54) SHAPE MEMORY ALLOY ACTUATOR ASSEMBLY

(71) Applicant: CAMBRIDGE MECHATRONICS LIMITED, Cambridge (GB)

(72) Inventors: Robin Eddington, Cambridge (GB); Kiran Auchoybur, Cambridge (GB); Valerio Polenta, Cambridge (GB); Konstantinos Pantelidis, Cambridge (GB); Jae Hee Kim Kang, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 416 days.

(21) Appl. No.: 17/611,642

(22) PCT Filed: May 18, 2020

(86) PCT No.: PCT/IB2020/000452
§ 371 (c)(1),
(2) Date: Nov. 16, 2021

(87) PCT Pub. No.: WO2020/234654
PCT Pub. Date: Nov. 26, 2020

(65) Prior Publication Data
US 2022/0236583 A1      Jul. 28, 2022

(30) Foreign Application Priority Data

May 17, 2019    (GB) ...................................... 1907018
Jul. 16, 2019    (GB) ...................................... 1910204

(51) Int. Cl.
*G02B 27/64*      (2006.01)
*H04N 23/68*      (2023.01)

(52) U.S. Cl.
CPC ......... *G02B 27/646* (2013.01); *H04N 23/685* (2023.01); *G03B 2205/0076* (2013.01)

(58) Field of Classification Search
CPC ...... F03G 7/065; F03G 7/0614; F16F 15/005; F16F 15/06; F16M 11/045; F16M 11/18;
(Continued)

(56) References Cited

U.S. PATENT DOCUMENTS 8,350,959 B2 * 1/2013 Topliss ................... G03B 13/34
396/73
8,866,918 B2 * 10/2014 Gregory ............. H04N 23/6812
348/208.99
(Continued)

FOREIGN PATENT DOCUMENTS

CN      101846785 A     9/2010
CN      101876742        11/2010
(Continued)

OTHER PUBLICATIONS

GB Search Report and Examination Report dated Jan. 17, 2020 of GB Application 1910204.5.
(Continued)

*Primary Examiner* — Padma Haliyur
(74) *Attorney, Agent, or Firm* — Van Hoven PC; Stefan D. Osterbur; Joshua Van Hoven

(57) ABSTRACT

An actuator assembly (140) comprises first and second parts. A first axis (Z) is defined with reference to the second part. The actuator assembly (140) comprises shape-memory alloy wire (80) connected between the first and second parts for moving the first part relative to the second part in any of a set of directions that are at least partly perpendicular to the first axis (Z). The set of directions includes first and second directions. The actuator assembly (140) comprises a set of arms (170), each of which is connected between the first and
(Continued)

second parts and extends partly around the first axis (Z). The set of arms (170) is configured to provide a biasing force that biases the first part towards a first position relative to the second part. The set of arms (170) has a first stiffness when the first part is moved away from the first position in the first direction and a second, lower stiffness when the first part is moved away from the first position in the second direction. At least one of the set of arms (170) comprises a portion (100) that is configured to decrease the first stiffness by a larger relative amount than the portion (100) decreases the second stiffness.

8 Claims, 34 Drawing Sheets

(58) Field of Classification Search
      CPC ...... F16M 13/022; H04N 23/54; H04N 23/55;
                  H04N 23/6812; H04N 23/687; G03B
                  3/10; G03B 13/36; G03B 5/00; G02B
                  7/023; G02B 7/09; H02N 10/00
      See application file for complete search history.

(56) References Cited

U.S. PATENT DOCUMENTS

| | | | | |
|---|---|---|---|---|
| 11,199,182 | B2* | 12/2021 | Miller ................... | F16M 11/048 |
| 2007/0280668 | A1 | 12/2007 | Kubo et al. | |
| 2009/0295986 | A1* | 12/2009 | Topliss ................... | G02B 7/026 |
| | | | | 396/73 |
| 2010/0074608 | A1* | 3/2010 | Topliss ..................... | G03B 3/10 |
| | | | | 60/528 |
| 2011/0063495 | A1 | 3/2011 | Tseng et al. | |
| 2011/0103784 | A1 | 5/2011 | Hashizume et al. | |
| 2012/0019675 | A1* | 1/2012 | Brown ................. | H04N 23/687 |
| | | | | 348/E5.045 |
| 2015/0135703 | A1* | 5/2015 | Eddington ........... | G02B 27/646 |
| | | | | 60/528 |
| 2015/0346507 | A1* | 12/2015 | Howarth ................... | F03G 7/06 |
| | | | | 60/527 |
| 2016/0258425 | A1* | 9/2016 | Ladwig ................. | F03G 7/0614 |
| 2016/0259177 | A1 | 9/2016 | Ladwig et al. | |
| 2017/0219842 | A1* | 8/2017 | Howarth .............. | G02B 27/646 |
| 2018/0074415 | A1 | 3/2018 | Wu et al. | |
| 2018/0348593 | A1* | 12/2018 | Brown ...................... | G03B 3/10 |
| 2019/0136839 | A1* | 5/2019 | Miller ...................... | F03G 7/06 |
| 2020/0310081 | A1* | 10/2020 | Chen ........................ | G03B 3/10 |
| 2023/0176458 | A1* | 6/2023 | Ruzicka ................ | F03G 7/0665 |
| | | | | 60/527 |

FOREIGN PATENT DOCUMENTS

| | | | |
|---|---|---|---|
| CN | 102023364 A | 4/2011 | |
| CN | 109495679 A | 3/2019 | |
| CN | 109975972 A | 7/2019 | |
| CN | 110031947 A | 7/2019 | |
| CN | 209102989 U | 7/2019 | |
| CN | 209231678 U | 8/2019 | |
| CN | 112292528 A | 1/2021 | |
| CN | 113272702 A | 8/2021 | |
| EP | 2372428 | 10/2011 | |
| JP | 2005114776 A | 4/2005 | |
| KR | 20160141399 | 12/2016 | |
| KR | 20190114588 A | 10/2019 | |
| WO | WO 2013175197 | 11/2013 | |
| WO | WO 2014083318 | 6/2014 | |
| WO | 2016/009200 A1 | 1/2016 | |
| WO | WO-2017098249 A1 * | 6/2017 | ........... G02B 27/646 |
| WO | 2018/112436 A1 | 6/2018 | |
| WO | WO 2018204888 | 11/2018 | |

OTHER PUBLICATIONS

GB Search Report dated Nov. 19, 2019 of GB Application 1907018.4.

International Search Report and Written Opinion of PCT/IB2020/000452 dated Nov. 11, 2020.

Office action of CN Application 202080090791.5 dated Jan. 24, 2025 (20 Pages) (Translation).

* cited by examiner

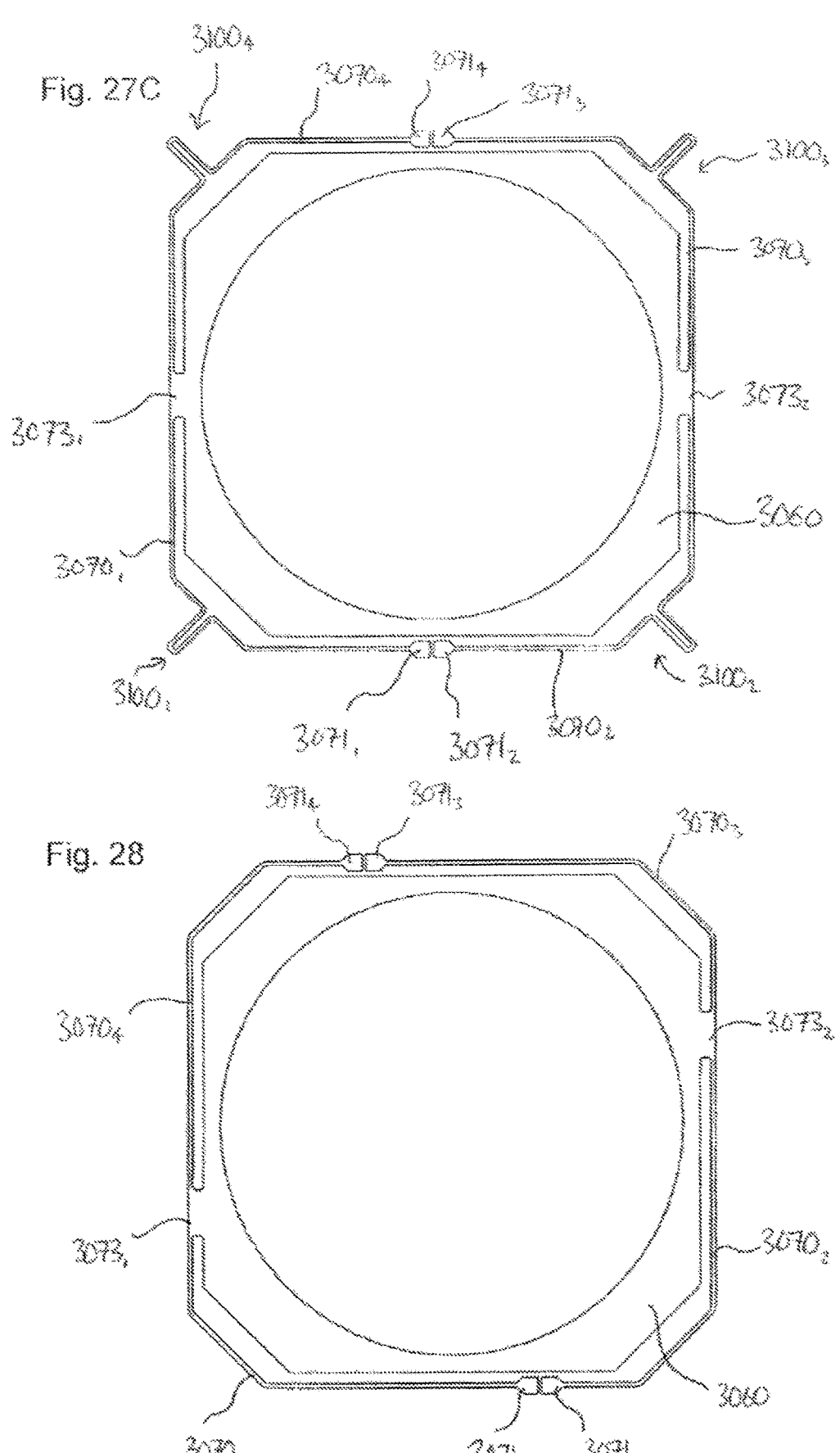

SHAPE MEMORY ALLOY ACTUATOR ASSEMBLY

CROSS-REFERENCE TO RELATED APPLICATIONS

This application is a national stage application under 35 U.S.C. § 371 of International Application PCT/IB2020/000452, filed May 18, 2020, which claims priority of GB Patent Applications 1907018.4, filed May 17, 2019, and 1910204.5, filed Jul. 16, 2019. The disclosure of which are hereby incorporated by reference herein in their entireties.

FIELD

The present application relates to an actuator assembly, particularly an actuator assembly comprising a plurality of lengths of shape-memory alloy (SMA) wire.

BACKGROUND

Such an actuator assembly may be used, for example, in a camera to move a lens assembly in directions perpendicular to the optical axis so as to provide optical image stabilization (OIS). Where such a camera is to be incorporated into a portable electronic device such as a mobile telephone, miniaturization can be important.

WO 2019/086855 A1 describes a camera with an actuator assembly including a support platform, a moving platform that supports a lens assembly, SMA wires connected to the support platform and the moving platform, and bearings to bear the moving platform on the support platform. This actuator assembly also includes two arms extending between the support platform and the moving platform. The arms provide, amongst other things, a lateral biasing force that biases the lens assembly towards a central position.

SUMMARY

First Aspect

According to a first aspect of the present invention, there is provided an actuator assembly comprising:

first and second parts, wherein a first axis is defined with reference to the second part;

shape-memory alloy wire connected between the first and second parts for moving the first part relative to the second part in any of a set of directions that are at least partly perpendicular to the first axis, wherein the set of directions includes first and second directions;

a set of arms, each of which is connected between the first and second parts and extends partly around the first axis, the set of arms configured to provide a biasing force that biases the first part towards a first position relative to the second part;

wherein the set of arms has a first stiffness when the first part is moved away from the first position in the first direction and a second, lower stiffness when the first part is moved away from the first position in the second direction; and wherein at least one of the set of arms comprises a portion that is configured to decrease the first stiffness by a larger relative amount than the portion decreases the second stiffness.

Thus, the arms can provide a more symmetric (centring) biasing force, which, in turn, can enable the actuator assembly to be controlled more effectively, etc.

The 'first part' may also be referred to as a movable part and the second part may also be referred to as a static part. Additionally, each of the 'arms' which provide a bias force may also be referred to as a flexure.

Further (optional) features are specified in the dependent claims.

For instance, the portion may correspond to at least one hairpin-shaped portion of the arm. For ease of reference, such a portion is hereinafter sometimes referred to as a kink and such an arm as a kinked arm.

The above-described decreases in the first and second stiffness are compared, for example, to an equivalent arm without the portion (e.g. an arm that does not have a hairpin-shaped portion but is merely straight in the corresponding segment of the arm). The portion need not decrease the second stiffness.

Second and Third Aspects

According to a second aspect of the present invention there is provided an actuator assembly comprising:

a static part on which a static crimp portion is mounted;

a movable part comprising a crimp support portion on which a moving crimp portion is mounted;

shape memory alloy wire connected between the static part and the moving part by being crimped by the static crimp portion and the moving crimp portion and arranged to drive relative movement of the movable part with respect to the static part in directions in a movement plane perpendicular to a primary axis; and a bearing arrangement arranged to guide the relative movement of the movable part relative to the static part in directions in the movement plane and to resist relative movement of the movable part relative to the static part along the primary axis, the bearing arrangement comprising a flexure connected between the static part and moveable part, the flexure extending around the primary axis, wherein the flexure is arranged such that it overlaps the crimp support portion as viewed along the primary axis.

Thus, in accordance with this second aspect of the invention, it is possible to include flexures which are arranged to overlap the crimp support portion and thus this arrangement may advantageously avoid increasing the footprint of the actuator assembly. In certain instances this may permit the inclusion of additional flexures on the actuator assembly which may have otherwise been avoided due to space constraints. This overlapping arrangement may be contrasted to an arrangement whereby the flexure is routed around the crimp support portion, which may increase the footprint of the actuator assembly. Keeping the footprint of the actuator assembly to a minimum is particularly important as such actuator assemblies are increasingly used in applications where the available space is limited. In accordance with this second aspect of the invention, the overlapping of the flexures with the moving crimp corners may allow an arrangement of flexures which provides a more uniform symmetry of stiffness in the movement plane.

In a set of embodiments the movable part further comprises a main body to which the crimp support portion is connected. In a further set of embodiments the crimp support portion is a separate portion from the main body. Equally, the crimp support portion may be integrally provided with the main body of the movable part. The main body of the movable support may have any suitable form. In a set of embodiments, the main body is formed as a sheet of material.

In prior art actuator assemblies, for example of the type seen in WO-2019/086855, the flexures typically extend around the corners which comprise static crimp portions and they simply avoid passing the corners with the moving crimp portions completely. As a result, this may limit the ability for such prior art actuator assemblies to achieve an arrangement of flexures which provides a more uniform stiffness in multiple directions in the movement plane.

In a set of embodiments, the flexure is separated from the crimp support portion. Arranging the flexure such that it is separated from the crimp support portion may advantageously help to avoid a short circuit forming between the flexure and the crimp support portion, one or both of which may be an electrically live component.

Of course the actuator assembly may comprise further flexures which don't overlap the crimp support portion.

It is often desirable to keep the depth of the actuator assembly in the primary axis to a minimum, due to the space constrains of the devices in which the actuator assemblies are typically used. A number of different means for separating the flexure and the crimp support portion whilst at the same time keeping the depth of the actuator assembly as small as possible are possible.

In a set of embodiments, the flexure comprises a first thinned section, having a reduced depth along the primary axis, that provides the separation between the flexure and the crimp support portion. A flexure which has a thinned section, which extends partially along its length, may be sufficient to provide the desired separation, whilst at the same time not impacting too significantly how the flexure responds to deformation. As will be appreciated by those skilled in the art, thinning the entire flexure in order to achieve the desired separation may necessitate a change in the material of the flexure in order to provide the desired characteristics, which may be not feasible. Therefore by only thinning a section of the flexure this may be avoided.

In a set of embodiments, the crimp support portion comprises a second thinned section, having a reduced depth along the primary axis, that provides the separation between the flexure and the crimp support portion. As with the flexure discussed above, it may not be desirable to thin the entire crimp support portion as it may no longer be capable of providing its supporting function, yet thinning a section of it may be sufficient to provide the separation.

The first thinned section or second thinned section may be created by any suitable means, for example etching.

In a set of embodiments, the crimp support portion comprises a cut-out section (i.e. a section in which the entire thickness is removed) that provides the separation between the flexure and the crimp support portion.

In a set of embodiments, the crimp support portion comprises a shoulder portion extending from a main body of the movable part along the primary axis which offsets the moving crimp portion along the primary axis to provide the separation between the flexure and the crimp support portion. This may provide a simple arrangement for forming the separation which does not require any thinning of sections of the flexure or crimp support portion.

In a set of embodiments the crimp support portion is connected to an upper or lower surface of a main body of the movable part to provide the separation between the flexure and the crimp support portion. As will be appreciated by those skilled in the art, arranging the crimp support portion in this manner effectively displaces the crimp support portion along the primary axis, when compared to an example whereby the crimp support portion extends directly from a main body of the movable part. This displacement may thus provide the separation. This particular arrangement, again, may be a relatively simple means for achieving the separation, but may impact the depth of the actuator assembly.

In another set of embodiments at least a portion of the flexure is arched to provide the separation between the flexure and the crimp support portion. Such an arching of the flexure to provide the separation may be easy to achieve during manufacture of the assembly. Arching the flexure to provide the separation may further be advantageous as it may provide a secondary function of preloading the flexure in the primary axis such that when arranged appropriately within the assembly, e.g. through connection between the moving part and static part, the arched flexure may resist movement of the movable part away from the static part along the primary axis. However, arching the flexure in this manner may increase the depth of the assembly along the primary axis which may be less desirable in some instances. The portion of the flexure may be arched such that it extends above or below the crimp support portion.

A set of embodiments may comprise at least one further flexure arranged such that it does not overlap the crimp support portion as viewed along the primary axis. In this set of embodiments, only the at least one further flexure may be preloaded so as to resist movement of the movable part away from the static part along the primary axis. This may help in providing the separation between the flexure and the crimp support portion (and/or not unduly increasing the depth of the assembly along the primary axis).

Of course, any of the embodiments described above in relation to providing the separation may be combined such that the assembly comprises any combination of different means for achieving the separation. For example the assembly may comprise a combination of a first thinned section on the flexure and a second thinned section on the crimp support portion. The specific means and its extent, e.g. the depth of the respective thinned sections, may be determined by the level of separation that is required. For example, in instances where a large separation is essential, it may be necessary, for example, to provide thinned sections on both the flexure and crimp support portion.

The prevention of a short circuit may also be achieved by alternative means. In a set of embodiments, an electrical insulation layer is arranged between the crimp support portion and the flexure. Depending on the particular properties of the electrical insulation layer, the inclusion of the electrical insulation layer without the separation discussed above may be sufficient to prevent to formation of a short circuit. However, this may not always be the case and the electrical insulation layer may be advantageously combined with the separation of the flexure and crimp support component to further reduce the risk of a short circuit occurring.

The electrical insulation layer may be arranged in any suitable position such that it provides an insulation layer between the flexure and the crimp support portion. In a set of embodiments the electrical insulation layer is arranged on a surface of the flexure which faces the crimp support portion. In a set of embodiments, the electrical insulation layer is arranged on a surface of the crimp support portion which faces the flexure. The position of the insulation layer may depend on the particular configuration of the flexure and the crimp support structure. For example, if the flexure passes above the crimp support structure, a surface of the crimp support structure and/or a surface of the flexure may be provided with the electrical insulation layer.

The electrical insulation layer may be formed as a coating on the flexure and/or the crimp support portion. The electrical insulation layer may be made from any material which provides appropriate insulation properties. The electrical insulation layer may comprise a ceramic layer. The ceramic layer may, for example, comprise at least one of: titanium carbide, silicon dioxide, diamond-like carbon (DLC), tungsten carbide/carbon (WC/C).

In a set of embodiments the moveable part comprises a further crimp support portion on which a further moving crimp portion is mounted, and wherein the bearing arrangement comprises a further flexure connected between the static part and movable part, wherein the further flexure extends around the primary axis, and wherein the further flexure is arranged such that it overlaps the further crimp support portion as viewed along the primary axis. The further crimp support portion and further flexure may comprise any of the features described above with respect to the crimp support portion and the flexure.

The static part may comprise a static crimp support portion on which the static crimp portion is mounted.

In another set of embodiments, the actuator assembly comprises an additional flexure connected between the static and movable part. In embodiments which comprise at least three flexures, it is possible to arrange the at least three flexures such that the symmetry of the stiffness of the movable part in numerous orthogonal axes in the movement plane can be significantly improved.

In fact, the inclusion of three flexures which improves the symmetry in this manner is novel and inventive in its own right and thus when viewed from a third aspect of the present invention there is provided an actuator assembly comprising:

a static part;

a movable part;

at least one shape memory alloy wire connected between the static part and the moving part and arranged to drive relative movement of the movable part with respect to the static part in directions in a movement plane perpendicular to a primary axis; and a bearing arrangement arranged to guide the relative movement of the movable part relative to the static part in directions in the movement plane and to resist relative movement of the movable part relative to the static part along the primary axis, the bearing arrangement comprising at least three flexures connected between the static part and moveable part, each of the at least three flexures extending around the primary axis, wherein, for every pair of first and second orthogonal axes in the movement plane, defining a first stiffness as the combined lateral stiffness of the at least three flexures along the first axis and a second stiffness as the combined lateral stiffness of the at least three flexures along the second axis, the maximum ratio of the first and second stiffnesses is no more than 5.

As will readily be understood by those skilled in the art, for any set of two stiffness values which are not equal, there will be two ratios, one of which is greater than the other. It is this greater ratio, which will inherently form the maximum ratio, which much satisfy the ratio quoted above in relation to this third aspect of the invention.

Through the inclusion of at least three flexures extending around the primary axis appropriately positioned to provide a maximum stiffness ratio above, it will be appreciated that the stiffness along any pair of orthogonal axes will be significantly more symmetric, at least when compared to prior art actuator assemblies which comprise only two flexures, for example of the type described in WO-2019/086855.

Having an actuator assembly wherein the stiffness of the movable part in any pair of orthogonal axes is more symmetrical, to the degree referred, to above is advantageous as it may allow for simpler and more accurate control of the movable part. As will be appreciated, when compared to prior art assemblies in which the stiffness along a first axis may be, for example, ten times larger than the stiffness along its orthogonal axis, by minimising the difference in stiffness along each pair of orthogonal axes, the control algorithms which act to control the movable part may be less complicated. This improved symmetry may therefore mean that it is possible to achieve more accurate control of the shape memory alloy wire and thus more accurate control of the position of the movable part.

In a set of embodiments, the at least three flexures comprise a total of three flexures.

It may be possible to obtain further control over the symmetry of the stiffness of the movable part through the inclusion of further flexures. Therefore, in a set of embodiments, the at least three flexures comprise a total of four flexures connected between the static part and movable part. The use of four flexures extending around the primary axis in accordance with the third aspect of the present invention provides a further improvement in the symmetry of the stiffness of any pair of two orthogonal axes.

The at least four flexures may be arranged around the primary axis in any suitable manner. In a set of embodiments, however, the at least four flexures are arranged to have four-fold rotational symmetry about the primary axis. Such an arrangement may achieve the ratio quoted above. In another set of embodiments, the at least four flexures are arranged to have at least two-fold mirror symmetry around the primary axis. Similarly, such an arrangement of flexures may achieve the ratio quoted above. Of course there may be a large number of different arrangements of the at least four flexures which achieves the above quoted ratio and these are merely two examples.

In a set of embodiments at least two of the at least three flexures share a common connection point to the static or movable parts.

As will be appreciated by those skilled in the art, the stiffness along any axes will be the combined stiffness of each of the at least three flexures, as all of the at least three flexures will deform to some level in order to permit the movement along any axis.

In the second or third aspect of the present invention, the flexure or at least one of the flexures may be an arm configured in accordance with the first aspect of the present invention, for example by comprising at least one hairpin-shaped portion such that the arm is a kinked arm.

In a set of embodiments the static part comprises a static crimp portion and the moving part comprises a moving crimp portion, and wherein a shape memory alloy wire is connected between the one static crimp portion and the moving crimp portion. As will be appreciated by those skilled in the art, the inclusion of a shape memory alloy wire connected in this manner will provide a means for driving movement of the movable part.

In any of the aspects of the present invention, the movable part may be a lens assembly comprising at least one lens having an optical axis, the optical axis being the primary axis. In a further set of embodiments, the actuator assembly further comprises an image sensor arranged to capture an image focused by the lens assembly. In such a case, the actuator assembly may be used, for example, to perform optical image stabilisation.

Whilst the maximum ratio of the first and second stiffnesses, in relation to the third aspect is described above as no more than 5, depending on the particular application this may differ. For example, the maximum ratio of the first and second stiffnesses may instead be 3, 2, 1.5, 1.25 or ~1.

Features of the second and/or third aspects of the present invention of the present invention may be combined with features of the first, second and/or third aspects of the present invention Fourth Aspect According to a fourth aspect of the present invention there is provided an actuator assembly suitable for connection to a further actuator assembly, the further actuator configured to actuate in directions parallel to a primary axis, the actuator assembly comprising:

a static part;

a movable part;

at least two lengths of shape memory alloy (SMA) wire connected between the static part and the movable part and configured to drive movement of the movable part with respect to the static part in directions in a movement plane perpendicular to the primary axis; and one or more flexible elements connecting the static part and the movable part;

wherein the static part, the one or more flexible elements and the movable part comprise one or more current paths electrically connectable to the further actuator assembly via the movable part.

The flexible elements may be a flexure arm connecting the static part and the movable part.

At least one of the flexible elements may provide a biasing force that biases the movable part and the static part towards each other.

At least one of the flexible elements may form part of a bearing arrangement configured to guide relative movement of the movable part relative to the static part in directions in the movement plane, and to resist movement of the movable part relative to the static part in directions parallel to the primary axis.

At least one of the flexible elements may be formed integrally with one of the static part and the movable part and may be mechanically and electrically connected to the other one of the static part and the moveable part.

The one or more current paths may comprise two current paths, three current paths or four current paths.

At least one of the current paths may be electrically connected to at least one of the lengths of SMA wire via the movable part.

The static part, the at least one flexible element and the movable part may comprise one or more further current paths electrically connected to at least one of the lengths of SMA wire.

The flexible elements may comprise one flexible element for each one of the current path(s) and the further current path(s).

The movable part may comprise one or more first conductive elements and the static part may comprise one or more second conductive elements, with one first conductive element and one second conductive element for each one of the current paths and the further current paths.

Each of the first conductive elements may have a terminal for connecting to the further actuator and/or each of the second conductive elements may have a terminal for connecting to external electronic circuitry.

Each of the first conductive elements may comprise one or more generally planar portions of the moving part.

The generally planar portions may be arranged in two or more layers and the portions in the same layer may be physically separated from one another and certain portions in different layers may be electrically interconnected.

The adjacent ones of the layers may be physically interconnected via a generally insulating layer so as to form an integral structure.

The actuator assembly may comprise one or more connectors, each of the connectors for electrically and physically interconnecting adjacent ones of the layers.

The generally planar portions may comprise at least one portion with an integral connecting portion for connecting to at least one of the lengths of SMA wire.

The generally planar portions may comprise at least one portion that is integral with at least one of the flexible elements.

One of the layers may be connected to the SMA wires and another one of the layers may be connected to the flexible elements.

The movable part and the static part of the actuator assembly may comprise patterned metallic sheets.

The one or more flexible elements may comprise:

four flexures that extend in an arc around the primary axis without an outer perimeter of the static part and/or the movable part; and one flexure that extends in an arc around the primary axis within an inner perimeter of the static part and/or the movable part.

The four flexures may substantially wrap around the outer perimeter of the static part and/or the movable part. The one flexure may substantially wrap around the inner perimeter of the static part and/or the movable part.

One or more of the current paths and/or the further current paths may comprise electrically conductive tracks.

There may be provided an apparatus comprising:

the actuator assembly; and the further actuator assembly, wherein the further actuator assembly is connected to the movable part so as to move with the movable part in the directions in the movement plane.

The further actuator assembly may comprise a further static part and a further movable part movable in the directions parallel to the primary axis relative to the further static part, and the further static part may be mechanically and electrically connected to the movable part.

Features of the fourth aspect of the present invention may be combined with features of the first, second and/or third aspects of the present invention. For instance, the flexures arms of the fourth aspect may have a 'kink' as in the first aspect and/or may be arranged as specified in the second and/or third aspects.

BRIEF DESCRIPTION OF THE DRAWINGS

Certain embodiments of the present invention will now be described, by way of example only, with reference to the accompanying drawings, in which:

FIGS. 27A-C show three different embodiments of a movable part with four flexures;

FIG. 28 shows another embodiment of a movable part with four flexures;

DETAILED DESCRIPTION

Camera

Figure 1:
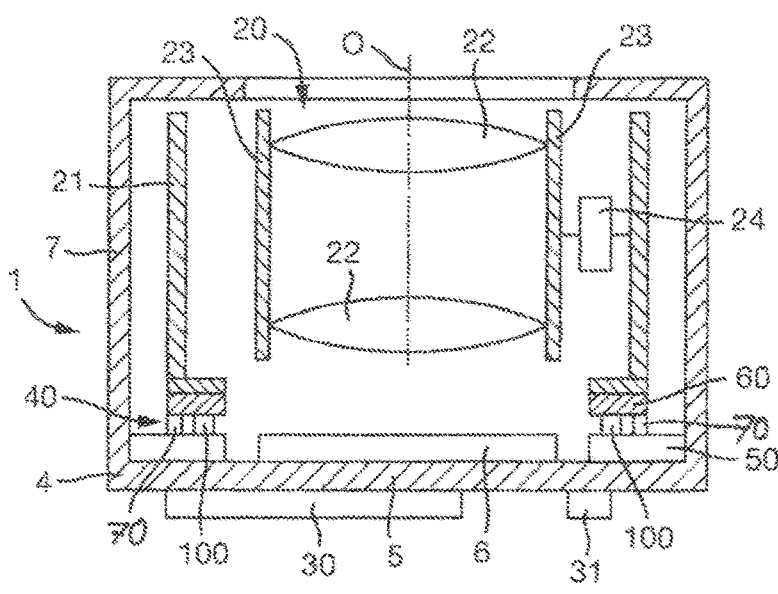
FIG. 1 illustrates a schematic cross-sectional view of a camera incorporating a known SMA actuator assembly.

Referring to FIG. 1, a camera 1 incorporating a known SMA actuator assembly 40 will now be described.

The camera 1 includes a lens assembly 20 suspended on a support structure 4 by an SMA actuator assembly 40 that supports the lens assembly 20 in a manner allowing movement of the lens assembly 20 relative to the support structure 4 in directions perpendicular to the optical axis O.

The support structure 4 includes a base 5. An image sensor 6 is mounted on a front side of the base 5. On a rear side of the base 5, there is mounted an integrated circuit (IC) 30 in which a control circuit is implemented, and also a gyroscope sensor 31. The support structure 4 also includes a can 7 which protrudes forwardly from the base 5 to encase and protect the other components of the camera 1.

The lens assembly 20 includes a lens carriage 21 in the form of a cylindrical body supporting two lenses 22 arranged along the optical axis O. In general, any number of one or more lenses 22 may be included. Preferably, each lens 22 has a diameter of up to about 20 mm. The camera 1 can therefore be referred to as a miniature camera.

The lens assembly 20 is arranged to focus an image onto the image sensor 6. The image sensor 6 captures the image and may be of any suitable type, for example a charge-coupled device (CCD) or a complementary metal-oxide-semiconductor (CMOS) device.

In this example, the lenses 22 are supported on the lens carriage 21 such that the lenses 22 are movable along the optical axis O relative to the lens carriage 21, for example to provide focusing or zoom. In particular, the lenses 22 are fixed to a lens holder 23 which is movable along the optical axis O relative to the lens carriage 21. Although all the lenses 22 are fixed to the lens holder 23 in this example, in general one or more of the lenses 22 may be fixed to the lens carriage 21 and so not movable along the optical axis O relative to the lens carriage 21, leaving at least one of the lenses 22 fixed to the lens holder 23.

An axial actuator arrangement 24 provided between the lens carriage 21 and the lens holder 23 is arranged to drive movement of the lens holder 21 and the lenses 22 along the optical axis O relative to the lens carriage 21. The axial actuator arrangement 24 may be of any suitable type, for example a voice coil motor (VCM) or an arrangement of SMA wires.

In operation, the lens assembly 20 is moved orthogonally to the optical axis O, relative to the image sensor 6, with the effect that the image on the image sensor 6 is moved. This is used to provide OIS, compensating for image movement of the camera 1, which may be caused by hand shake etc.

Actuator Assembly

Referring in particular to FIGS. 2 to 6 the actuator assembly 40 will now be described in more detail.

Figure 2A:
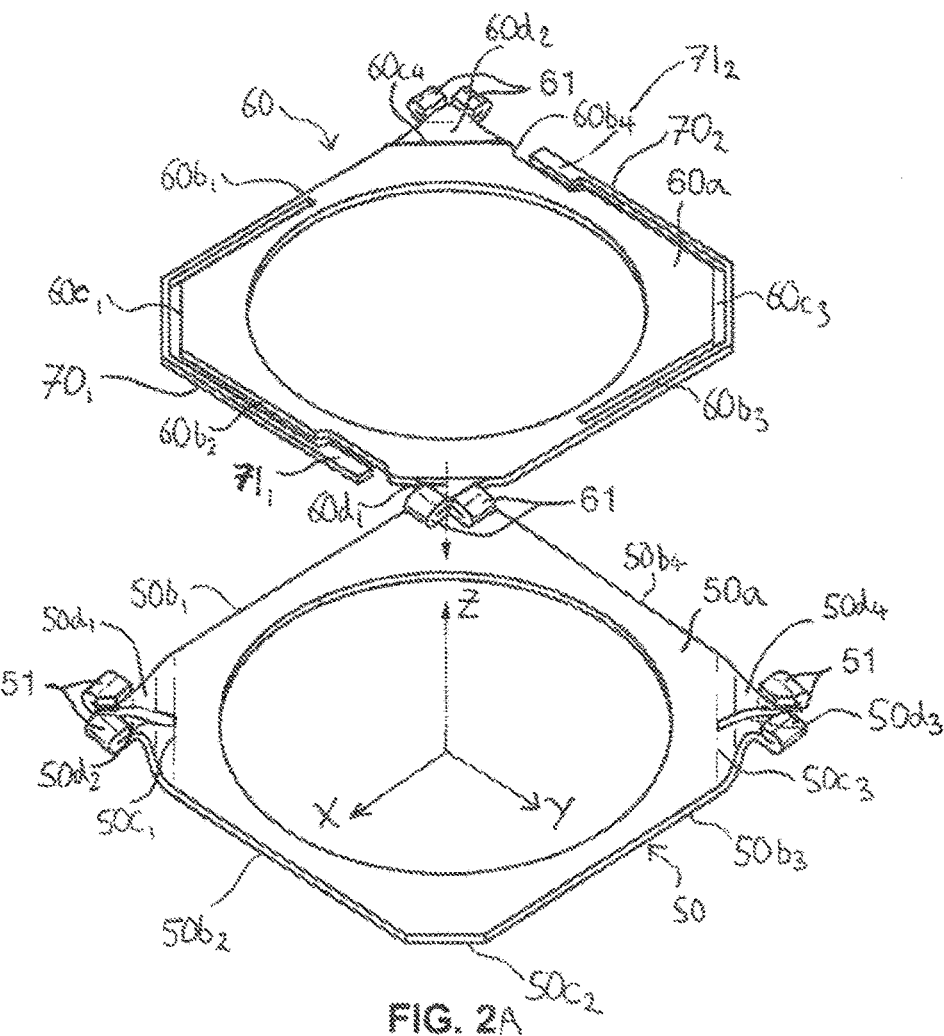
FIG. 2 illustrates an exploded perspective view of the SMA actuator assembly of FIG. 1 (A) in a simplified, schematic form and (B) in more detail.

The actuator assembly 40 includes a sub-assembly 50 (hereinafter referred to as a 'support platform') and a further sub-assembly 60 (hereinafter referred to as a 'moving platform') (see in particular FIG. 2A). The moving platform 60 supports the lens assembly 20 and is connected to the lens carriage 21.

Figure 2B:
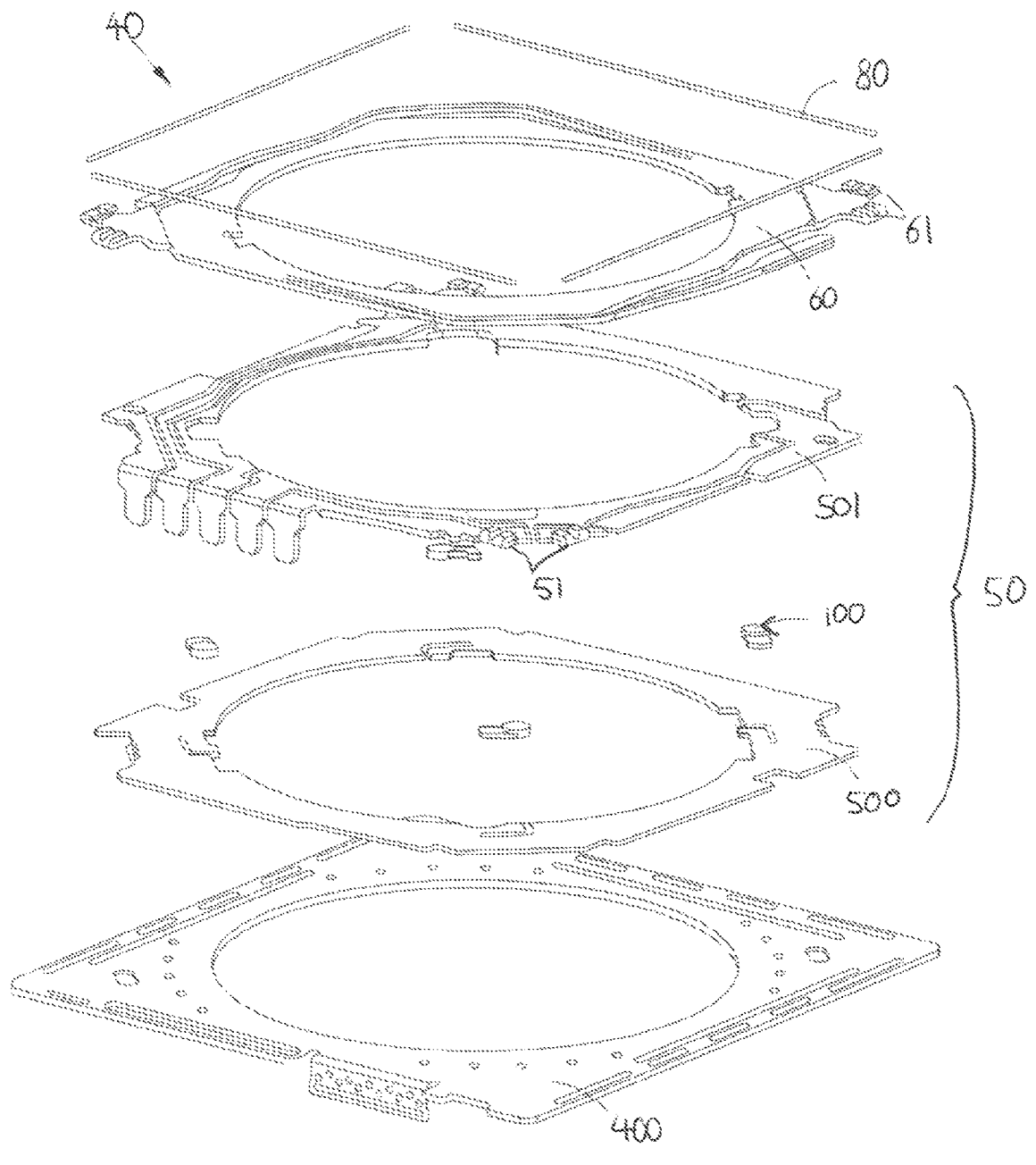
Figure 3:
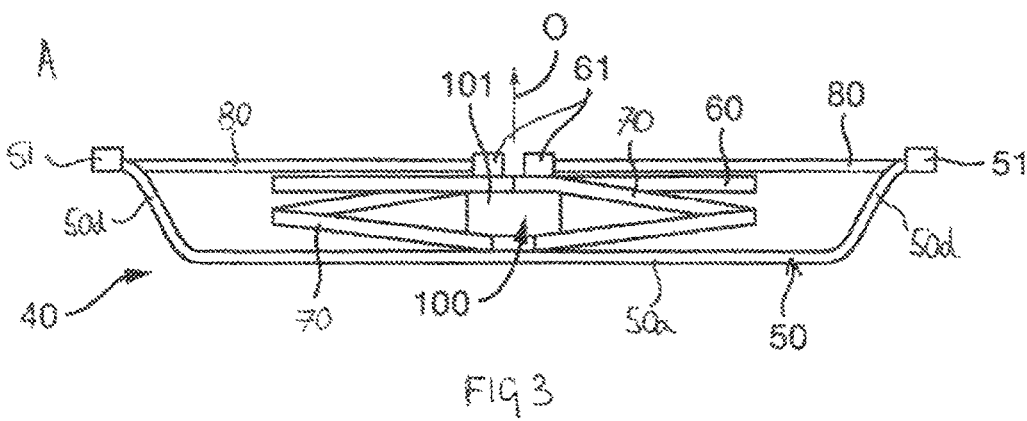
FIG. 3 illustrates a side view of the SMA actuator assembly of FIG. 1 expanded along an optical axis O.

In this example, the sub-assembly referred to as the support platform 50 is formed from two separate components, namely a support component 500 and a conductive component 501, which are affixed to each another (see in particular FIG. 2B). The actuator assembly 40 has an additional component, namely a base component 400, which is affixed to the support platform 50, and to the base 5 of the camera 1. As will be appreciated, other examples may have other configurations. Further details are provided in WO 2017/055788 A1 and WO 2019/086855 A1, which are incorporated herein by this reference.

The support platform 50, the moving platform 60 and the base component 400 are each provided with a central aperture aligned with the optical axis O allowing the passage of light from the lens assembly 20 to the image sensor 6.

Movement of the moving platform 60 (and hence the lens assembly 20) relative to the support platform 50 is driven by a lateral actuation arrangement comprising four SMA wires 80. The support platform 50 is formed with crimps 51 (hereinafter referred to as 'static crimps') and the moving platform 60 is formed with crimps 61 (hereinafter referred to as 'moving crimps'). The crimps 51, 61 crimp the four SMA wires 80 so as to connect them to the support platform 50 and the moving platform 60. The SMA wires 80 may be perpendicular to the optical axis O or inclined at a small angle to the plane perpendicular to the optical axis O.

In operation, the SMA wires 80 are selectively driven to move the moving platform 60 relative to the support platform 50 in any lateral direction (i.e. direction perpendicular to the optical axis O), as will now be explained.

Further details are also provided in WO 2013/175197 A1, which is incorporated herein by this reference.

The SMA wires 80 have an arrangement in a loop at different angular positions around the optical axis O to provide two pairs of opposed SMA wires 80 that are perpendicular to each other. Thus, each pair of opposed SMA wires 80 is capable on selective driving to move the lens assembly 20 in one of two perpendicular directions orthogonal to the optical axis O. As a result, the SMA wires 80 are capable of being selectively driven to move the lens assembly 20 relative to the support structure 4 to any position in a range of movement in two directions orthogonal to the optical axis O. The magnitude of the range of movement depends on the geometry and the range of contraction of the SMA wires 80 within their normal operating parameters.

The position of the lens assembly 20 relative to the support structure 4 perpendicular to the optical axis O is controlled by selectively varying the temperature of the SMA wires 80. This is achieved by passing through SMA wires 80 selective drive signals that provide resistive heating. Heating is provided directly by the drive current. Cooling is provided by reducing or ceasing the drive current to allow the SMA wire 80 to cool by conduction, convection and radiation to its surroundings.

On heating of one of the SMA wires 80, the stress in the SMA wire 80 increases and it contracts, causing movement of the lens assembly 20. A range of movement occurs as the temperature of the SMA increases over the range of temperature in which there occurs the transition of the SMA material from the Martensite phase to the Austenite phase. Conversely, on cooling of one of the SMA wires 80 so that the stress in the SMA wire 80 decreases, it expands under the force from opposing ones of the SMA wires 80. This allows the lens assembly 20 to move in the opposite direction.

The SMA wires 80 may be made of any suitable SMA material, for example Nitinol or another titanium-alloy SMA material.

The drive signals for the SMA wires 80 are generated and supplied by the control circuit implemented in the IC 30. The drive signals are generated by the control circuit in response to output signals of the gyroscope sensor 31 so as to drive movement of the lens assembly 20 to stabilise an image focused by the lens assembly 20 on the image sensor 6, thereby providing OIS. The drive signals may be generated using a resistance feedback control technique for example as described in WO 2014/076463 A1, which is incorporated herein by this reference.

In addition, the actuator assembly 40 includes four plain bearings 100 spaced around the optical axis O to bear the moving platform 60 on the support platform 50. In general, a different number of bearings 100 may be used. Preferably, at least three bearings 100 are used in order to assist in providing stable support.

Figure 4:
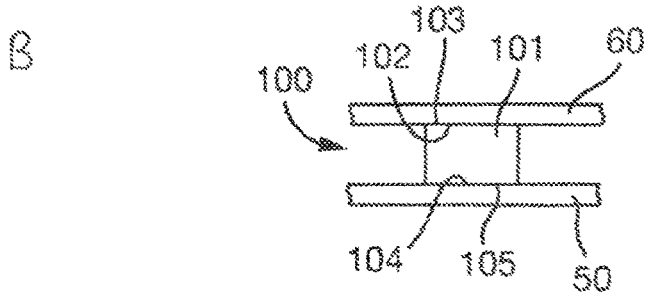
FIG. 4 illustrates a cross-sectional view of a plain bearing of the SMA actuator assembly of FIG. 1.

Referring in particular to FIG. 4, each plain bearing 100 includes a bearing member 101. The bearing member 101 may be fixed to the support platform 50, for example by adhesive. In this case, a surface 102 of the bearing member 101 on the opposite side from the support platform 50 and a surface 103 of the moving platform 60 are planar, conforming surfaces which contact one another. Alternatively, the bearing member 101 may be fixed to the moving platform 60, for example by adhesive. In this case, a surface 104 of the bearing member 101 on the opposite side from the moving platform 60 and a surface 105 of the support platform 50 are planar, conforming surfaces which contact one another.

Thus, the contact between the conforming surfaces 102 and 103 or between the conforming surfaces 104 and 105 supports and bears the moving platform 60 on the support platform 50, allowing relative motion parallel to their extent, i.e. perpendicular to the optical axis O.

The bearing 100 may be made from a suitable metal or alloy such as phosphor bronze.

The actuator assembly 40 also includes two arms 70 connected between the support platform 50 and the moving platform 60. The arms 70 are resilient and are configured to provide a suitable retaining force along the optical axis O, and also to permit lateral movement with a suitable lateral biasing force. The arms 70 also provide electrical connections from the support structure 4 to the lens assembly 20.

In the assembled state of the actuator assembly 40, the arms 70 are deflected from their relaxed state in such a way that the arms 70 provide a force (i.e. the retaining force) which biases the platforms 50, 60 together and maintains the contact in the plain bearings 100. At the same time, the arms 70 can be laterally deflected to permit the movement of the lens assembly 20 relative to the support structure 4 in directions perpendicular to the optical axis O.

The arms 70 provide a force (i.e. the lateral biasing force) that biases the lens assembly 20 towards a central position from any direction around the central position, wherein the central position corresponds to the optical axis O of the lens assembly being substantially aligned with the centre of the light-sensitive region of the image sensor 6. As a result, in the absence of driving of the lateral movement of the lens assembly 20, the lens assembly 20 will tend towards the central position from any direction around the central position. This ensures that the camera 1 remains functional to capture images, even in the absence of driving of the SMA wires 80. The magnitude of the lateral biasing force is kept low enough so as not to hinder OIS whilst being high enough to centre the lens assembly 20 in the absence of driving.

Each arm 70 is approximately L-shaped and extends around the optical axis O. The angular extent of each arm 70 is preferably at least 90° as measured between the endpoints of the arm 70.

In this example, the arms 70 are formed integrally with the moving platform 60 at one end thereof and are connected to the support platform 50 at the other end thereof. Alternatively, the arms 70 may be formed integrally with the support platform 50 and connected to the moving platform 60 or the arms 70 may be separate parts connected to both platforms 50, 60. The arms 70 may be connected to the plate(s) 50, 60 by welding, which provides both mechanical and electrical connections.

The arms 70 are made of a suitable material that provides the desired mechanical properties and is electrically conductive. Typically, the material is a metal having a relatively high yield, for example steel such as stainless steel.

Space for the Actuator Assembly

Reference will be made herein to a cartesian coordinate system in which the Z-axis coextends with the optical axis O, the origin is at an arbitrary point on the optical axis O, and the positive Z-direction is e.g. the direction faced by the image sensor 6.

The actuator assembly 40 is configured to fit within a cuboidal space S within the can 7. The space S has two major faces which are square, perpendicular to the optical axis O (Z-axis), i.e. parallel to the XY-plane, and centred on the optical axis O (Z-axis). Hence the optical axis O (Z-axis) is hereinafter sometimes referred to as the centreline. The lowermost major face of the space S defines a footprint for the actuator assembly 40. The space S has four minor faces (hereinafter referred to simply as 'sides') perpendicular to the X- or Y-axes. Generally, it is desirable to minimize the size, i.e. length and width (X- and Y-dimensions), of the footprint relative to the diameter of the lens, while also minimizing the height (i.e. Z-dimension) of the space S.

Asymmetric Lateral Biasing Force

The arrangement of arms 70 in the known actuator assembly 40 provides an asymmetric lateral biasing force, as will now be explained.

The support platform 50 and the moving platform 60 each have a flat, planar portion 50a, 60a (hereinafter generally referred to as a 'body portion'). Each body portion 50a, 60a has a shape that can be approximated as an irregular octagon with four major side surfaces 50b, 60b and four minor side surfaces 50c, 60c (hereinafter referred to simply as 'sides'). Each body portion 50a, 60a also has a central circular hole (i.e. the above-described aperture). The body portions 50a, 60a are each perpendicular to the optical axis O (Z-axis), i.e. parallel to the XY-plane. The body portions 50a, 60a are each centred on the optical axis (Z-axis) and have a similar size, shape and orientation to each other. The major sides 50b, 60b are parallel with the sides of the space S.

The support platform 50 and the moving platform 60 each have further portions, 50d, 60d supporting the crimps 51, 61 (these portions are hereinafter referred to as 'crimp supports' or 'crimp support portions'). In this example, the support platform 50 has four crimp supports 50d, each of which supports a static crimp 51, and the moving platform 60 has two crimp supports 60d, each of which supports two moving crimps 61. The static crimp supports 50d are on diagonally-opposite minor sides 50c of the body portion 50a of the support platform 50. The moving crimp supports 60d are on diagonally-opposite minor sides 60c of the body portion 60a of the moving platform 60, on a different diagonal to the static crimp supports 50d. Each crimp support 50d, 60d may be integral with a body portion 50a, 60a or may be a separate part which is connected to the body portion 50a, 60a. In this example, the static crimp supports 50d are integral whereas the moving crimp supports 60d are not.

The static crimp supports 50d each extend generally outwards (i.e. away from the centreline (Z-axis)) and also upwards (in a positive Z-direction) to bring the static crimps 51 to a similar Z-height as the moving crimps 61.

The regions of the actuator assembly 40 in which the static crimp supports 50d are located are hereinafter referred to as the 'static crimp corners', and those in which the moving crimp supports 60d are located are hereinafter referred as the 'moving crimp corners'.

One of the arms $70_1$ (hereinafter referred to as the 'first arm') starts on one of the major sides $60b_1$ of the moving platform 60. The first arm $70_1$ may start relatively close to one of the moving crimp corners or anywhere along the major side $60b_1$. The first arm $70_1$ then extends around a static crimp corner and towards the other moving crimp corner. Accordingly, the first arm $70_1$ extends alongside three sides $60b_1$, $60c_1$, $60b_2$ of the body portion 60a of the moving platform 60 and also extends gradually downwards (i.e. in the negative Z-direction) to a foot $71_1$ on the support platform 50 (or other element). Accordingly, the first arm $70_1$ is made up of three substantially-straight segments, i.e. first, second and third segments $70a_1$, $70b_1$, $70c_1$ (see FIG. 5). At the static crimp corner, the first arm $70_1$ and, in particular, the second segment $70b_1$ passes over (i.e. at a greater Z-height) the static crimp supports $50d_1$, $50d_2$ in that corner.

The other one of the arms $70_2$ (hereinafter referred to as the 'second arm') corresponds to the first arm $70_1$ rotated by 180° about the Z-axis. Accordingly, compared to the first arm $70_1$, the second arm $70_2$ starts on the opposite side $60b_3$ of the moving platform 60 and extends around the opposite corner, with the same sense of rotation about the Z-axis. As will be appreciated, both arms 70 may extend anticlockwise (as in the illustrated example) or clockwise.

The lateral biasing force provided by the arms 70 is asymmetric in that its magnitude varies with the angle of displacement of the moving platform 60 in the X-Y plane. In particular, for displacements of a given magnitude within an operating range, the lateral biasing force is a maximum for displacements along a line $D_1$ (hereinafter referred to as the 'strong diagonal') which, in this example, passes through the moving crimp corners, and a minimum for displacements along a line $D_2$ (hereinafter referred to as the 'weak diagonal') which, in this example, passes through the static crimp corners. In this example, the strong and weak diagonals $D_1$, $D_2$ substantially correspond to the major diagonals of the space S, i.e. the lines Y=X and Y=−X, respectively.

In practice, a maximum ratio of the stiffness of the strong diagonal $D_1$ to the that of the weak diagonal $D_2$ may be specified in order to achieve sufficient performance of the actuator assembly 40 (this ratio is hereinafter referred to as the asymmetry ratio). Here, the stiffness of a diagonal corresponds e.g. to the force required to displace the moving platform 60 a unit distance in that diagonal.

Actuator Assemblies for Larger Lenses

Currently, cameras for portable electronic devices may have lenses with diameters of up to ~8 mm and hence actuator assemblies (hereinafter referred to as 'small lens actuator assemblies') with footprints of up to ~13×13 mm. However, there is a trend towards larger lenses and so cameras may in the future have lenses with diameters of say ~13 mm and hence actuator assemblies (hereinafter referred to as a 'large lens actuator assemblies') with footprints of ~17×17 mm or more.

At the same time, the distance by which an actuator assembly needs to move (in other words, the required stroke) in order to provide suitable OIS may remain substantially the same or may change by a relatively small amount. For actuator assemblies such as those described herein, the required stroke determines the minimum lengths of the SMA wires, which is generally preferred as most cost-efficient, and hence the crimp-to-crimp (C2C) distances.

Accordingly, each crimp 51, 61 is generally a distance $d_3'$ from the corner of the space S' (and the can 7') in the large lens actuator assembly 40' that is greater than the equivalent distance $d_3$ in the small lens actuator assembly 40.

As will be appreciated, if a small lens actuator assembly has a smaller stroke requirement, then it may also have crimps 51, 61 that are further from the corner of the space S.

First Example

Figure 8:
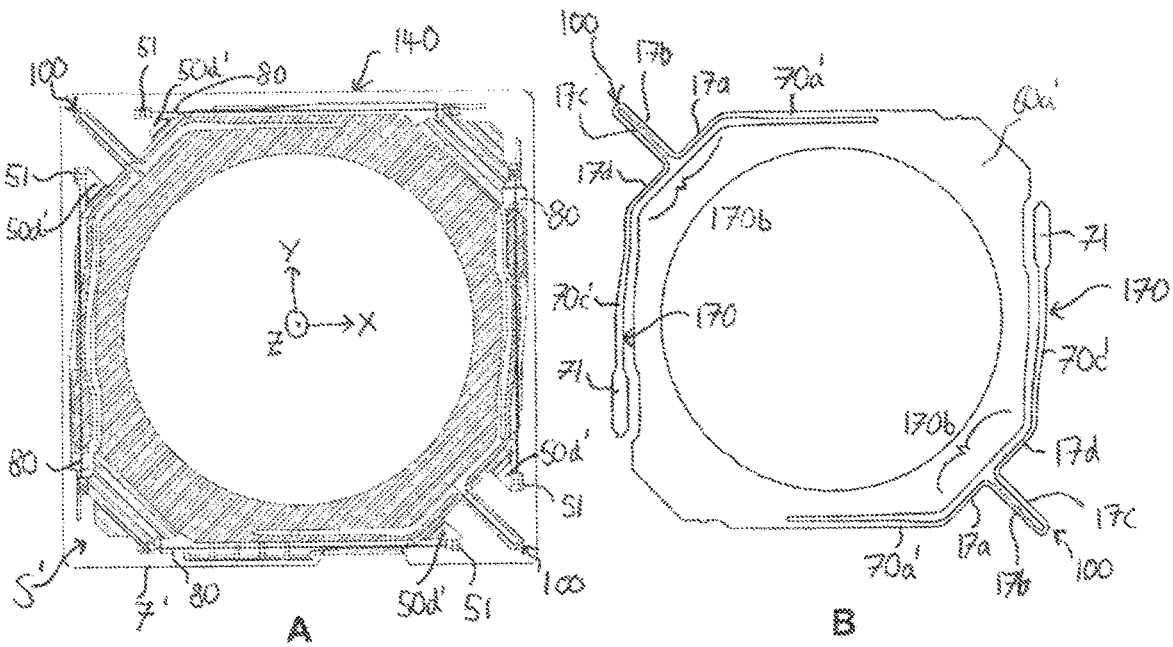
FIG. 8 illustrates top views of (A) an example of an SMA actuator assembly with kinked arms and (B) only the moving platform and arms thereof.

Referring in particular to FIG. 8, a first example of an actuator assembly 140 with kinked arms 170 will now be described (the actuator assembly 140 is hereinafter referred to as the 'first actuator assembly').

The first actuator assembly 140 is the same as the above-described large lens actuator assembly 40' except that the second segment 170b of each arm 170 includes a further feature 100 (hereinafter referred to as a kink).

The kink 100 is located around halfway along the second segment 170b and divides the second segment 170b into two parts, i.e. first and fourth subsegments 17a, 17d.

At the kink 100, the arm 170 has two substantially-straight subsegments, i.e. second and third subsegments 17b, 17c, which are positioned alongside each other and which each extend diagonally outwards (e.g. in a direction substantially parallel with the line Y=−X). The inner ends of the second and third subsegments 17b, 17c are respectively connected to the first and fourth subsegments 17a, 17d via ~90° turns, while the outer ends are connected to each other via a ~180° turn.

Hence the kink 100 causes the arm 170 to extend between the static crimps 51 and their respective crimp supports 50d' and into a region of the space S' at the static crimp corner.

Figure 9:
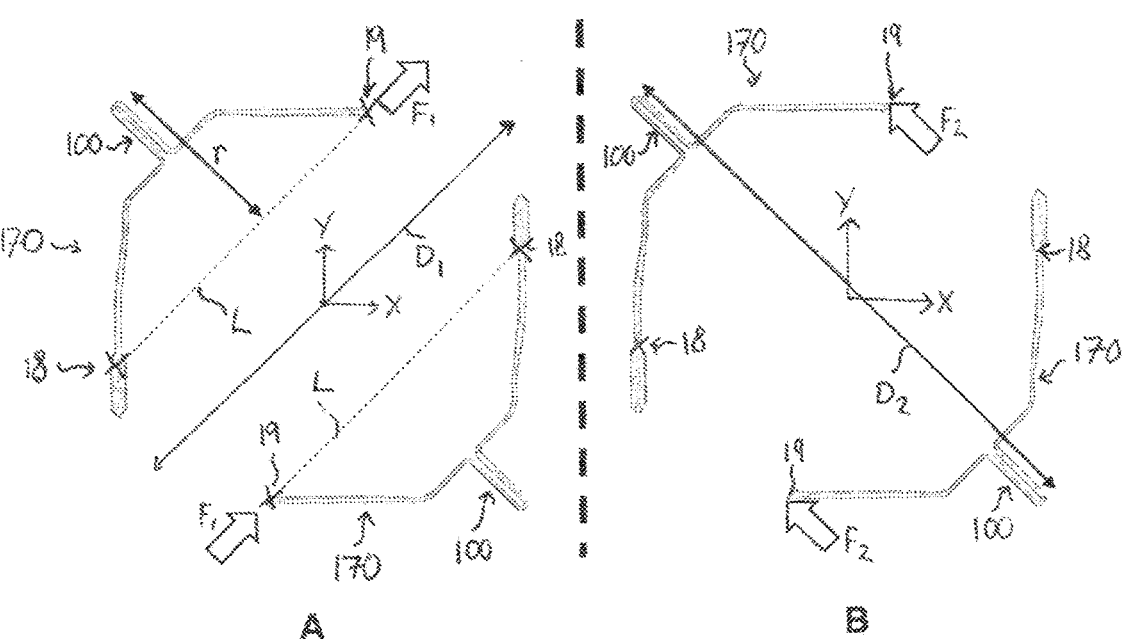
FIG. 9 illustrates the bending moment on the arms of FIG. 8 for displacement of the moving platform in (A) the strong diagonal and (B) the weak diagonal.

Referring in particular to FIG. 9A, and considering projections onto the XY-plane, the kink 100 corresponds to a part of the arm 170 which is a greater distance from a line segment L between the endpoints 18, 19 of the arm 170 (which is substantially parallel to the strong diagonal $D_1$).

Hence the force $F_1$ on the arm 170 associated with a displacement of the moving platform 60' along the strong diagonal $D_1$ applies a greater bending moment to this part of the arm 170, thereby reducing the stiffness of the strong diagonal $D_1$.

Generally speaking, in the context of the actuator assemblies described herein, the stiffness of the strong diagonal is reduced by a change in shape of the arm that produces a greater length of arm 70' at a greater distance from the centreline (Z-axis).

Referring in particular to FIG. 9B, and again considering projections onto the XY-plane, the kink 100 is substantially parallel to the weak diagonal $D_2$. The force $F_2$ on the arm 170 associated with a displacement of the moving platform 60' along the weak diagonal $D_2$ is substantially parallel to the kink 100. Hence the kink 100 does not significantly change the bending moment applied to the second segment 170b and so there is no significant change in the stiffness of the weak diagonal $D_2$.

Figure 10:
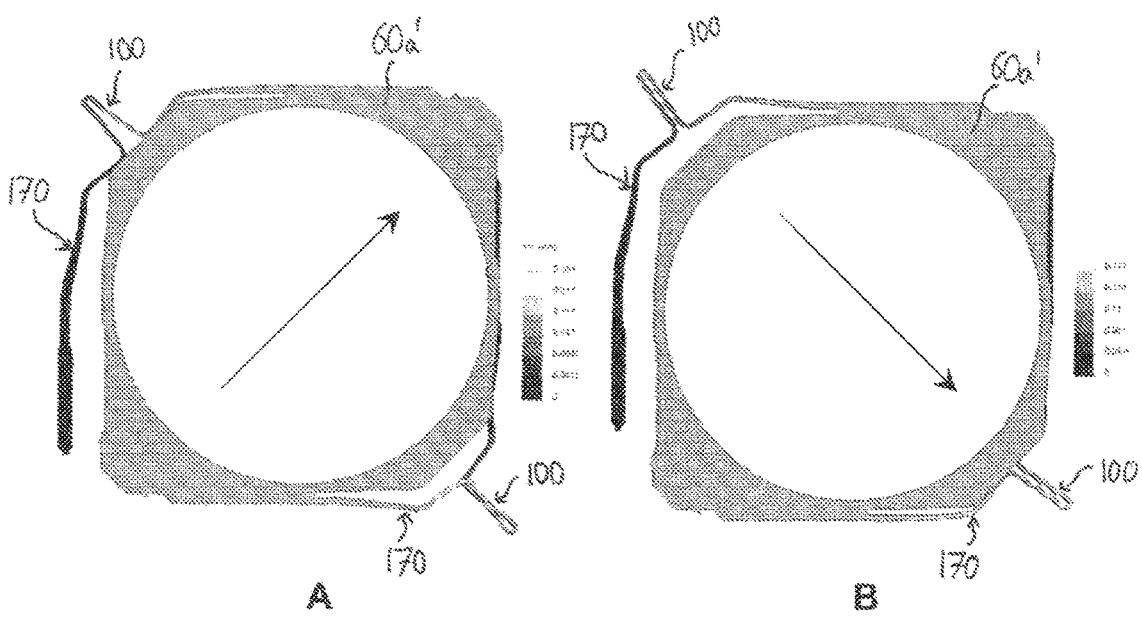
FIG. 10 illustrates (exaggerated) displacement of the moving platform and the arms of FIG. 8 in (A) the strong diagonal and (B) the weak diagonal.

Referring in particular to FIG. 10A, the relatively large bending moment produced at the kinks 100 by a displacement of the moving platform 60' along the strong diagonal $D_1$ leads to relatively large deformations of the kinks 100.

Referring in particular to FIG. 10B, in contrast, a displacement of the moving platform 60' along the weak diagonal $D_2$ leads to relatively small or insignificant deformations of the kinks 100.

Accordingly, the kinks 100 have the effect of reducing the asymmetry of the lateral biasing force and, more specifically, reducing the above-described asymmetry ratio, i.e. the ratio of the stiffness of the strong diagonal $D_1$ to that of the weak diagonal $D_2$.

The kinks 100 may reduce the asymmetry ratio by up to 50% or more. For instance, the kinks 100 may reduce the asymmetry ratio from being greater than 5 for a large lens actuator assembly (such as the above-described assembly 40') to being below 5 or below 4 or below 3 or below 2 or below 1.5.

This reduced asymmetry can enable the first actuator assembly 140 to be controlled more effectively, for example because of increased linearity (e.g. linearity of the response to a driving signal unit), reduced hysteresis, reduced crosstalk (i.e. movement in a direction perpendicular to a driven direction), reduced stroke asymmetry, reduced slew rate asymmetry (wherein the slew rate is the rate at which the moving platform 60 returns to its central position), etc.

The reduced asymmetry can enable large lens actuator to be utilised in similar ways to small lens actuator assemblies.

Moreover, extending as it does between the static crimps 51, the kink 100 can be at a greater distance from the centreline (Z-axis) than any part of an arm 70 of a small lens actuator assembly (compare FIGS. 6A and 8A). Accordingly, in some instances, the kinks 100 can even enable a large lens actuator assembly to have a lower asymmetry ratio than a corresponding small lens actuator assembly.

The reduced asymmetry also advantageously reduces the differences between the constrained and unconstrained stiffnesses in the X- and Y-directions. Here, a constrained stiffness is the stiffness when the moving platform 60' is constrained by the SMA wires 80 to move in the X- or Y-direction, whereas an unconstrained stiffness is the stiffness when there are no forces applied to the moving platform 60' by the SMA wires 80. The reduced asymmetry reduces the tendency for the moving platform 60' to move off the axis along which it is being moved and hence reduces the forces required for constrained movement, i.e. reduces the constrained stiffnesses such that they are closer to the unconstrained stiffnesses. This avoids there being such large constrained stiffnesses when large unconstrained stiffnesses are required, e.g. for more effective unpowered centring, counteracting the effect of gravity.

Further Examples

Various different forms of kinked arms can be provided which have advantages as described above.

Figure 11:
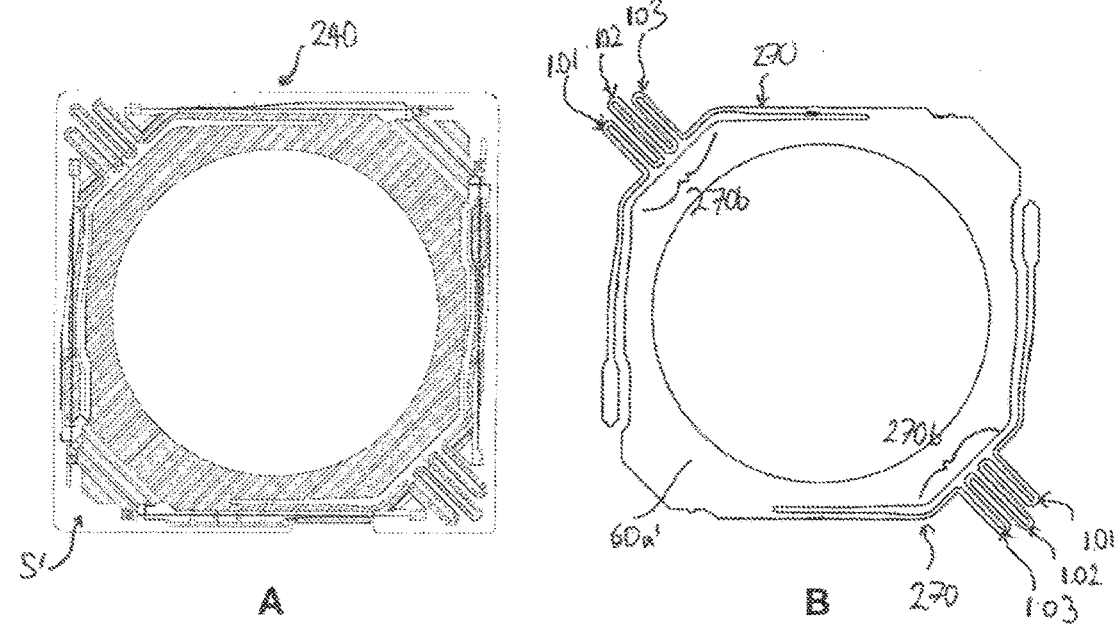
FIG. 11 illustrates top views of (A) a further example of an SMA actuator assembly with kinked arms and (B) only the moving platform and arms thereof.

Referring to FIG. 11, a second example of an actuator assembly 240 (hereinafter referred to as the 'second actuator assembly') will now be described. The second actuator assembly 240 is the same as the first actuator assembly 140 except that the second segments 270*b* of the arms 270 each have three kinks, i.e. first, second and third kinks 101, 102, 103. The second kink 102 is substantially the same as the above-described kink 100. The first and third kinks 101, 103 are positioned alongside, and on either side of, the second kink 102. The first and third kinks 101, 103 are each similar to the second kink 102 but are shorter so as to fit within the space S'. In other examples, there may be different numbers of kinks and/or different lengths of kinks.

Figures 12, 13, 14:
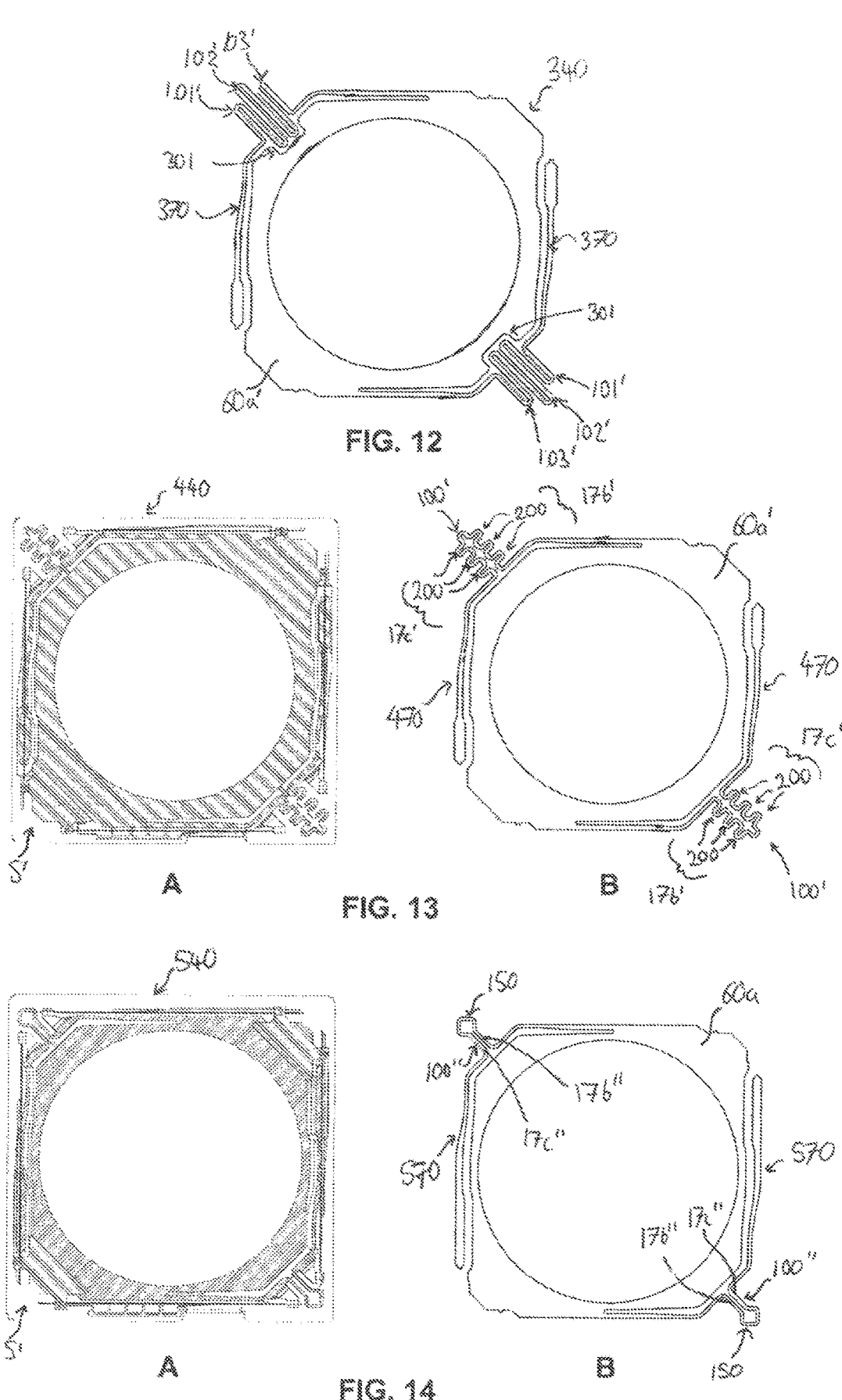
FIG. 12 illustrates a top view of a further example of an SMA actuator assembly with kinked arms.
FIG. 13 illustrates top views of (A) a further example of an SMA actuator assembly with kinked arms and (B) only the moving platform and arms thereof.
FIG. 14 illustrates top views of (A) a further example of an SMA actuator assembly with kinked arms and (B) only the moving platform and arms thereof.

Referring to FIG. 12, a third example of an actuator assembly 340 (hereinafter referred to as the 'third actuator assembly') will now be described. The third actuator assembly 340 is the same as the second actuator assembly 240 except that the second kinks 102' (and the subsegments of the arms 370 connected to the second kinks 102') each extend further inwards, i.e. closer to the centreline (Z-axis). The body portions 50*a'*, 60*a'* of the platforms 50', 60' have recesses 301 to accommodate the kinks 101', 102', 103'.

Referring to FIG. 13, a fourth example of an actuator assembly 440 (hereinafter referred to as the 'fourth actuator assembly') will now be described. The fourth actuator assembly 440 is the same as the first actuator assembly 140 except that the subsegments 17*b'*, 17*c'* of the arms 470 at the kinks 100' each have three kinks 200 therein (these kinks 200 are hereinafter referred to as 'secondary kinks'). Each secondary kink 200 extends at an angle of ~90° away from the kink 100'. In other examples, there may be different numbers of secondary kinks 200, and the secondary kinks 200 may extend along different paths.

Referring to FIG. 14, a fifth example of an actuator assembly 540 (hereinafter referred to as the 'fifth actuator assembly') will now be described. The fifth actuator assembly 540 is the same as the first actuator assembly 140 except that the kinks 100" each have a feature 150 (hereinafter referred to as a loop) at their outer ends. The loop corresponds to a part of the kink 100" where the separation between the subsegments 17*b"*, 17*c"* of the arm 570 increases and then decreases. Hence the loop 150 increases the radius of curvature at the outer end of kink 100", thereby avoiding the high stress concentration regions that may occur with the kink 100 of the first actuator assembly 40. Hence the loop 150 can be a useful additional, particularly as space limitations generally mean that the subsegments 17*b"*, 17*c"* of the arm 570 generally need to be positioned alongside each other and so would otherwise have a small radius of curvature at the outer end and so more prone to failure. In the example illustrated in the figure, the loop 150 is rhombus-shaped. However, the loop 150 may have any suitable shape. For example, the loop 150 may be round, which may be beneficial in relation to radius of curvature.

Figure 15:
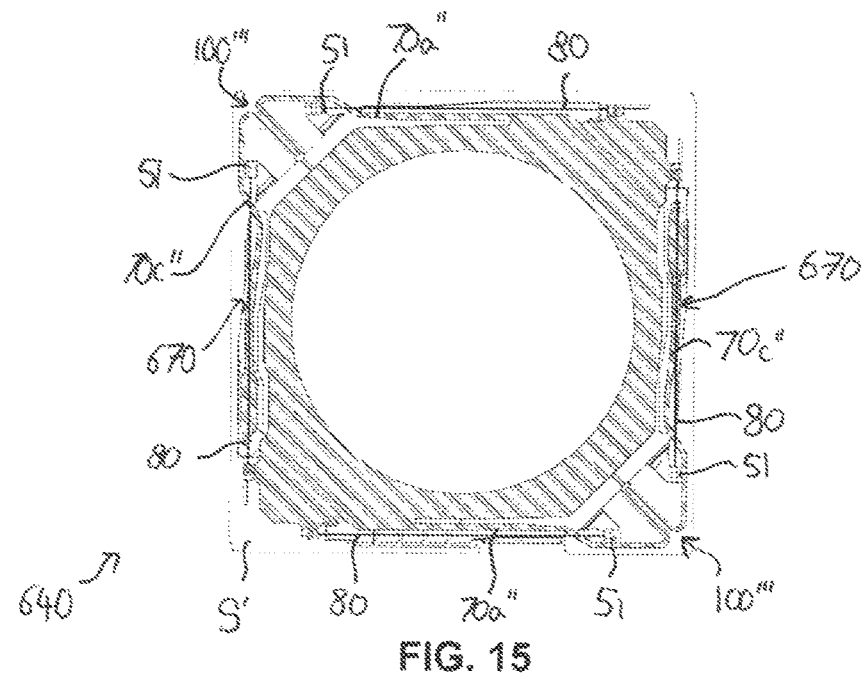
FIG. 15 illustrates a top view of a further example of an SMA actuator assembly with kinked arms.

Referring to FIG. 15, a sixth example of an actuator assembly 640 (hereinafter referred to as the 'sixth actuator assembly') will now be described. The sixth actuator assembly 640 is equivalent to the first actuator assembly 140 except that the first and third segments 70*a"*, 70*c"* of the arms 670 each follow a more complex path that passes under an SMA wire 80 and around the outside of a static crimp 51 (i.e. at a greater distance from the centreline (Z-axis)) towards a corner of the space S' at a static crimp corner. The first and third segments 70*a"*, 70*c"* of an arm 670 are then connected via a kink 100''' which is equivalent to the above-described kink 100 except that it extends inwards rather than outwards. As will be appreciated, notwithstanding these differences, the kink 100''' has equivalent effects on the stiffnesses in the strong and weak diagonals $D_1$, $D_2$ to those described above.

Figure 16:
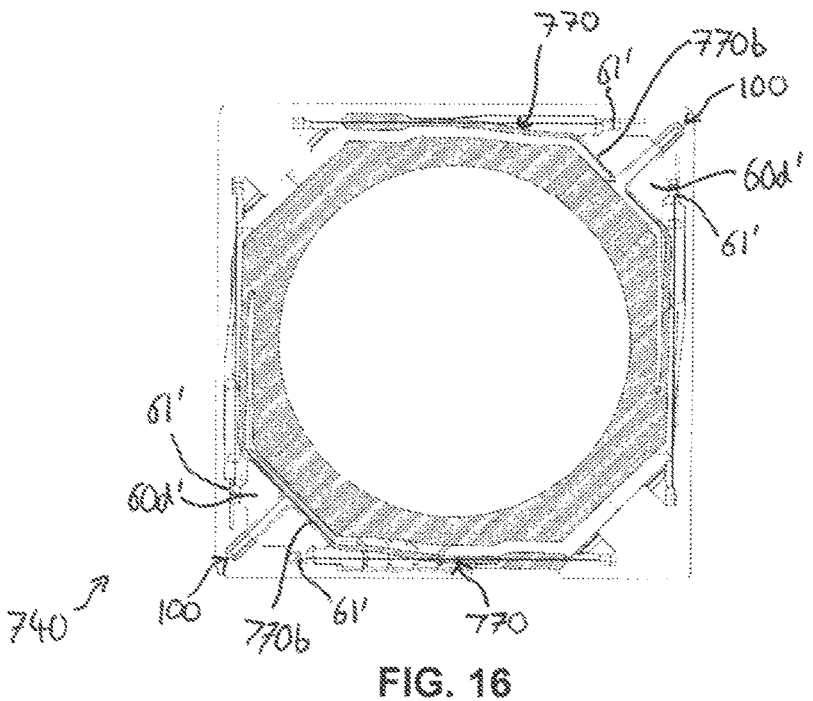
FIG. 16 illustrates a top view of a further example of an SMA actuator assembly with kinked arms.

Referring to FIG. 16, a seventh example of an actuator assembly 740 (hereinafter referred to as the 'seventh actuator assembly') will now be described. The seventh actuator assembly 740 is equivalent to the first actuator assembly 140 except that the arms 770 each extend around a moving crimp corner rather than around a static crimp corner. Each arm 770 and, in particular, the second segment 770*b* of each arm passes under (i.e. at a lesser Z-height) the moving crimp support 60*d'* in that corner. In this example, the kink 100 in the second segment 770 is the same as the above-described kink 100 of the first actuator assembly 100. As will be appreciated, there may be greater design freedom in this instance due to the second segments 770*b* of the arms 770 occupying different vertical (Z-height) regions to the moving crimps 61' and their supports 60*d'*. However, generally, such actuator assemblies may have a greater total Z-height than the other actuator assemblies described herein.

Eighth Example

Figure 17:
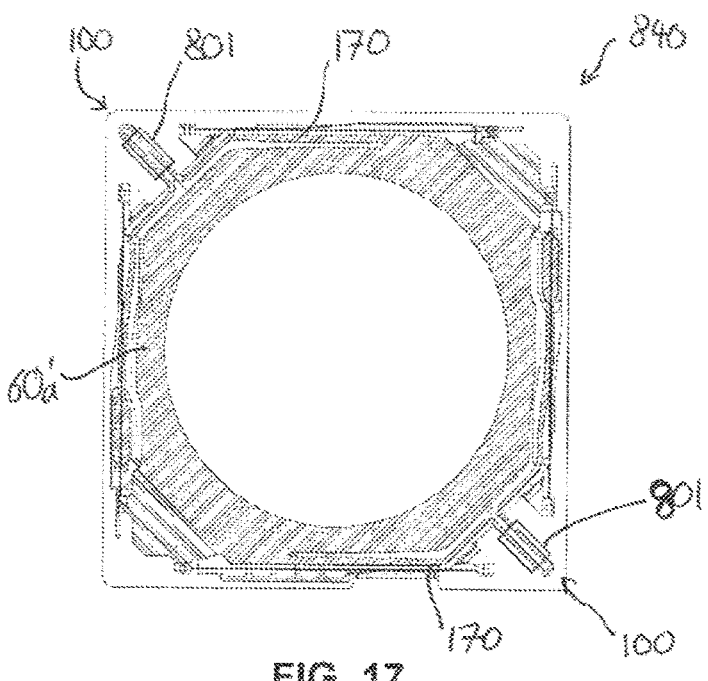
FIG. 17 illustrates a top view of a further example of an SMA actuator assembly with kinked arms and a damping substance.

Referring to FIG. 17, an eighth example of an actuator assembly 840 (hereinafter referred to as 'the eighth actuator assembly') will now be described. The eighth actuator assembly 840 is the same as the first actuator assembly 140 except for two regions 801 where a damping substance has been applied such that the damping substance connects a part of each arm 170 and a corresponding part of the support platform 50*a* (or other element). Each region 801 includes at least part of one of the kinks 100. The damping substance acts to reduce vibrations of the moving platform 60'. The damping substance may be, for example, a damping gel or a soft glue.

In actuator assemblies without kinked arms, the damping substance may be applied between the moving crimp supports 60*d* and the support platform 50*a*. However, it can be relatively difficult to apply the damping substance in this way. Furthermore, where the damping substance requires light curing, it can be relatively difficult to illuminate the damping substance applied in this way.

In contrast, the kinks 100 provide regions 801 to which it is generally much easier to apply the damping substance. For example, the damping substance can be applied between, and on either side of, the subsegments of the arm 70 at the kink 100. It is also generally much easier to illuminate the damping substance in the regions 801 because they are more exposed. Furthermore, the surface area of the arms 170 in contact with, and hence damped by, the damping substance can be more easily controlled (e.g. increased), enabling more controlled (e.g. higher) damping. In addition, because the displacement of the arms 170 at the kinks 100 has a smaller magnitude than that of the moving platform 60*a'*, the regions 801 can be more suitable for the damping substance as the strain in the damping substance will be less and so the likelihood of the damping substance tearing is less. Hence reliability may be improved.

Ninth Example

Figure 17A:
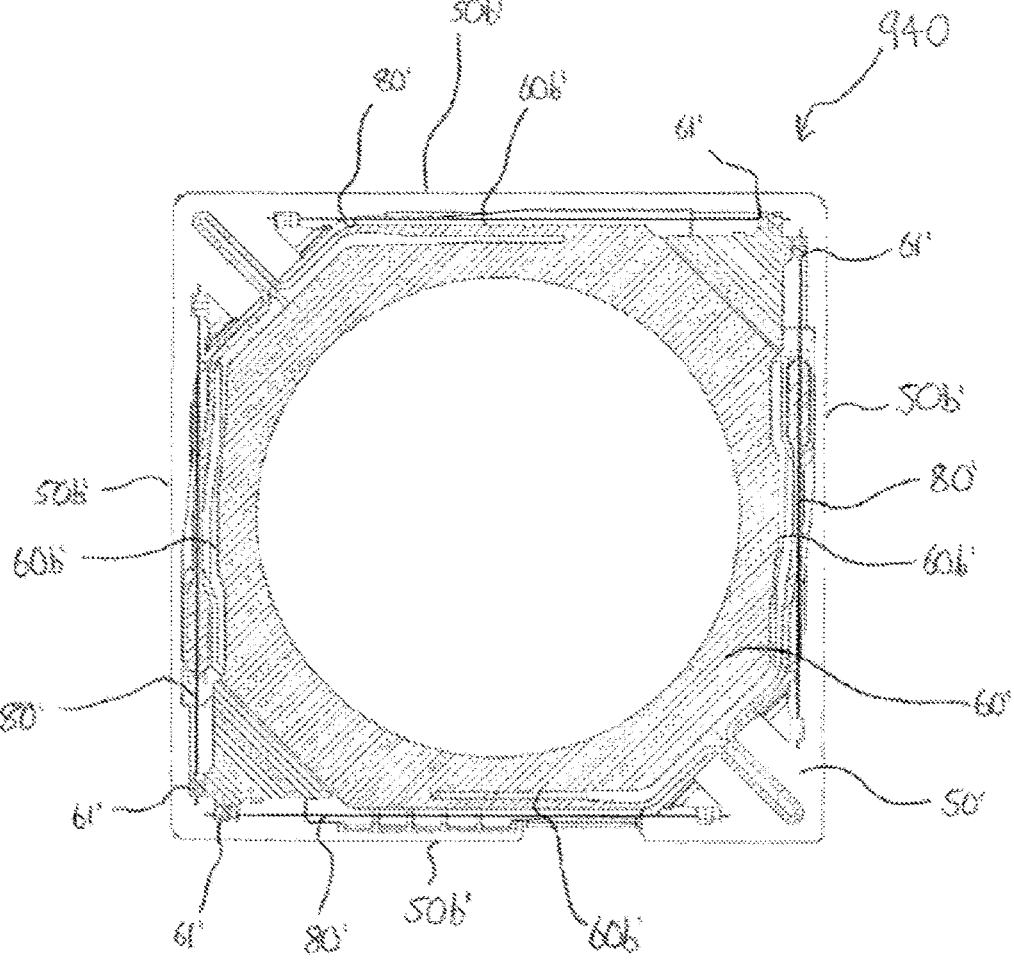
FIG. 17A illustrates a top view of a further example of an SMA actuator assembly with kinked arms and the SMA wires arranged off-centre.

Referring to FIG. 17A, a ninth example of an actuator assembly 940 (hereinafter referred to as 'the ninth actuator assembly') will now be described. The ninth actuator assembly 940 is the same as the first actuator assembly 140 except that that each of the SMA wires 80' extends further towards a moving crimp corner and each of the moving crimps 61' is positioned closer to a moving crimp corner. This illustrates that the SMA wires 80' may be non-centrally positioned in relation to e.g. the major sides 50*b*', 60*b*' of the platforms 50', 60'.

Other Variations

It will be appreciated that there may be many other variations of the above-described embodiments.

For example, each arm may have fewer or more (sub) segments. One or more of the (sub)segments may extend in a different direction, along a differently-shaped path (e.g. a curved path when projected onto the X-Y plane) and/or may have a different shape (e.g. a cross-section that varies along its length).

Features of different examples may be combined. For example, the secondary kinks 200 of the fourth actuator assembly 440 and/or the loops 150 of the fifth actuator assembly 540 may be included in the kinks of any of the other actuator assemblies 140, 240, 340, 640, 740.

Instead of an arm having parallel subsegments at the kink, the arm may have subsegments that are generally oriented at an acute angle to each other (e.g. when projected onto the XY-plane). Such a kink may be referred to as a V-shaped kink. The subsegments at the kink need not be positioned alongside each other.

Generally, the kinks may have any shape that produces a greater length of arm at a greater distance from the centreline in such a way as to reduce the stiffness of the strong diagonal while (if at all) only reducing the stiffness of the weak diagonal by a relatively small amount. This may be achieved in a practical way by arms that occupy a gap between SMA wires at the static (or moving) crimp corners.

The above-described principles also apply to actuator assemblies with different static and moving platforms, different footprints, different configurations of arms, etc.

For instance, the static and moving platforms may have any suitable shape. Since the arms are generally arranged around the platforms, this may, in turn, affect the shape of the arms.

The static and moving platforms (and the 'first and second parts' referred to in the claims) may be formed of any number of one or more components.

The footprint may allow the arms to use more space outside the SMA wires. For example, the arms may pass between, and then around the outside of, the static crimp corners.

In contrast to the above-described examples, each arm may have one endpoint that it is at a significantly different distance from the major diagonal of the cuboidal space than the other endpoint. In such a case, the strong diagonal D1 may not be substantially parallel to the major diagonal of the cuboidal space.

The arms need not have two-fold rotational symmetry about the centreline (Z-axis). The arms may instead have mirror symmetry about the major diagonal of the space through the moving crimp corners (i.e. the line Y=X). In other words, both of the arms may start e.g. near one of the moving corners and one arm may extend clockwise and the other arm may extend anticlockwise towards the other moving crimp corners (cf. FIG. 5).

There may be a different number of arms, e.g. three or four or more arms. In this case, there may be multiple stronger and weaker diagonals.

The moving platform need not move only in the X-Y plane.

The actuator assembly need not be configured to support a lens assembly and, for example, may be configured to support another type of optical element, an image sensor, etc. The platforms need not include apertures.

The actuator assembly need not be used in a camera.

The Z-axis (and the 'first axis' referred to in the claims) may not correspond to an optical axis. The Z-axis may correspond to a line that is perpendicular to a plane defined by planar surfaces of the moving and/or support platform. The Z-axis may correspond to a line that is perpendicular to a plane defined by the directions of movement of the moving platform.

The actuator assembly may be any type of assembly that comprises a first part and a second part movable with respect to the first part. The actuator assembly may be, or may be provided in, any one of the following devices: a smartphone, a protective cover or case for a smartphone, a functional cover or case for a smartphone or electronic device, a camera, a foldable smartphone, a foldable smartphone camera, a foldable consumer electronics device, a camera with folded optics, an image capture device, an array camera, a 3D sensing device or system, a servomotor, a consumer electronic device (including domestic appliances such as vacuum cleaners, washing machines and lawnmowers), a mobile or portable computing device, a mobile or portable electronic device, a laptop, a tablet computing device, an e-reader (also known as an e-book reader or e-book device), a computing accessory or computing peripheral device (e.g. mouse, keyboard, headphones, earphones, earbuds, etc.), an audio device (e.g. headphones, headset, earphones, etc.), a security system, a gaming system, a gaming accessory (e.g. controller, headset, a wearable controller, joystick, etc.), a robot or robotics device, a medical device (e.g. an endoscope), an augmented reality system, an augmented reality device, a virtual reality system, a virtual reality device, a wearable device (e.g. a watch, a smartwatch, a fitness tracker, etc.), a drone (aerial, water, underwater, etc.), an aircraft, a spacecraft, a submersible vessel, a vehicle, and an autonomous vehicle (e.g. a driverless car), a tool, a surgical tool, a remote controller (e.g. for a drone or a consumer electronics device), clothing (e.g. a garment, shoes, etc.), a switch, dial or button (e.g. a light switch, a thermostat dial, etc.), a display screen, a touchscreen, a flexible surface, and a wireless communication device (e.g. near-field communication (NFC) device). It will be understood that this is a non-exhaustive list of example devices.

The actuator assembly described herein may be used in devices/systems suitable for image capture, 3D sensing, depth mapping, aerial surveying, terrestrial surveying, surveying in or from space, hydrographic surveying, underwater surveying, scene detection, collision warning, security, facial recognition, augmented and/or virtual reality, advanced driver-assistance systems in vehicles, autonomous vehicles, gaming, gesture control/recognition, robotic devices, robotic device control, touchless technology, home automation, medical devices, and haptics.

Figure 18:
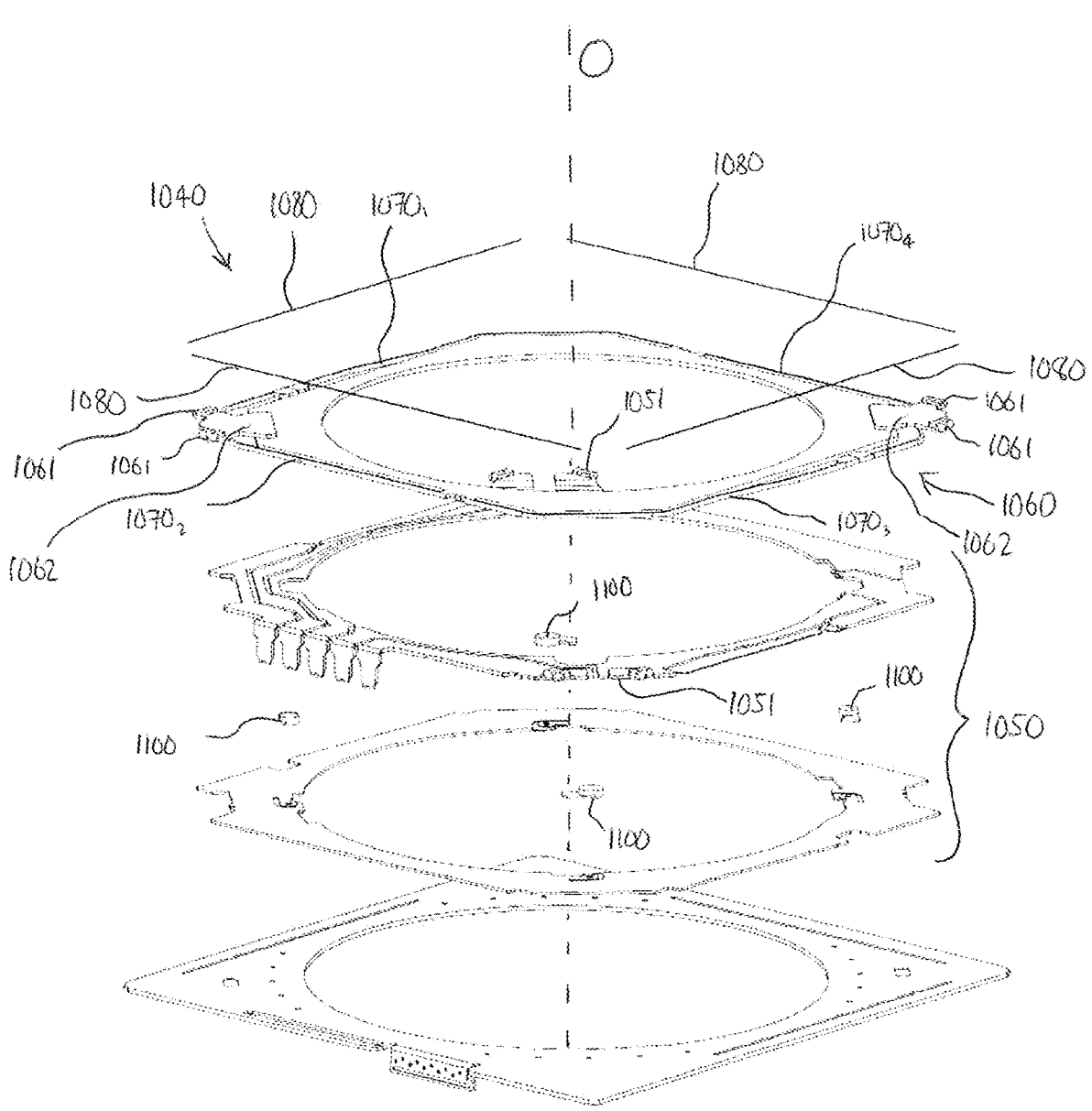
FIG. 18 illustrates an exploded view of a four-arm SMA actuator assembly.

Referring to FIG. 18 an actuator assembly 1040 in accordance with an embodiment of the present invention will be described in detail. The actuator assembly 1040 includes a sub-assembly 1050 (hereinafter referred to as a 'static part') and a further sub-assembly 1060 (hereinafter referred to as a 'moving part'). The moving part 1060 may support a variety of different components, for example a lens assembly 20 similar to that in embodiments described above. The actuator assembly 1040 is substantially the same as the actuator assembly 40 described above with reference to FIGS. 2A and 2B except that the actuator assembly 1040 comprises four flexures $1070_1$, $1070_2$, $1070_3$, $1070_4$ as opposed to the two arms, i.e. flexures, seen in FIGS. 2A and 2B. In the embodiment shown, the four flexures $1070_1$, $1070_2$, $1070_3$, $1070_4$ are integrally formed with the moving part 1060. However, one or more of the four flexures $1070_1$, $1070_2$, $1070_3$, $1070_4$ could instead be integrally formed with the static part 1050 or indeed be provided as independent parts. The actuator assembly 1040 has a primary axis which corresponds to the optical axis O seen in FIG. 1.

The sub-assembly referred to as the static part 1050 is essentially the same as the support platform 50 described above with reference to FIGS. 2A and 2B.

Movement of the moving part 1060 relative to the static part 1050 is driven by a lateral actuation arrangement comprising four SMA wires 1080. The static part 1050 is formed with crimps 1051 (hereinafter referred to as 'static crimps' and the moving platform is formed with crimps 1061 (hereinafter referred to as 'moving crimps'). The crimps 1051, 1061 crimp the four SMA wires 1080 so as to connect them to the static part 1050 and the moving part 1060. Similarly to earlier embodiments, the SMA wires 1080 may be perpendicular to the primary axis or included at a small angle to the plane perpendicular to the primary axis.

In operation, the SMA wires 1080 are selectively driven to move the moving part 1060 relative to the static part 1050 in any lateral direction (i.e. direction perpendicular to the primary axis), as will now be explained.

The moving part 1060 is driven in an identical manner to the arrangement described above with respect to FIGS. 2A and 2B.

The actuator assembly 1040 may also include, for example, four plain (or ball) bearings 1100 which operate in a similar manner to the embodiment described above.

Each of the moving crimps 1061 is supported by a crimp support portion 1062 which extends from the moving part 1060. The crimp support portion 1062 may be a separate component attached to the moving part 1060 by any suitable means, e.g. by welding or an adhesive, or alternative it may be integrally formed with the moving part 1060 thereby forming a unitary component.

Whilst the movable part 1060 is technically an eight-sided polygon, due to proportions of the shape the movable part 1060 may be considered to have a square shape with four corners. In the four wire SMA actuator assembly 1040 seen in FIG. 18, it is only necessary to have moving crimps 1061 arranged on two opposing corners of the moving part 1060 and for the static part 1050 to have static crimps 1051 on the other set of opposing corners. As will be appreciate by those skilled in the art, connecting the SMA wires 1080 between the moving crimps 1061 and static crimps 1051 in the arrangement shown in these Figures will result in an actuation arrangement which is capable of driving movement in a variety of different directions in a movement plane which is perpendicular to the primary axis.

With the arrangement of moving crimps 1061 described above, as will be appreciated from FIG. 18, two of the flexures $1070_1$, $1070_3$ extend around corners where there are no moving crimps 1061 and the other two flexures $1070_2$, $1070_4$ are routed via corners which comprise moving crimps 1061, i.e. they overlap the moving crimps 1061 when viewed along the primary axis. In this embodiment according to the present invention, the flexures $1070_2$, $1070_4$ are arranged to pass under the moving crimps 1061. This advantageously keeps the lateral extent of the actuator assembly 1040 to a minimum and keeps the depth of the actuator assembly 1040 in the primary axis to a minimum.

Figure 5:
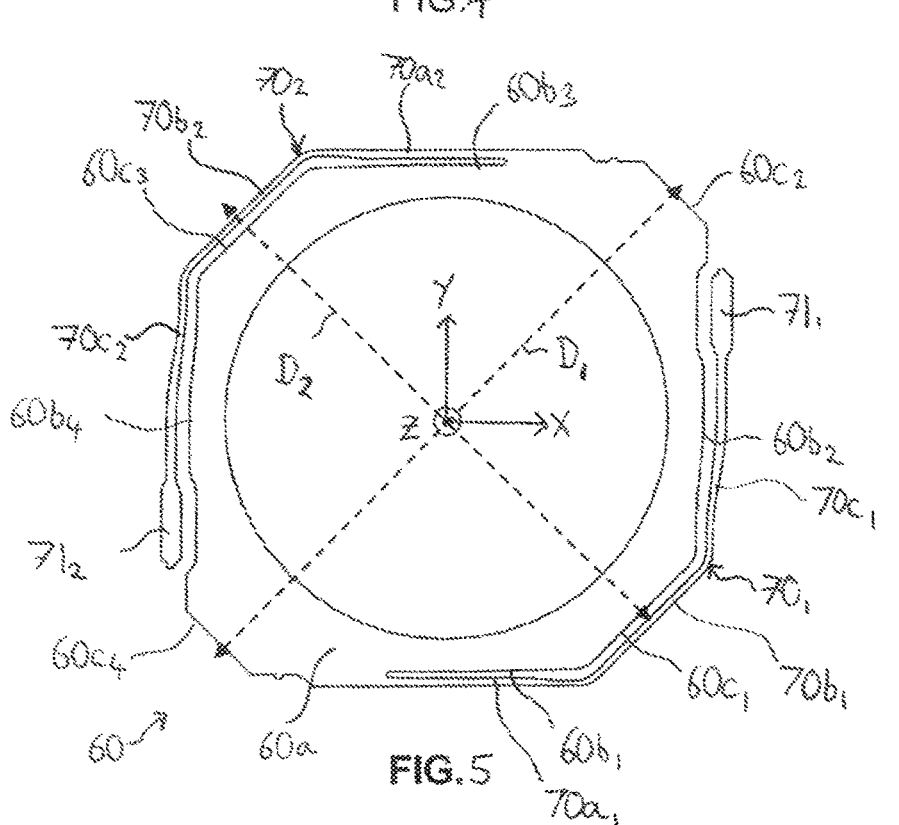
FIG. 5 illustrates a top view of the moving platform and the arms of the SMA actuator assembly of FIG. 1.
Figures 6, 7:
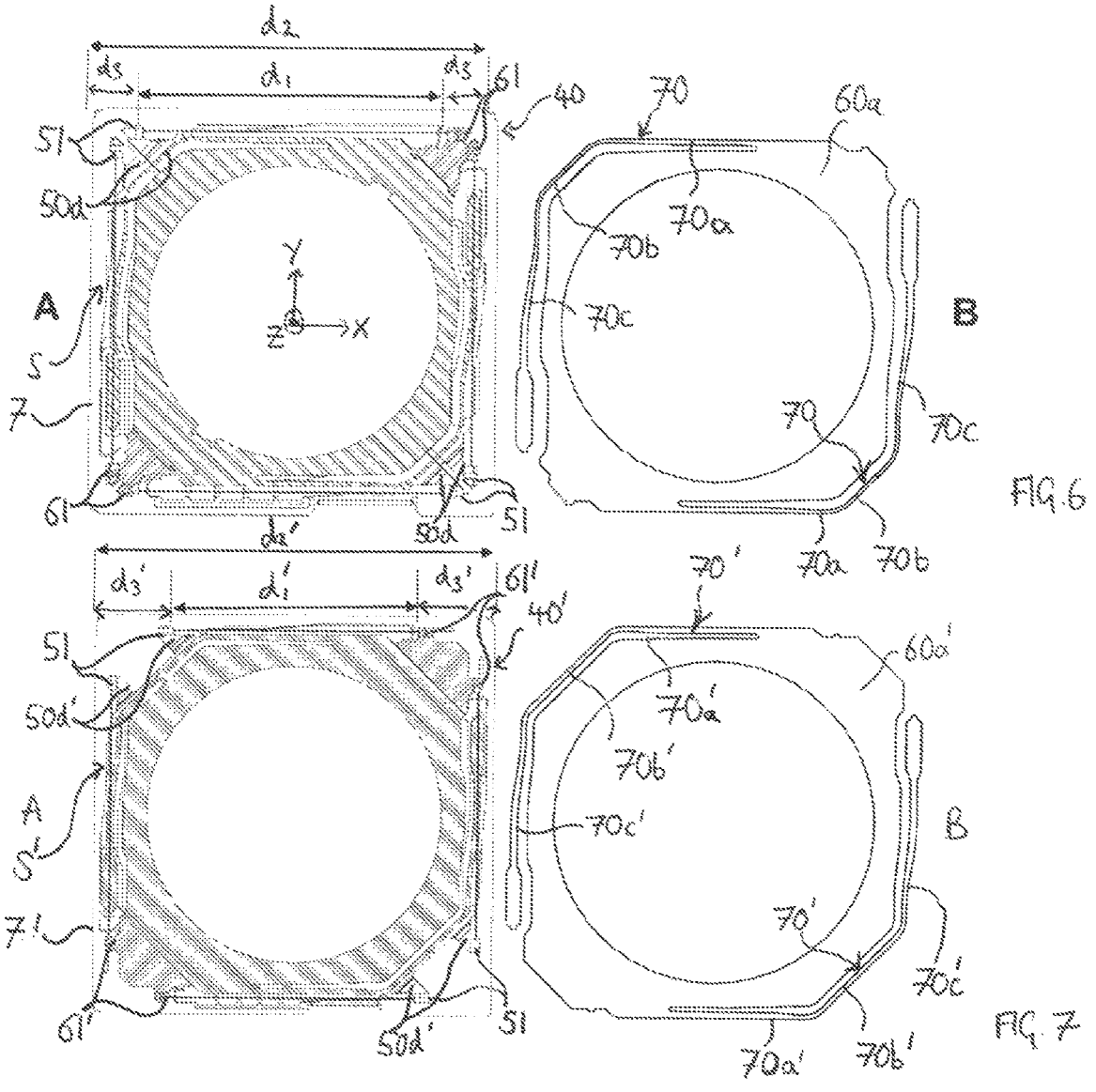
FIG. 6 illustrates top views of (A) the SMA actuator assembly of FIG. 1, (B) only the moving platform and arms thereof.
FIG. 7 illustrates top views of (A) an SMA actuator assembly of a similar type to that of FIG. 1 but for use with a larger lens assembly and (B) only the moving platform and arms thereof.
Figure 19:
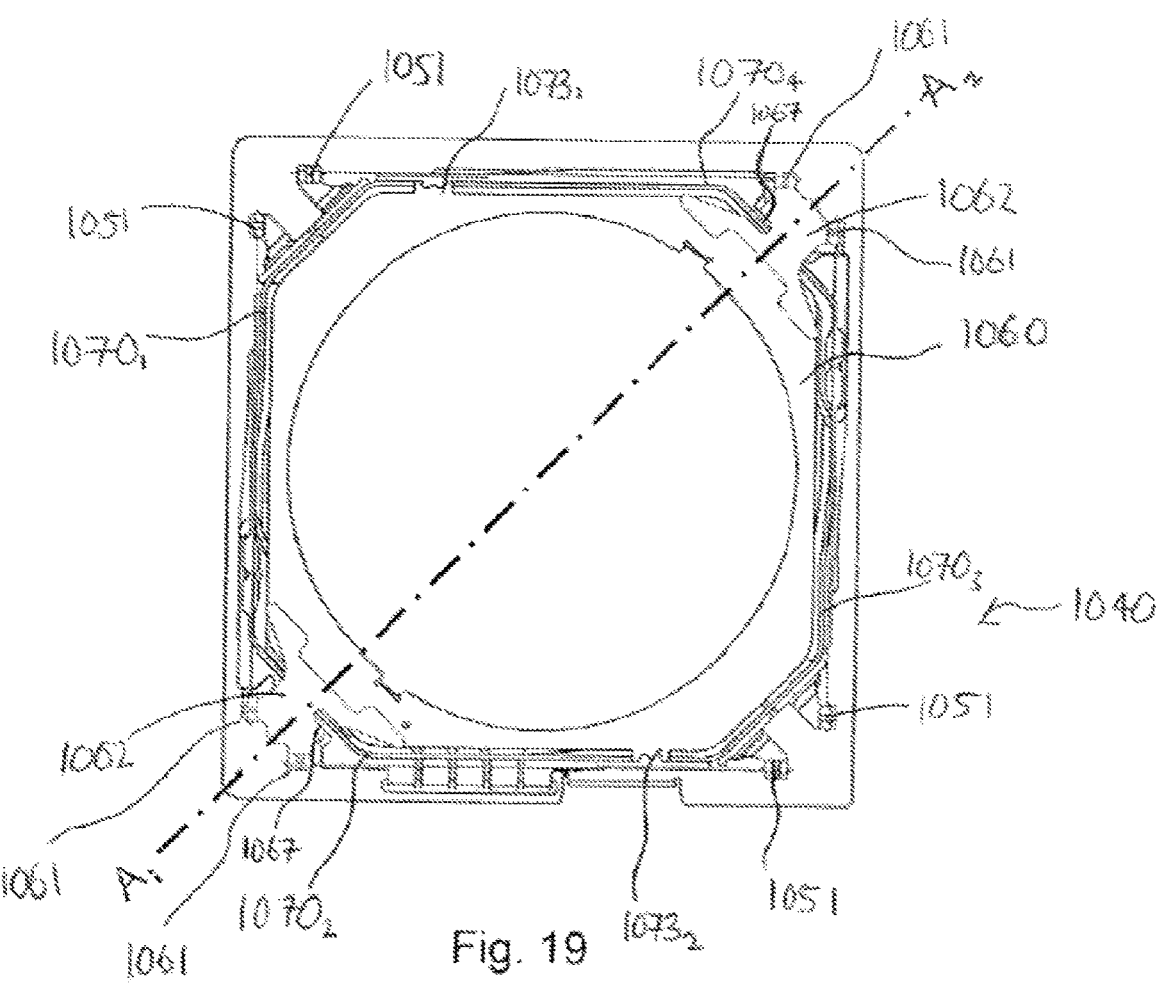
FIG. 19 illustrates a top view of the actuator assembly seen in FIG. 18.

FIG. 19 shows a top view of an embodiment of the actuator assembly 1040 seen in FIG. 18. As can be seen in this Figure, the two flexures $1070_1$, $1070_3$ extend around the moving part 1060 and pass by the static crimps 1051. The other two flexures $1070_2$, $1070_4$ pass under the crimp support portions 1062 such that when the actuator assembly 1040 is viewed along the primary axis, i.e. when viewed end on as shown in FIG. 5, the crimp support portions 1062 and flexures $1070_2$, $1070_4$ overlap. As will be appreciated, if the flexures $1070_2$, $1070_4$ were instead to be routed around the crimp support portions 1062, this may increase the overall lateral size of the actuator assembly 1040. Therefore, by overlapping the flexures $1070_2$, $1070_4$ and the moving crimps 1061 the footprint of the actuator assembly 1040 is kept to a minimum.

The flexures $1070_2$, $1070_4$ may be separated from the crimp support portions 1062 in a number of different ways.

In FIG. 19, this separation is achieved with a cut-out section or notch 1067 in each of the crimp support portions 1060 which is aligned with the overlapping one of the flexures $1070_2$, $1070_4$. In particular, when viewed along the primary axis, each notch 1067 extends part way across the crimp support portion 1060 and is positioned on the side of the crimp support portion 1060 at which the flexure $1070_2$, $1070_4$ is highest, i.e. is closest to its connection to the moving part 1060.

FIGS. 20A-20D illustrate different sub-embodiments of how the separation between the flexures $1070_2$, $1070_4$ and the crimp support portions 1062 may be achieved. The features of each of these embodiments may be combined with the above-described notch 1067. Each of FIGS. 20A-D show a sectional view through the line A-A seen in FIG. 19.

In the embodiment shown in FIG. 19, the flexures $1070_1$, $1070_2$, $1070_3$, $1070_4$ are mounted off centre with respect to the moving part 1060. Two flexures $1070_1$, $1070_4$ extend from a first flexure connection section $1073_1$ and the other two flexures $1070_2$, $1070_3$ extend from a second flexure connection section $1073_2$. As is apparent from FIG. 19, the first and second flexure connection sections $1073_1$, $1073_2$ are positioned off centre and located on the moving part 1060 closer to the static crimp portions 1051 than the moving crimp portions 1061.

FIGS. 20A-20D show cross sectional views through the line $A_1$-$A_2$ seen in FIG. 19, focusing on the end of the line labelled $A_1$, with various arrangements for providing a separation 1064. The opposite end $A_2$ may have the same arrangement to that seen in at $A_1$ or an alternative arrangement with the flexure $1070_3$ overlapping the crimp support portion 1062. In the cross-sectional view shown in FIG. 20A, it can be seen how the various components are arranged with respect to one another. Starting from the bottom up there is the base component 1400, the static part 1500 and the conductive component 1501. Then there is the moving part 1060 which comprises the spring arm $1070_2$. The crimp support portion 1062 extends from the moving part 1060, and arranged at the end thereof is the moving crimp 1061. In the embodiment shown in FIG. 20A, an underside of the crimp support 1062 comprises a thinned section 1063 where the crimp support 1062 overlaps the spring arm $1070_2$. This thinned section 1063 creates a separation 1064 between the spring arm $1070_2$ and the crimp support portion 1062. As discussed previously this separation 1064 may help to prevent interference between them and prevent the formation of short circuits between the flexure $1070_2$ and the crimp support portion 1062.

Figure 20A:
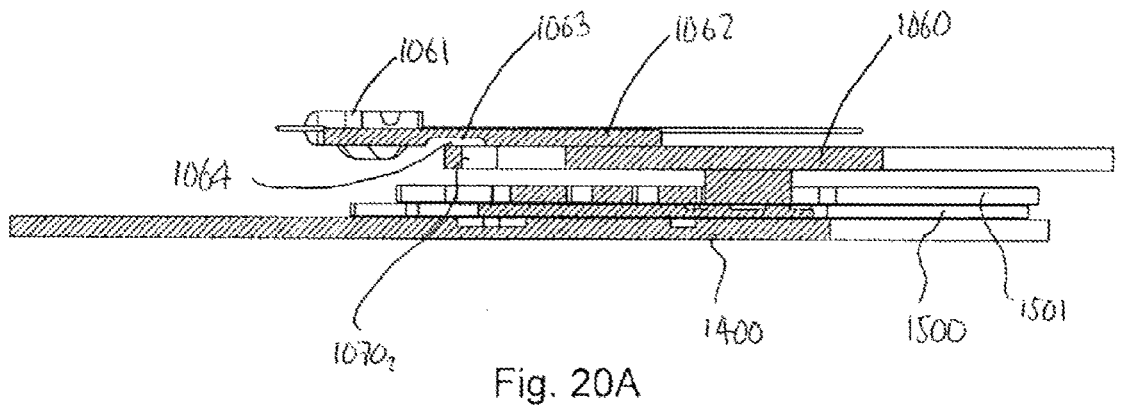
FIGS. 20A-20D illustrate different arrangements for providing a separation between the flexures and the crimp support portions in the actuator assembly seen in FIGS. 18 and 19.
Figure 20B:
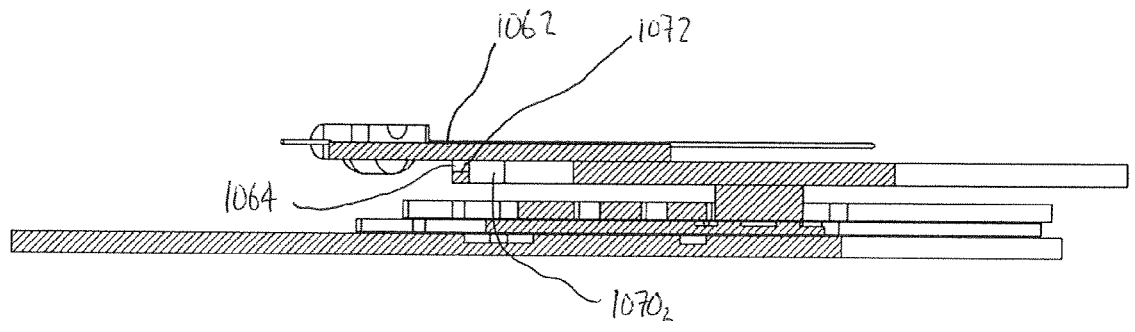
Figure 20C:
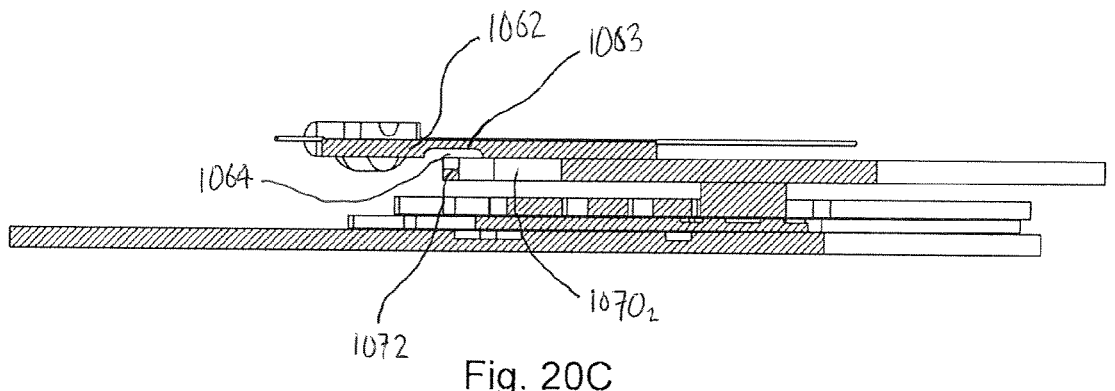
Figure 20D:
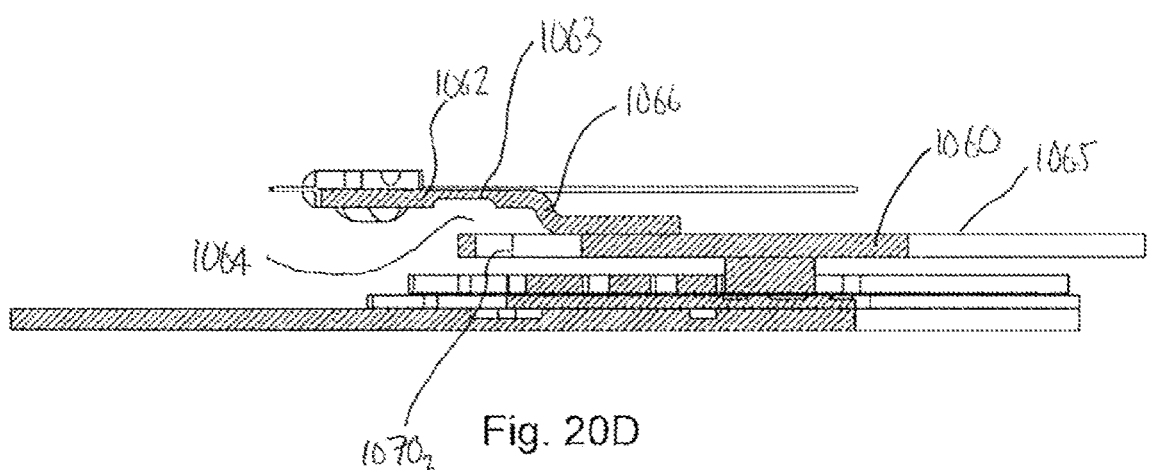

FIGS. 20B to 20D illustrate the same components as those shown in FIG. 20A and so only different features will be discussed. In the sub-embodiment shown in FIG. 20B, instead of a thinned section on the crimp support portion 1062, the flexure $1070_2$ comprises a thinned section 1072. This thinned section 1072 also forms a separation 1064 between the flexure $1070_2$ and the crimp support portion 1062 which may help to avoid interference between them and help to avoid the formation of a short circuit.

FIG. 20C shows a further sub-embodiment wherein the crimp support portion 1062 comprises a thinned section 1063 and the flexure $1070_2$ also comprises a thinned section 1072. These two thinned sections 1063, 1072 together form a separation 1064 which may be increased when compared to only having one thinned section as seen in FIGS. 20A and 20B. Additionally, by having a thinned section in each of the crimp support portion 1062 and flexure $1070_2$ it may be possible to have a shallower thinned section in each of the components thereby potentially reducing the impact the thinned section has on the ability for each component to perform its function. This may be particularly relevant for the flexure $1070_2$ wherein creating a thinned section may impact how the flexure $1070_2$ responds to deformations when the moving part 1060 is moved in use.

FIG. 20D shows another embodiment wherein the crimp support portion 1062 is mounted to an upper surface 1065 of the movable part 1060. This arrangement will serve to move the crimp support portion 1062 along the primary axis and therefore contribute to the separation 1064 between the crimp support portion 1062 and the flexure $1070_2$. As is also visible in this Figure, the crimp support portion 1062 also comprises a section 1066 which extends along the primary axis away from the movable part 1060. This section 1066 also provides the separation 1064 between the crimp support portion 1062 and the flexure $1070_2$. In this embodiment the crimp support portion 1062 also comprises a thinned section 1063 as described in earlier Figures.

Referring back to FIG. 19, the flexures $1070_1$, $1070_3$ which do not overlap the crimp support portions 1062, i.e. those which pass by the static crimp portions 1051 may be formed in order to provide a pre-loading along the primary axis so as to retain the moving part along the bearing surfaces. If the forming is applied to these flexures $1070_1$, $1070_3$, it may not be necessary to apply any specific forming on the other flexures $1070_2$, $1070_4$ which overlap the moving crimp portions 1062. This may help to ensure the separation 1064 is kept to a maximum.

Figure 21:
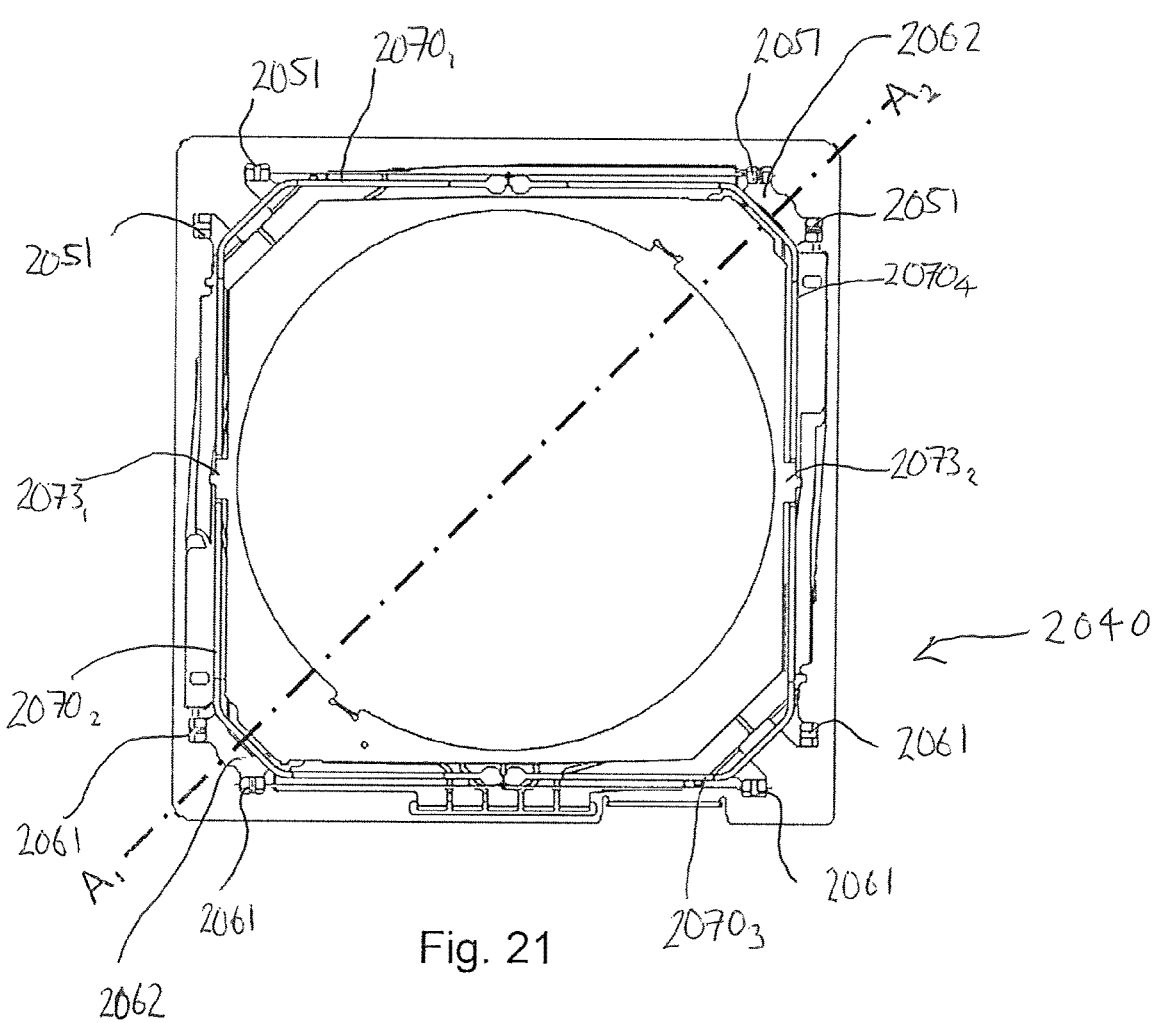
FIG. 21 illustrates a top view of an alternative actuator assembly to the seen in FIG. 18, wherein the flexures overlap on top of the crimp support portions.

FIG. 21 shows a top view of an alternative embodiment of the actuator assembly 2040 seen in FIG. 18. In this embodiment, the actuator assembly 2040 is essentially the same as the actuator assembly seen in FIG. 18, except that the flexure connection sections $2073_1$, $2073_2$ are arranged centrally such that they are equally spaced between the static crimp portions 2051 and moving crimp portions 2061.

In this embodiment, the two flexures $2070_2$, $2070_4$ overlap the crimp support portions 2062 such that the two flexures $2070_2$, $2070_4$ are on top of the crimp support portions 2062. This is contrasted to the embodiment seen in FIG. 19 wherein the flexures $1070_2$, $1070_4$ and crimp support portions 1062 overlap such that the crimp support portions 1062 are on top of the flexures $1070_2$, $1070_4$.

Figure 22A:
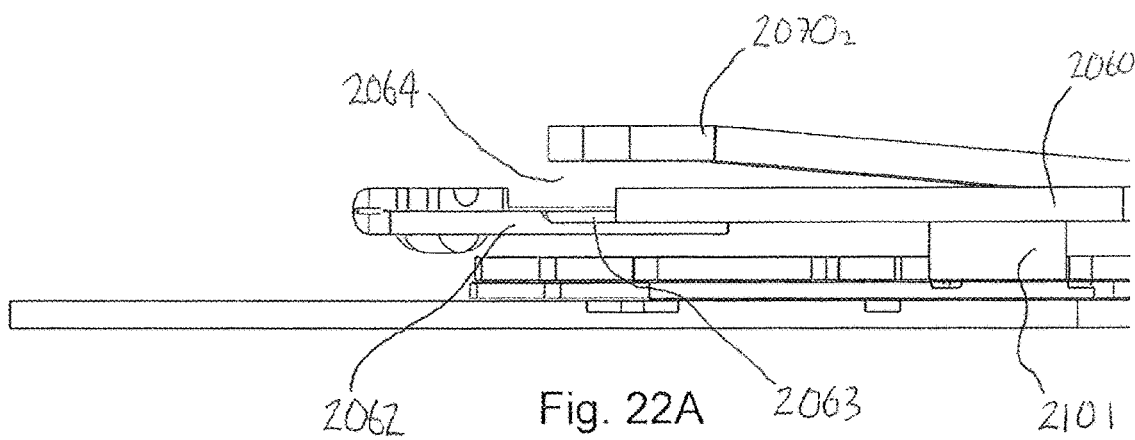
FIGS. 22A-22C illustrate different arrangements for providing a separation between the flexures and the crimp support portions in the actuator assembly seen in FIG. 21.
Figure 22B:
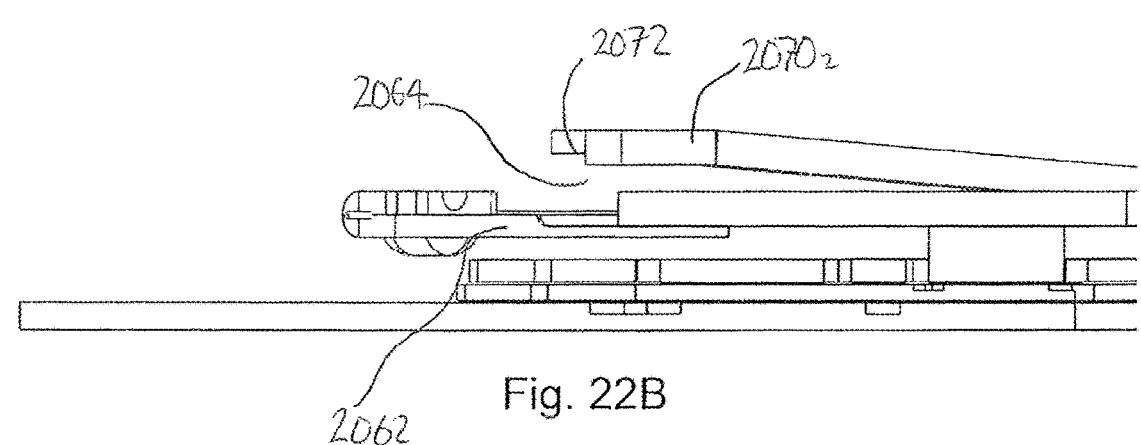
Figure 22C:
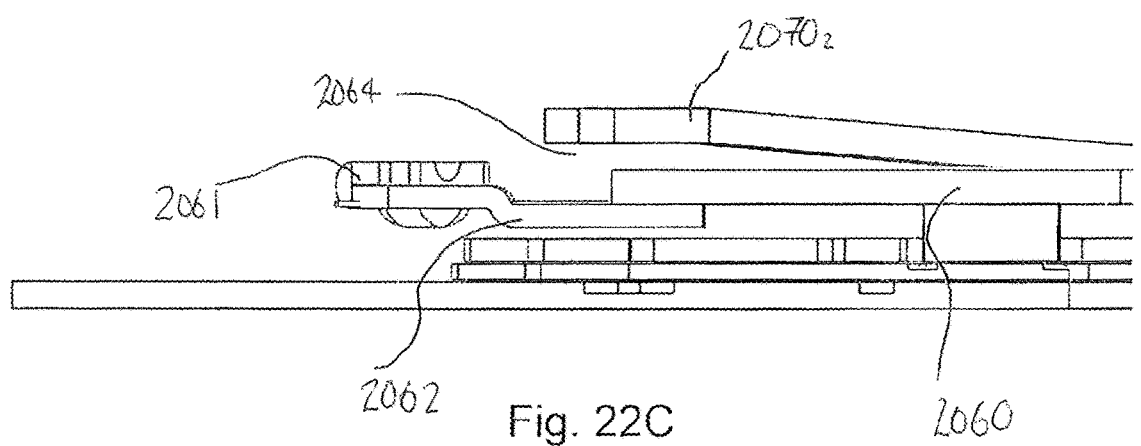

FIGS. 22A-22C show cross sectional views through the line $A_1$-$A_2$ seen in FIG. 21, focusing on the end of the line labelled $A_1$, with various arrangements for providing a separation 2064. The opposite end $A_2$ may have the same arrangement to that seen in at $A_1$ or an alternative arrangement. In each of the different versions shown in FIGS. 22A-22C the flexure $2070_2$ is arched upwards so that at least in the portion overlapping the crimp support portion 2062 the flexure $2070_2$ extends in a different plane to the crimp support portion 2062 to at least partially provide the separation between the flexure $2070_2$ and the crimp support portion 2062. The flexure $2070_2$ may only be arched in this manner in the portion of the flexure $2070_2$ proximal to the crimp support portion 2062.

In at least the embodiment seen in FIG. 22A, the crimp support portion 2062 is also attached to an underside of the moving part 2060. This necessitates in an increase in the height of the bearing 2101 in order to accommodate the crimp support portion 2062 extending from the underside of the moving part. Additionally, in the embodiment seen in FIG. 22A, the crimp support portion 2062 comprises a thinned section 2063 which also contributes to the formation of the separation 2064 between the flexure $2070_2$ and the crimp support portion 2062.

FIG. 22B shows an alternative sub-embodiment which comprises all the features of the embodiment seen in FIG. 22A. Additionally, in this sub-embodiment, the flexure $2070_2$ comprises a thinned section 2072 which also contributes to the formation of the separation 2064.

FIG. 22C shows a further sub-embodiment which achieves a separation 2064 between the flexure $2070_2$ and crimp support portion 2062. In this embodiment, the crimp support portion 2062 is attached entirely on a bottom surface of the movable part 2060. In order to ensure that the movable crimps 2061 are in the appropriate position along the primary axis, the crimp support portion 2062 initially extends in a direction perpendicular to the primary axis, away from the movable part 2060, and then, once it no longer overlaps with the flexure $2070_2$, the crimp support portion 2062 extends upwards partially along the primary axis in order to ensure that the moving crimps 2061 sits in the correct plane.

Figure 23A:
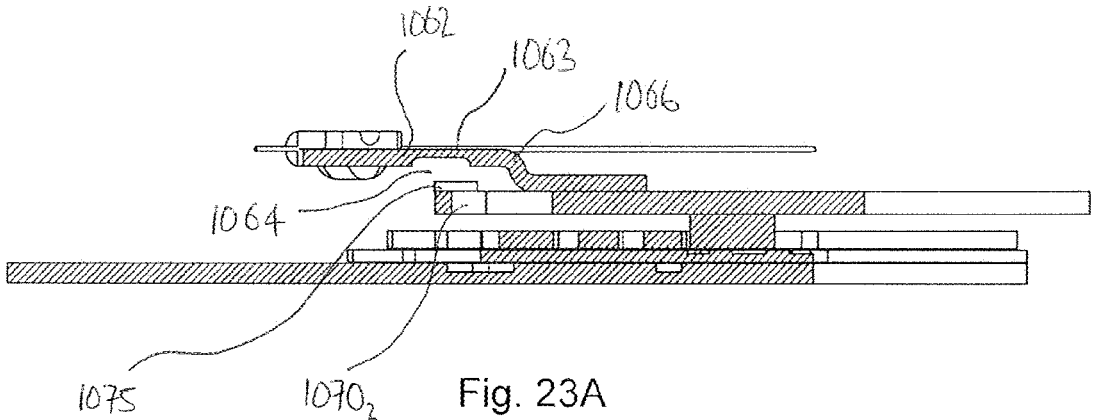
FIGS. 23A-23C show different arrangements of an insulation layer arranged on the flexure, the crimp support portion and on both the flexure and crimp support portion.

FIG. 23A shows a variation on the embodiment seen in FIG. 20D. In addition to the thinned section 1063 and the section 1066 which extends along the primary axis away from the movable part 1060 to form the separation 1064 between the flexure $1070_2$ and the crimp support portion 1062, an insulation layer 1075 is also arranged on top of the flexure $1070_2$. The insulation layer 1075 is arranged on a surface of the flexure $1070_2$ which faces the crimp support portion 1062. This insulation layer 1075 may provide a further means for preventing the formation of a short circuit between the flexure $1070_2$ and the crimp support portion 1062. In this and other embodiments, a further insulation layer may be provided on the surface of the flexure which faces the static part so as to prevent the formation of a short circuit to the static part (or to component(s) mounted thereon). As will be appreciated, insulation layers on two surfaces of a flexure may be formed by way of a single process, e.g. by coating the flexure.

Figure 23B:
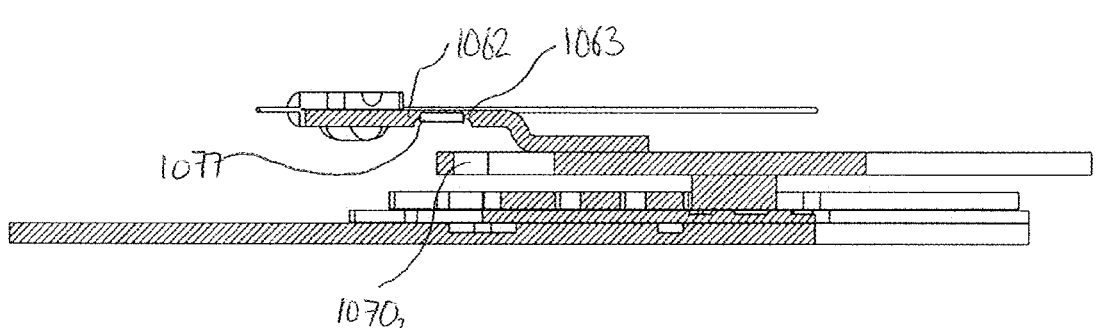

FIG. 23B shows a variation on the embodiment seen in FIG. 23A, and is identical, except that instead of the insulation layer 1075 being arranged on the flexure $1070_2$ as seen in FIG. 23A, an insulation layer 1077 is arranged on the crimp support portion 1062. In this variation, the insulation layer 1077 is arranged in the thinned section 1063 on a surface which faces the flexure $1070_2$. Similarly to the insulation layer 1075 seen in FIG. 23A, the insulation layer 1077 may also provide a further means for preventing the formation of a short circuit between the flexure $1070_2$ and the crimp support portion 1062.

Figure 23C:
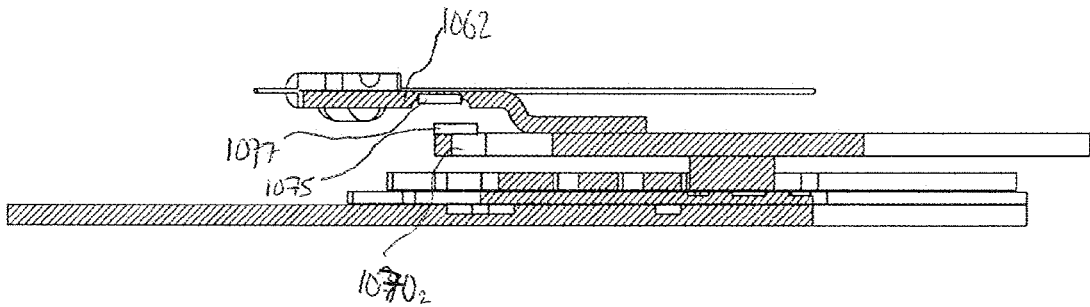

FIG. 23C shows a further variation which is effectively a combination of the embodiments seen in FIGS. 23A and 23B. In this embodiment both the insulation layer 1075 provided on the flexure $1070_2$ and the insulation layer 1077 provided on the crimp support 1062 are included. The inclusion of both insulation layers 1075, 1077 may further reduce the possibility of a short circuit forming between the crimp support 1062 and the flexure $1070_2$.

Whilst the insulation layers 1075, 1077 described above are shown on the embodiment of the actuator assembly depicted in FIG. 20D, the insulation layers 1075, 1077 may be included in any of the embodiments described herein.

FIGS. 24-30 show top views of different movable parts 3060, with up to four flexures $3070_1$, $3070_2$, $3070_3$, $3070_4$ and some which have different arrangements of the flexures $3070_1$, $3070_2$, $3070_3$, $3070_4$ around the primary axis. Where present, each flexure $3070_1$, $3070_2$, $3070_3$, $3070_4$ comprises a corresponding foot $3071_1$, $3071_2$, $3071_3$, $3071_4$. The flexures $3070_1$, $3070_2$, $3070_3$, $3070_4$, where present, are connected to the movable part 3060 by up to four flexure connection sections $3073_1$, $3073_2$, $3073_3$, $3073_4$. Whilst each of the movable parts 3060 is technically an eight-sided polygon, due to their specific proportions, each movable part may be approximated to be a square having four corners. For ease of reference, whilst each of the embodiments in FIGS. 24-30 are different, the various components are given the same reference numeral.

Figures 24A, 24B:
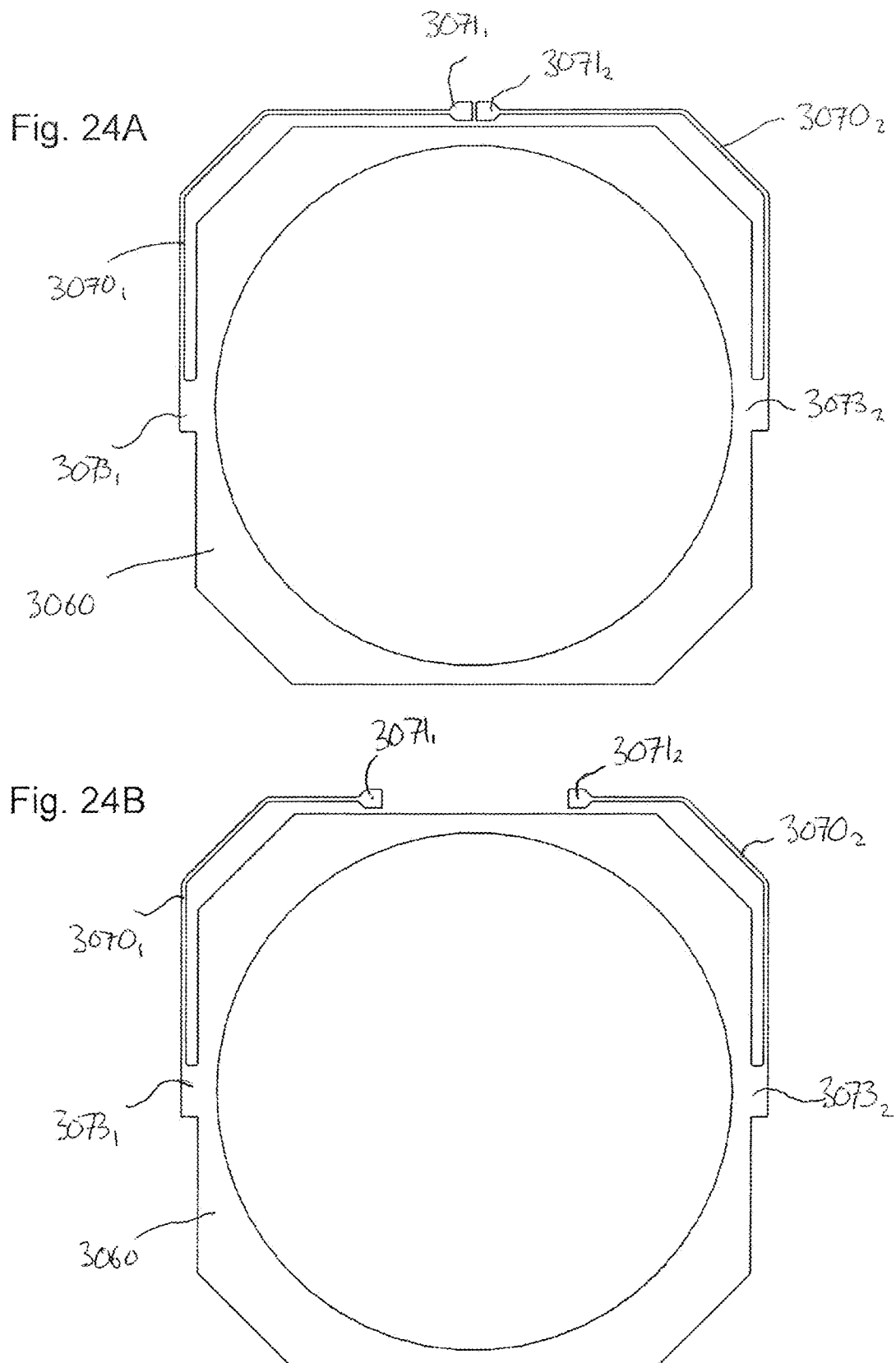
FIGS. 24A-B show two different embodiments of a movable part with two flexures.

FIG. 24A shows a movable part 3060 comprising two flexures $3070_1$, $3070_2$ which extend around two corners of the movable part 3060. The flexures $3070_1$, $3070_2$ are arranged and extend such that their feet $3071_1$, $3071_2$ come together to meet one another. As will be appreciated by those skilled in the art, and with reference to earlier Figures, one of the corners around which one of the flexures $3070_1$, $3070_2$ extend may comprise a crimp support portion. FIG. 24B shows a similar embodiment except that the feet $3071_1$, $3071_2$ are separated by a small amount. Table 1 (below) shows stiffness data in relation to the movable part 2060 seen in FIG. 24A.

flexures $3070_1$, $3070_2$ together extend ~360° around the primary axis. In the illustrated example, each of the flexures $3070_1$, $3070_2$ start and end midway between two corners and are arranged with two-fold rotational symmetry. Other examples need not have one or both of these characteristics. Table 1 (above) shows stiffness data for the movable part 2060 seen in FIG. 25.

Figure 26:
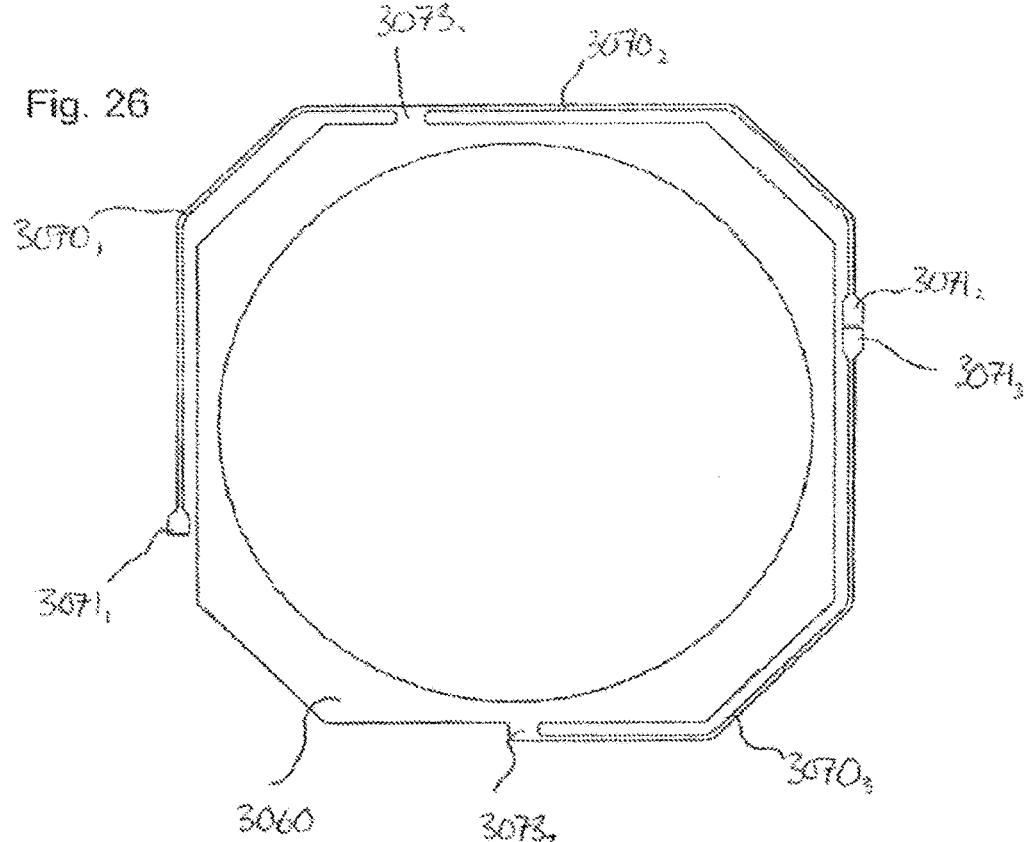
FIG. 26 shows an embodiment of a movable part with three flexures.

FIG. 26 shows a movable part 3060 which comprises three flexures $3070_1$, $3070_2$, $3070_3$. As can be seen in this Figure, the three flexures $3070_1$, $3070_2$, $3070_3$ extend around over 270° around the primary axis. Table 1 (above) shows stiffness data in relation to the movable part 3060 seen in FIG. 26. As can be seen in the table, the ratio of the static diagonal stiffness and the moving diagonal stiffness is 1.29 and thus less than the ratio required by the third aspect of the invention. This is also true for the ratio of the stiffnesses in the x and y directions.

Figures 27A, 27B:
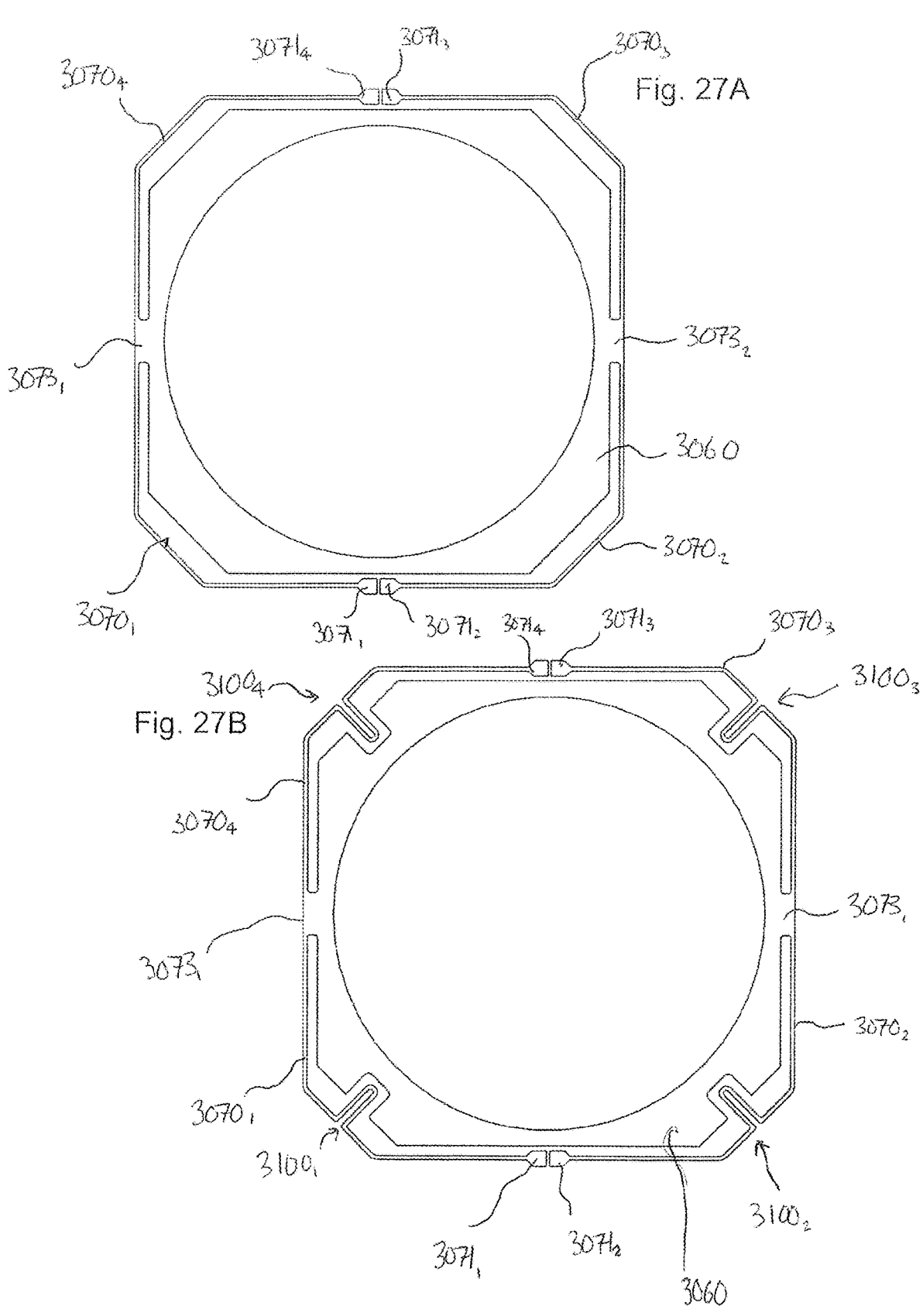

FIG. 27A shows a movable part 3060 which comprises four flexures $3070_1$, $3070_2$, $3070_3$, $3070_4$ that are arranged to have both two-fold mirror symmetry and four-fold rotational symmetry. FIG. 27B shows a movable part 3060 which comprises four flexures $3070_1$, $3070_2$, $3070_3$, $3070_4$ having the same general arrangement as seen in FIG. 27A, with the difference being that each of the flexures $3070_1$, $3070_2$, $3070_3$, $3070_4$ comprises a respective inward kinked portion $3100_1$, $3100_2$, $3100_3$, $3100_4$. FIG. 27C shows another movable part 3060 which comprises four flexures $3070_1$, $3070_2$, $3070_3$, $3070_4$ having the same general arrangement as seen in FIG. 27A, with the difference being that each of the flexures $3070_1$, $3070_2$, $3070_3$, $3070_4$ comprises a respective outward kinked portion $3100_1$, $3100_2$, $3100_3$, $3100_4$. Table 1 (above) shows stiffness data for the movable parts 3060 seen in FIGS. 27A, 27B and 27C.

FIG. 28 shows a movable part 3060 which comprises four flexures $3070_1$, $3070_2$, $3070_3$, $3070_4$, wherein one pair of flexures $3070_1$, $3070_4$, share a common connection section $3073_1$, and wherein the other pair of flexures $3070_2$, $3070_3$ share another common connection section $3073_2$. Additionally, the connection sections $3073_1$, $3073_2$ are offset such that each of the connection sections $3073_1$, $3073_2$ is closer to one of the corners of the movable part than another corner. Table 1 (above) shows stiffness data for the movable member 3060 seen in FIG. 28.

TABLE 1

Finite element analysis data for the stiffnesses
(in N/m) along various directions in the movement
plane and the diagonal stiffness ratio of several of
the arrangements shown in the drawings.

| | | | | | FIG. | | | | | |
|---|---|---|---|---|---|---|---|---|---|---|
| | 24A | 25 | 26 | 27A | 27B | 27C | 28 | 29 | 30 | 31 |
| X stiffness | 607.7 | 70 | 690 | 664.6 | 649.2 | 418.5 | 1116.9 | 658.5 | 1109 | 326.2 |
| X stiffness (unconst.) | 320.8 | 69 | 436 | 664.6 | 0 | 0 | 0 | 658.5 | 1109 | 142.8 |
| Y stiffness | 116.5 | 10 | 685 | 661.5 | 661.5 | 415.4 | 1109.2 | 660 | 1120 | 329.2 |
| Y stiffness (unconst.) | 116.0 | 10 | 667 | 661.5 | 0 | 0 | 0 | 660 | 1120 | 144.2 |
| Static diag. stiff. | 153.6 | 38 | 598 | 657.1 | 647.3 | 417.7 | 1116.1 | 660.3 | 1118 | 81.81 |
| Moving diag. stiff. | 153.5 | 42 | 772 | 657.1 | 645.1 | 416.6 | 1116.1 | 660.3 | 1120 | 571.1 |
| Diag. stiff. ratio | 0.999 | 1.11 | 1.29 | 1 | 0.997 | 0.997 | 1 | 1 | 1.002 | 6.981 |

Figure 25:
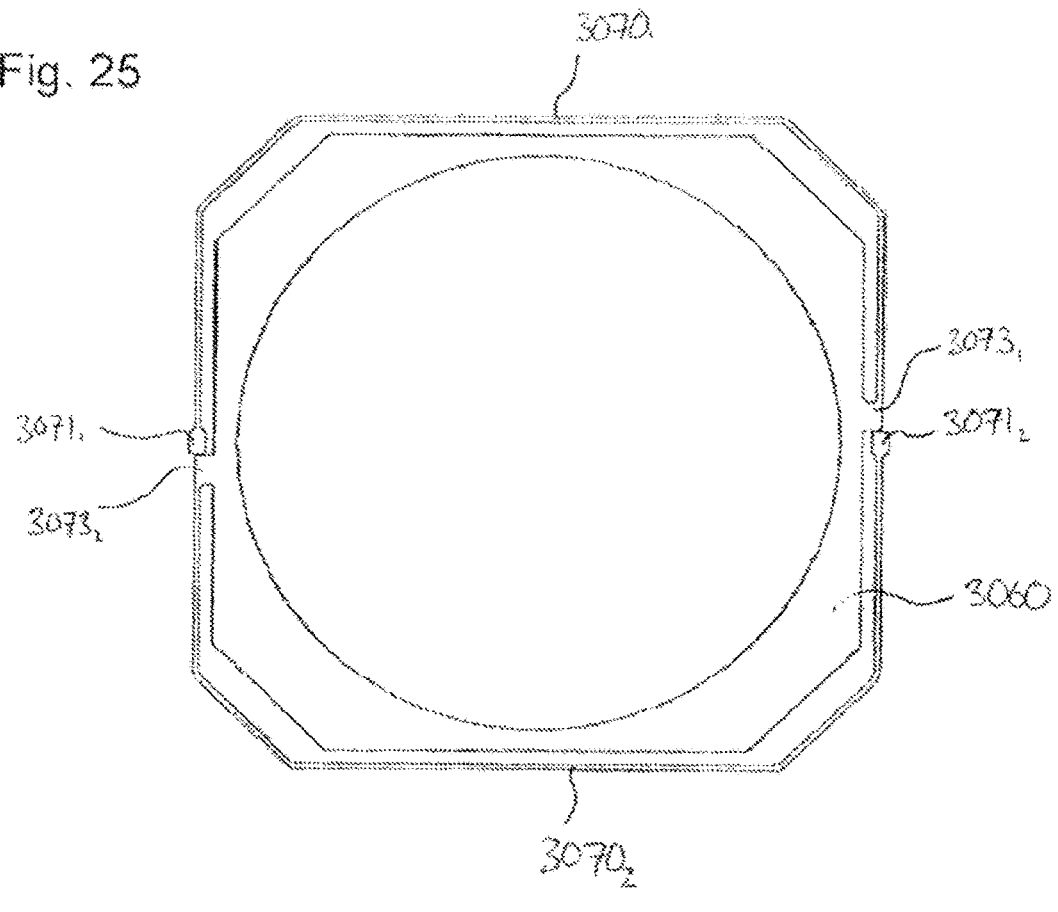
FIG. 25 shows an embodiment of a movable part with two flexures which together encompass the entire movable part.
Figure 29:
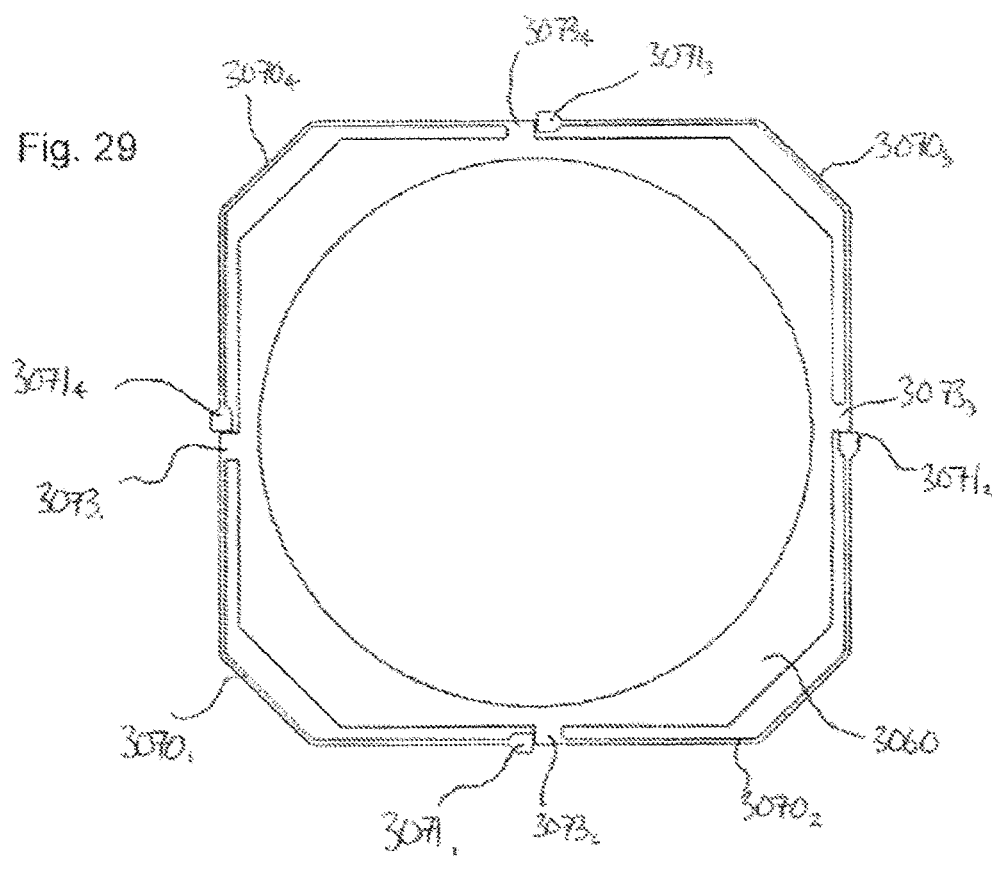
FIG. 29 shows another embodiment of a movable part with four flexures.

FIG. 25 shows a movable part 3060 comprising two flexures $3070_1$, $3070_2$ each of which extends around two corners of the movable part 3060 and wherein the two FIG. 29 shows a top view of a movable part 3060 which comprises four flexures $3070_1$, $3070_2$, $3070_3$, $3070_4$ each of which is connected to the movable part 3060 by an individual respective connection section $3073_1$, $3073_2$, $3073_3$, $3073_4$. The connection sections $3073_1$, $3073_2$, $3073_3$, $3073_4$ are arranged centrally between respective corners of the movable part 3060 and the four flexures $3070_1$, $3070_2$, $3070_3$, $3070_4$ together extend 360° around the primary axis. Table 1 (above) shows stiffness data relating to the movable part 3060 seen in FIG. 29.

Figure 30:
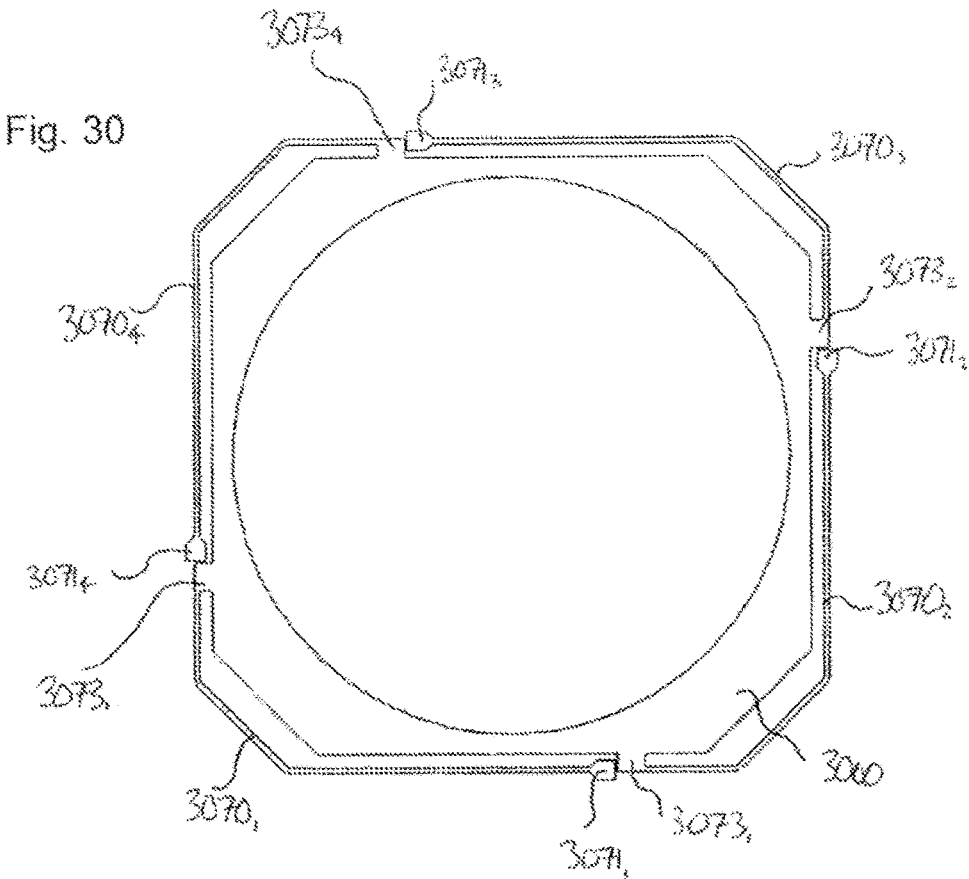
FIG. 30 shows another embodiment of a movable part which comprises four flexures.

FIG. 30 shows a top view of a movable part 3060 which comprises four flexures $3070_1$, $3070_2$, $3070_3$, $3070_4$ each of which is connected to the movable part 3060 by an individual respective connection section $3073_1$, $3073_2$, $3073_3$, $3073_4$. However, unlike the example shown in FIG. 29, the connection sections $3073_1$, $3073_2$, $3073_3$, $3073_4$ are offset such that they are not equally spaced between corners of the movable part. Table 1 (above) shows stiffness data for a movable part 3060 as seen in FIG. 30.

As can be seen from the data in Table 1 for FIGS. 27-30, all of which correspond to movable parts 3060 which comprise at least four flexures $3070_1$, $3070_2$, $3070_3$, $3070_4$, taking the stiffness for each of the X and Y directions these two axis satisfy the ratio requirement of the third aspect of the invention, and additionally taking the stiffness for each of the static and moving diagonals satisfy the ratio requirement of the third aspect of the invention. For reference, the moving diagonal is the direction which corresponds to moving the movable part, and thus the flexures, in the direction of the moving crimps, and the static diagonal is the direction which corresponds to moving the movable part, and thus the flexures, in the direction towards the static crimps. Due to the configuration of the flexures in these embodiments, the ratio of the stiffnesses in the static and moving diagonals will be the highest, and thus the ratio of stiffnesses of any other pair of orthogonal axis will be less than the ratio for the static and moving diagonals. Therefore, these other orthogonal axes will also satisfy the requirement of the third aspect of the invention. These tables therefore demonstrate the improved symmetry of the of the stiffness in the movement plane.

In any of the embodiments with two feet that are adjacent to each other (see e.g. FIGS. 24A, 26-28), these feet may be provided separately, as illustrated, or may be combined in a single, unitary foot. Each of these options may have its respective advantages in relation to e.g. noise, ease of manufacture, etc.

Figure 31:
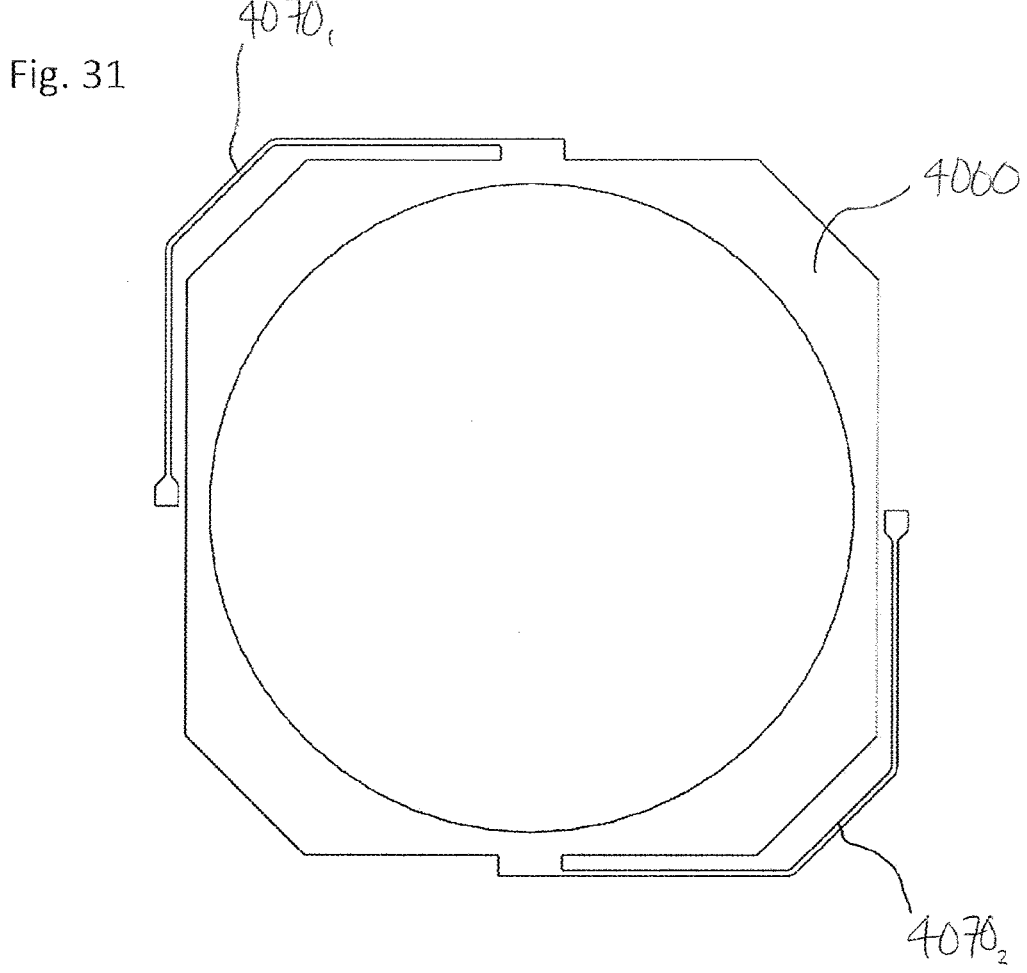
FIG. 31 shows an example of a movable part with two flexures which do not overlap moving crimp portions.

FIG. 31 shows a movable part 4060 which comprises only two flexures $4070_1$, $4070_2$ which do not overlap moving crimp portions. Table 1 (above) shows stiffness data for the movable part 4060 seen in FIG. 31. As is apparent from this table, the ratio of the diagonal stiffnesses is greater than the ratio required by the third aspect of the invention, and is significantly greater than the movable parts 3060 described above in accordance with the present invention.

Further Details of the Known Actuator Assembly

Figure 32:
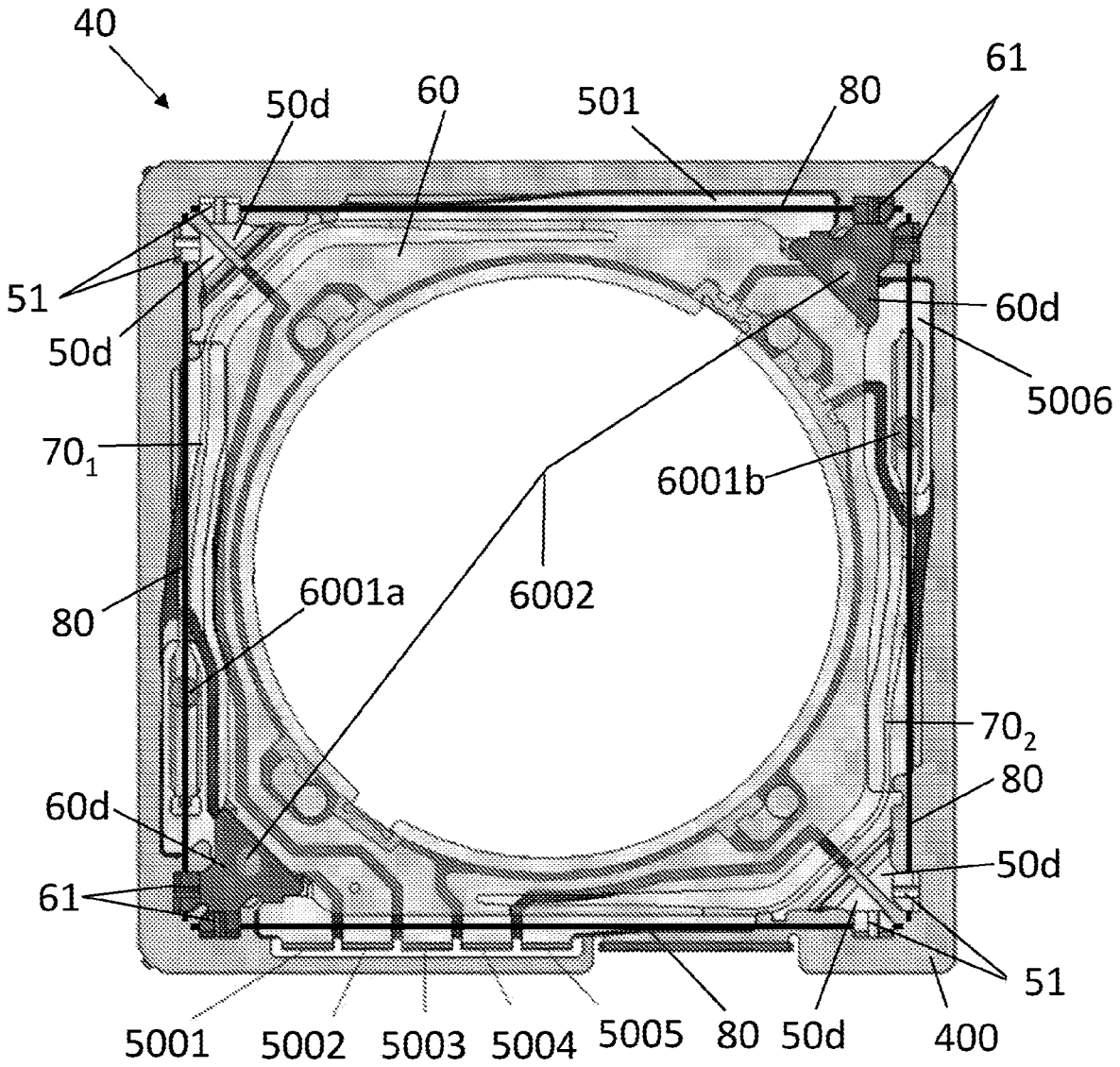
FIG. 32 is a top view of the SMA actuator assembly of FIG. 1.
Figure 33:
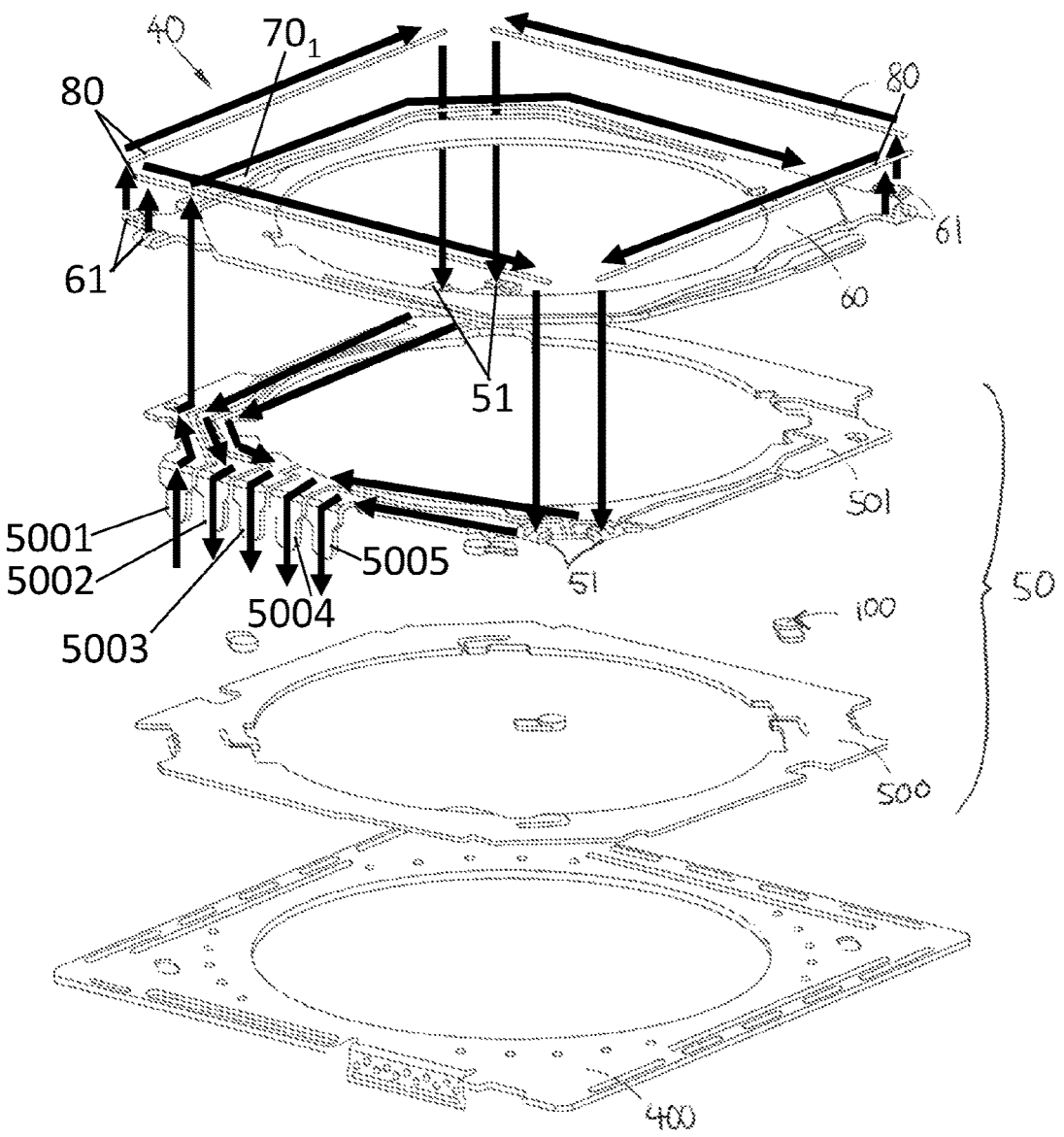
FIG. 33 is an exploded perspective view of the SMA actuator assembly of FIG. 1 showing current flow.
Figure 34:
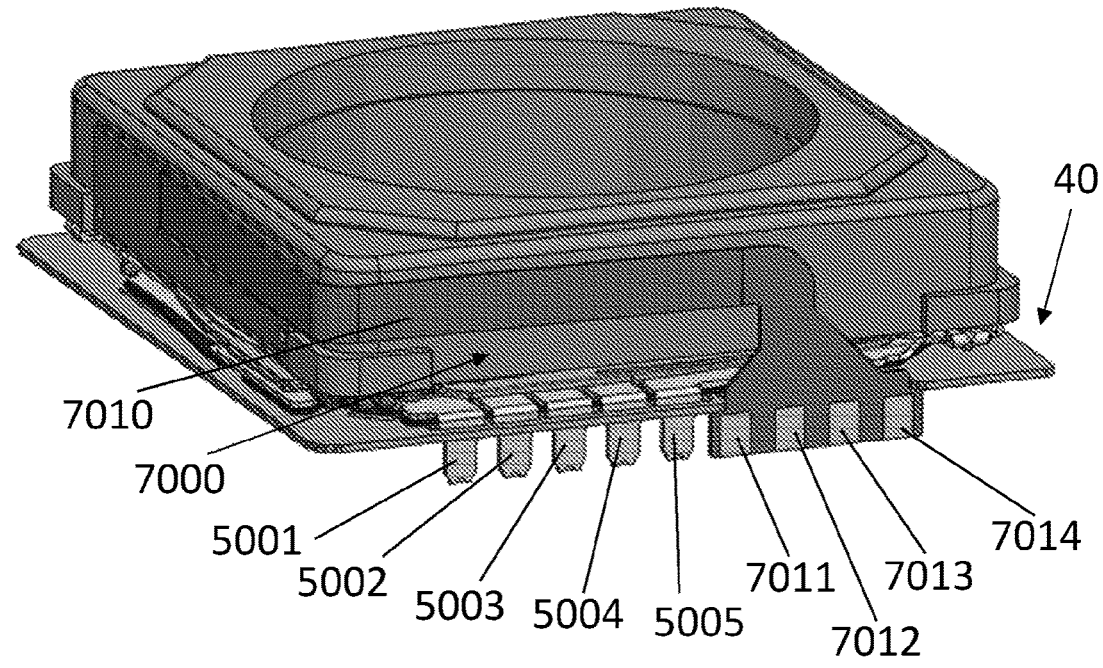
FIG. 34 is a perspective view of a VCM AF actuator assembly mounted on the SMA actuator assembly of FIG. 1.
Figures 35, 36, 37:
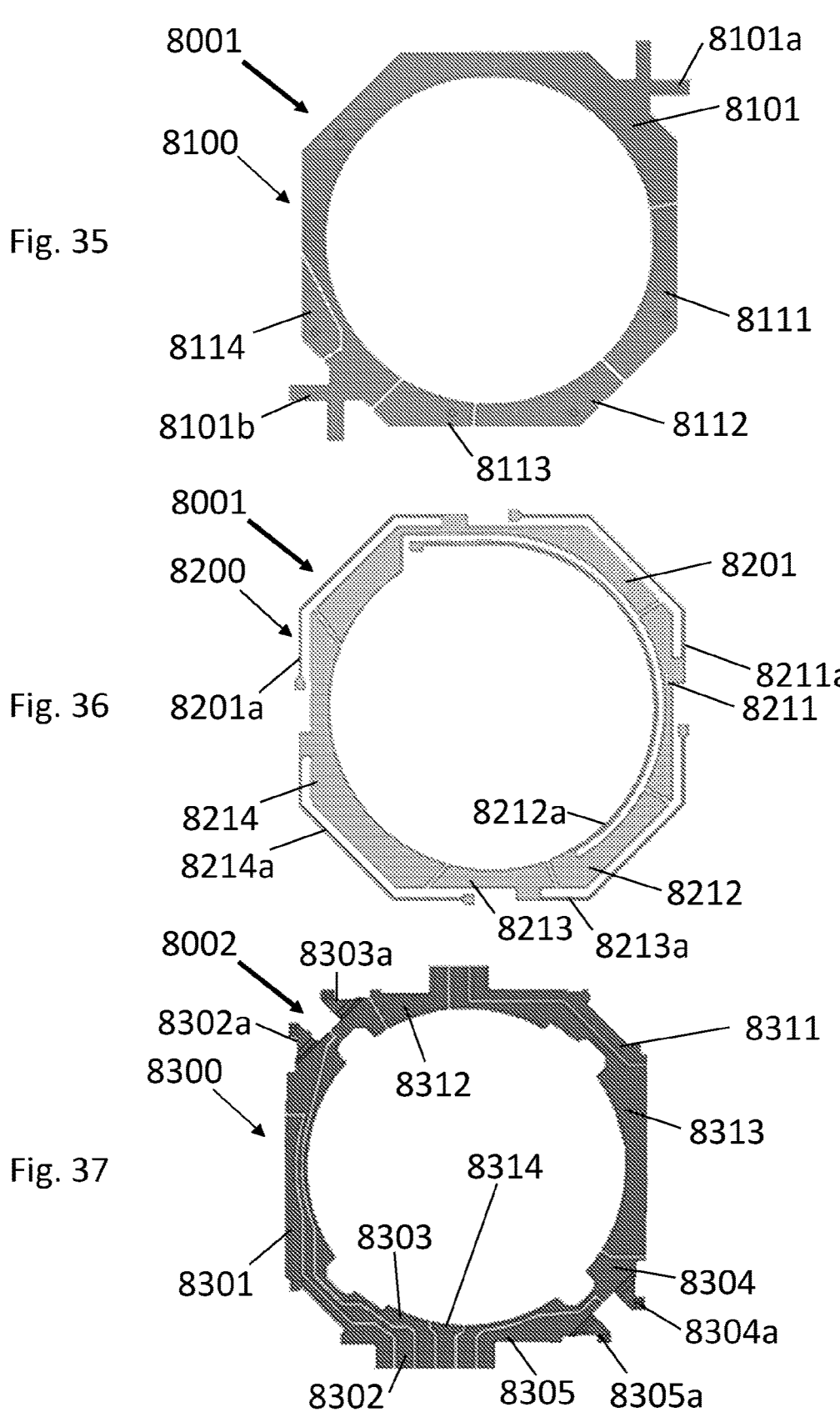
FIGS. 35-37 are top views of components of a further embodiment of an SMA actuator assembly.

Referring in particular to FIGS. 32 to 34, the known actuator assembly 40 will now be described in further detail so as to aid understanding of the embodiments described below.

As described above with reference to FIGS. 1, 2A and 2B, this actuator assembly 40 includes a base component 400, a movable part 60 (also referred to herein as a 'moving platform'), and a static part 50 (also referred to herein as a 'support platform'). The static part 50 includes two separate components, i.e. a support component 500 and a conductive component 501, which are affixed to each other. The actuator assembly 40 also includes four SMA wires 80, each mechanically and electrically connected at one end to the static part 50 (specifically, the conductive component 501)

via so-called static crimps 51, and at the other end to the movable part 60 via so-called moving crimps 61.

Two flexures 70, i.e. first and second flexures $70_1$, $70_2$, are connected between the static part 50 and the moving part 60. In this example, the flexures 70 are formed integrally with the moving part 60 at one end thereof and are connected to the static part 50 at the other end thereof by welds 6001a, 6001b or any other suitable means for providing both mechanical and electrical connections. However, the flexures 70 can instead be integrally formed with the static part 50 or indeed be provided as independent parts.

The static crimps 51 and the moving crimps 61 are provided on the static part 50 and the moving part 60, respectively, via crimp supports 50d, 60d. In this example, the static crimp supports 50d, which each include one static crimp 51, are integral with the static part 50, and the moving crimp supports 60d, which each include two moving crimps 61, are separate components attached to the moving part 60 by welds 6002 or other suitable means for providing both mechanical and electrical connections.

As described above with reference to FIG. 18, whilst the movable part 60 is technically an eight-sided polygon, due to its proportions, the movable part 60 can be considered to have a square shape with four corners. The moving crimps 61 are arranged on two diagonally-opposite corners of the moving part 60 and the static crimps 51 are arranged on the other two corners on the static part 50.

The conductive component 501 of the static part 50 is split into six separate segments 5001-5006. A first segment 5001 (hereinafter referred to as the 'common static segment') is electrically and mechanically connected to a first end of the flexure $70_1$ via a weld 6001a and has a terminal at one end for electrically connecting to the integrated circuit (IC) 30. A second segment 5006 is connected to a first end of the second flexure $70_2$ via a weld 6001b. In this embodiment, the second flexure $70_2$ performs only a mechanical (i.e. biasing) function. In other embodiments, the second flexure $70_2$ may also perform an electrical function similar to the first flexure $70_2$. The remaining four segments 5002-5005 (hereinafter referred to as the 'wire segments') each have a terminal at one end for connecting to the IC 30 and a static crimp 51 at the other end. Each segment 5001-5006 is electrically isolated from each other within the conductive component 501. In other words, each segment 5001-5006 provides a separate current path within the conductive component 501.

The base component 400, the movable part 60, and the static part 50 (i.e. the support component 500 and the conductive component 501) may each take the form of a patterned sheet of metal, e.g. etched or machined stainless steel, and may each be coated with an electrically-insulating dielectric material. The dielectric coating or other type of dielectric layer may include one or more windows allowing electrical connections therethrough.

Instead of the welds 6001a and 6001b, any other suitable means for providing mechanical and electrical connections can be used to connect the segments 5001, 5006 and the flexures $70_1$, $70_2$.

The conductive component 501, the flexures 70, the movable part 60, the crimp supports 50d, 60d, the crimps 51, 61, and the SMA wires 80 are electrically connected. Thus, as illustrated in FIG. 33, when the terminals of the common static segment 5001 and the terminals of the wire segments 5002-5005 are connected to the IC 30, current from the IC 30 can flow through the current paths provided by the segments 5001-5005, the flexure $70_1$, the movable part 60, the crimp supports 50d, 60d, the crimps 51, 61, and the SMA wires 80. More specifically, current from the IC 30 can flow through the common static segment 5001 and the first flexure 70₁ 'up' to the movable part 60, and can flow 'down' to the IC 30 through one or more of the four SMA wires 80 and corresponding wire segment(s) 5002-5005 of the static part 50. This arrangement allows the IC 30 to control the amount of current that flows through each of the SMA wires 80 and thus allows the IC 30 to control the length of each SMA wire 80 so as to move the movable part 60 with respect to the static part 50 as described above. As will be appreciated, the current may flow in either direction.

As described above with reference to FIG. 1, the moving part 60 supports the lens assembly 20 and is connected to the lens carriage 21. Moreover, an axial actuator arrangement 24, provided between the lens carriage 21 and the lens holder 23, is arranged to drive movement of the lens holder 21 and the lenses 22 along the optical axis O relative to the lens carriage 21 for focusing incoming light onto the image sensor 6 of the camera module 1. The axial actuator arrangement 24 can be of any suitable type, for example a voice coil motor (VCM) or an arrangement of SMA wires. Hereinafter, the elements 21, 23, 24 will be collectively referred to as an autofocus (AF) actuator assembly 7000. However, as will be appreciated, the actuator assembly 7000 may perform functions other than AF.

FIG. 34 shows an AF actuator assembly 7000 in the form of a closed-loop VCM AF actuator assembly mounted on the moving part 60 of the SMA actuator assembly 40 such that the AF actuator assembly 7000 moves with the moving part 60. A flexible printed circuit (FPC) 7010 electrically connects the AF actuator assembly 7000 to its control circuitry, e.g. the IC 30.

In this example, the FPC 7010 includes four electrical connections 7011-7014. These connections 7011-7014 can include a power connection, a ground connection and two data connections (e.g. so-called Vdd, Vss, SDA and SCL connections).

Using an FPC for electrical connections between the AF actuator assembly 7000 and the IC 30 can have certain disadvantages. For example, since the FPC needs to fit within the camera module housing without hindering OIS and/or AF performance, e.g. by obstructing movement of the lens carriage, an accurately formed FPC can be required, and a complicated camera module assembly process can be required. Since both the AF actuator assembly and the FPC need to fit within the camera module housing, stricter size limitations (e.g. smaller lateral dimension limitations) may need to be applied to the AF actuator assembly to provide sufficient room for the FPC. The FPC can also increase the camera module bill of material (BOM) cost.

Further Embodiment of an SMA Actuator Assembly

Referring to FIGS. 35 to 42, a further embodiment of an SMA actuator assembly 8000 will now be described. When combined with an AF actuator assembly 7000' such as the one described above with reference to FIG. 34, the actuator assembly 8000 eliminates the need to use an FPC to electrically connect the AF actuator assembly 7000' and the IC 30.

The actuator assembly 8000 is substantially the same as the above-described known actuator assembly 40 except for the differences described below.

Like the known actuator assembly 40, the actuator assembly 8000 includes a static part 8002 (formed of a conductive component 8300 and a support component (not shown)), a movable part 8001, and a set of flexures connected therebetween. However, as will be explained in more detail below, the actuator assembly 8000 has five such flexures.

Also like the known actuator assembly 40, the actuator assembly 8000 has current paths (hereinafter referred to as 'OIS current paths' 8000a) provided in the static part 8002, the flexures, and the movable part 8001 for driving the SMA wires 80'. However, the actuator assembly 8000 includes four further current paths (hereinafter referred to as 'AF current paths' 8000b). The AF current paths 8000b are also provided in (e.g. run via, through or on) the static part 8002, the flexures, and the movable part 8001. The AF current paths 8000b allow the AF actuator 7000' to be electrically connected to the IC 30 via the SMA actuator assembly 8000 rather than e.g. via an FPC. This is achieved by:

- having five flexures 8201a, 8211a, 8212a, 8213a, 8214a electrically and mechanically connecting the static part 8002 and the movable part 8001, as opposed to the two flexures 70₁, 70₂ of the known actuator assembly 40;
- having the conductive component 8300 of the static part 8002 divided into nine segments 8301-8305, 8311-8314, as opposed to the six segments 5001-5006 of the known actuator assembly 40; and
- having the movable part 8001 divided into five segments 8101/8201, 8111/8211, 8112/8212, 8113/8213, 8114/8214, as opposed to the undivided movable part 60 of the known actuator assembly 40.

The five flexures include one flexure 8201a (hereinafter referred to as the 'common flexure') that forms part of the OIS current paths 8000a. The remaining four flexures 8211a-8214a (also referred to herein as the 'AF-connecting flexures') each form part of one of the AF current paths 8000b. In the illustrated embodiment, the five flexures 8201a, 8211a-8214a are integrally formed with the moving part 8001. However, one or more of the five flexures 8201a, 8211a-8214a could instead be integrally formed with the static part 8002 or indeed be provided as independent parts.

As mentioned above, the conductive component 8300 of the static part 8002 is split into nine segments 8301-8305, 8311-8314. Like the conductive component 501 of the known actuator assembly 40, the conductive component 8300 includes one 'common static segment' 8301 and four 'wire segments' 8302-8305 forming part of the OIS current paths 8000a. The common static segment 8301 is electrically and mechanically connected to a first end of the common flexure 8201a via a connection (e.g. weld) 9101 and has a terminal for electrically connecting to the IC 30; and the wire segments 8302-8305 each have a terminal at a first end for connecting to the IC 30 and a static crimp 8302a-8305a at a second end.

The conductive component 8300 includes four further segments 8311-8314 (hereinafter referred to as 'static AF segments'). Each static AF segment 8311-8314 forms part of one of the AF current paths 8000b. Each static AF segment 8311-8314 includes a terminal for electrically connecting to the IC 30, and a connection (e.g. weld) 9111-9114 for mechanically and electrically connecting to a first end of a respective flexure 8211a-8214a. As in the known actuator 40, the segments 8301-8305, 8311-8314 of the conductive component 8300 are electrically isolated from each other within the conductive component 8300.

As mentioned above, the movable part 8001 is split into five segments 8101/8201, 8111/8211, 8112/8212, 8113/8213, 8114/8214. A first segment 8101/8201 (hereinafter referred to as the 'movable common segment') is electrically and mechanically connected to a second end of the common flexure 8201a. The remaining four segments 8111/8211, 8112/8212, 8113/8213, 8114/8214 (hereinafter referred to as 'movable AF segments') are each electrically and mechanically connected to a second end of one of the AF-connecting flexures 8211*a*-8214*a*. Hence the movable AF segments 8111/8211, 8112/8212, 8113/8213, 8114/8214 each form part of one of the AF current paths 8000*b*.

In the illustrated embodiment, the movable part 8001 includes an upper layer 8100 (hereinafter referred to as the 'crimp layer') and a lower layer 8200 (hereinafter referred to as the 'flexure layer'). The crimp layer 8100 includes the moving crimps 8101*a*, 8101*b*, and the flexure layer 8200 includes connections to the flexures 8201*a*, 8211*a*-8214*a*. The segments 8101, 8111-8114 of the crimp layer 8100 are electrically isolated from each other within the crimp layer 8100. The segments 8201, 8211-8214 of the flexure layer 8200 are electrically isolated from each other within the flexure layer 8200. The layers 8100, 8200 (in particular corresponding segments of the layers, e.g. segments 8101 and 8201) are mechanically and electrically connected to each other via connectors (e.g. welds) 9201, 9211-9214 (see FIG. 39) passing through windows in an insulating layer (not shown). Hence, due also to the arrangement (e.g. overlap) of the segments 8101, 8111-8114, 8201, 8211-8214, the movable part 8200 forms an integral structure. The insulating layer between the crimp layer 8100 and the flexure layer 8200 may be formed, for example, by coating at least one of the layers 8100, 8200. The coating may be a polymer coating or it may be a coating such as DLC or CrC-DLC. This latter type of coating may be thin, hard wearing, and low friction and may also be used as part of the bearing arrangements involving the plain bearings 100. Instead of welds, the connectors 9201, 9211-9214 may involve solder, conductive adhesive, or a pressure and heat sensitive conductive film such as ACF.

Figure 47:
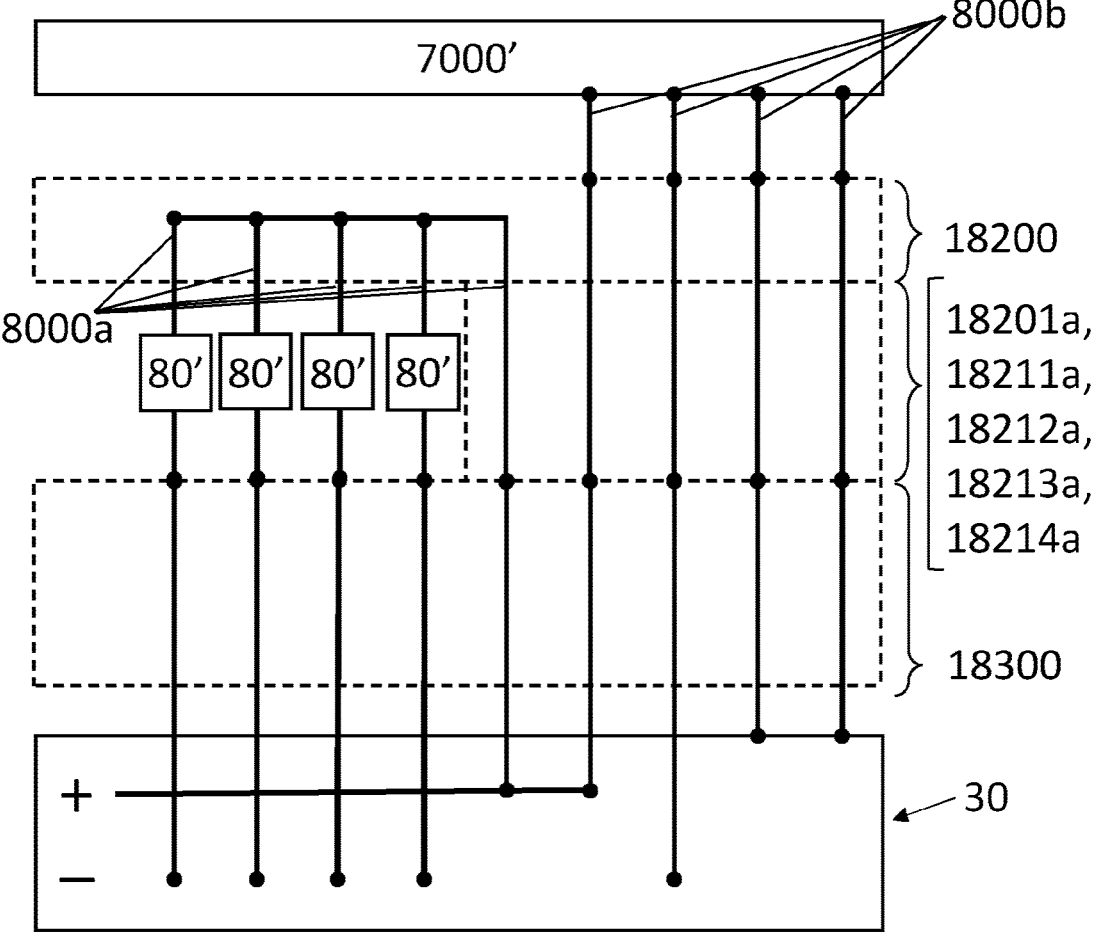

In other embodiments, the movable part 8001 may have a single-layer comprising both the moving crimps 8101*a*, 8101*b* and the connections to the flexures 8201*a*, 8211*a*-8214*a*. FIG. 47 shows a schematic circuit diagram of such an embodiment.

In the illustrated embodiment, four flexures 8201*a*, 8211*a*, 8213*a*, 8214*a* (hereinafter referred to as the 'outer flexures') extend in an arc around the optical axis O and substantially wrap around the outer perimeter of the flexible layer 8200, and one flexure 8212*a* (hereinafter referred to as the 'inner flexure') extends in an arc around the optical axis O and substantially wraps around the inner perimeter of the flexible layer 8200. However, other embodiments may have other arrangements. The inner flexure 8212*a* can be configured so as to provide a small amount of stiffness relative to the outer flexures 8201*a*, 8211*a*, 8213*a*, 8214*a* such that the diagonal stiffness ratio provided by the flexures 8201*a*, 8211*a*-8214*a* is mainly determined by the four outer flexures 8201*a*, 8211*a*, 8213*a*, 8214*a*. The outer flexures 8201*a*, 8211*a*, 8213*a*, 8214*a* may be arranged as described above in relation to the actuator assembly 1040 or 2040 (see FIGS. 18-20D, 23A-23C; FIGS. 21-22).

The movable part 8001 generally includes terminals 8000*c* (see FIG. 42) for connecting to the AF actuator assembly 7000'. The terminals 8000*c* may be provided on the crimp layer 8100. The terminals 8000*c* may take the form of solder pads, for example. The terminals 8000*c* may be provided on formed-up structures to facilitate the connections. The specific arrangement of the terminals 8000*c* may depend on the specific AF actuator assembly 7000' with which the actuator assembly 8000 is configured to be used.

Figures 38, 39:
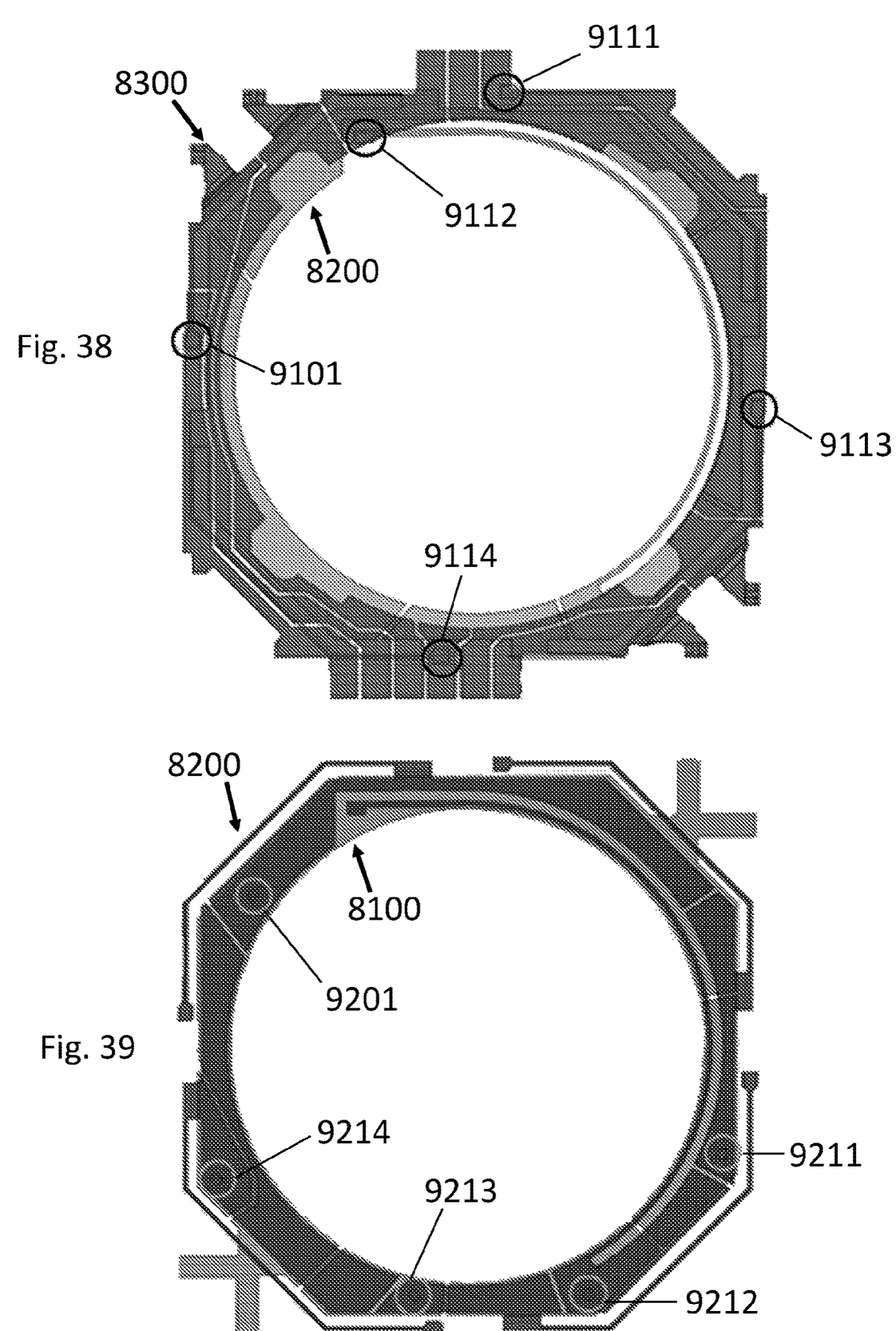
FIG. 38 is a top view of the component of FIG. 36 mounted on top of the component of FIG. 37.
FIG. 39 is a top view of the component of FIG. 35 mounted on top of the component of FIG. 36.

As illustrated in FIG. 38, each of the five segments 8201, 8211-8214 of the flexure layer 8200 is connected via a flexure 8201*a*, 8211*a*-8214*a* (and by a weld 9101, 9111-9114) to one of the segments 8301, 8311-8314 of the conductive component 8300.

As illustrated in FIG. 39, each of the five segments 8101, 8111-8114 of the crimp layer 8100 and the corresponding five segments 8201, 8211-8214 of the flexure layer 8200 are connected by connections (e.g. welds) 9201, 9211-9214.

Figure 40:
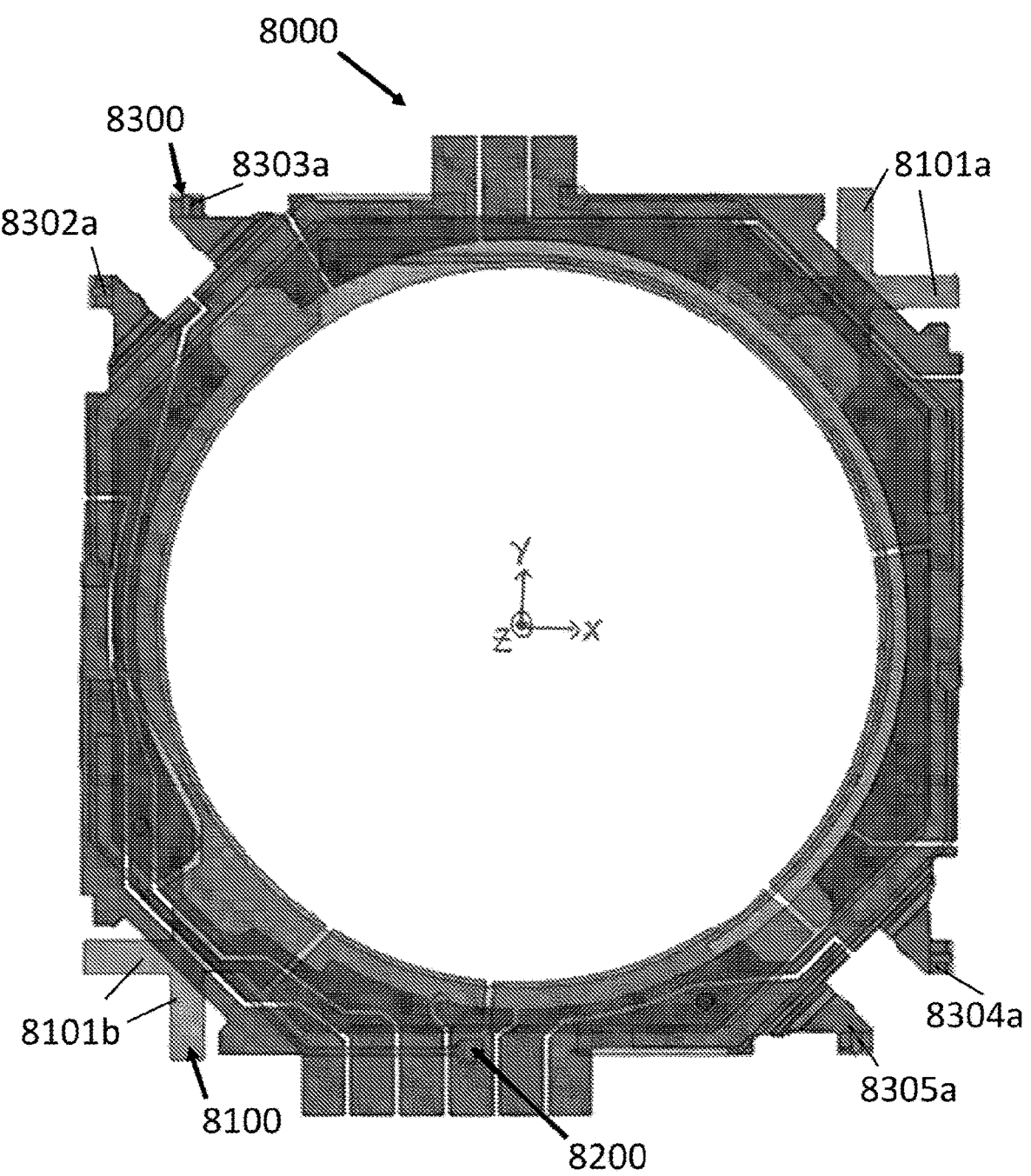
FIG. 40 is a top view of the components shown in FIGS. 35-37 mounted on top of each other.

Referring in particular to FIG. 40, the conductive component 8300, the flexure layer 8200 and the crimp layer 8100 are each provided with a central aperture aligned with the optical axis O (z axis) allowing the passage of light from the lens assembly 20 to the image sensor 6. The SMA wires (not shown in FIG. 40) can be perpendicular to the optical axis O or inclined at a small angle to the plane perpendicular to the optical axis O. These aspects are similar to the known actuator assembly 40.

In a similar way to the known actuator assembly 40, the SMA wires 80' are electrically connected within the actuator assembly 8000 such that, when the terminal of the common static segment 8301 and the terminals of the wire segments 8302-8305 are connected to the IC 30, current can flow to and from the IC 30 through the common static segment 8301, the common flexure 8201*a*, the common movable segment 8201/8101, the SMA wires 80' (not shown in FIG. 41), and the wire segments 8302-8305. This is illustrated by the solid lines in FIG. 41. More specifically, current from the IC 30 can flow through the common static segment 8301 and the common flexure 8201*a* 'up' to the common movable segment 8201/8101 (i.e. to one of the segments 8201 of the flexure layer 8200 and then to the corresponding segment 8101 of the crimp layer 8100), and can flow 'down' to the IC 30 through one or more of the four SMA wires 80' (not shown in FIG. 41) and corresponding wire segment(s) 8302-8305 of the static part 8300. This arrangement allows the IC 30 to drive the movement of the movable part 8001 with respect to the static part 8002 as described above with respect to actuator assembly 40.

Figure 41:
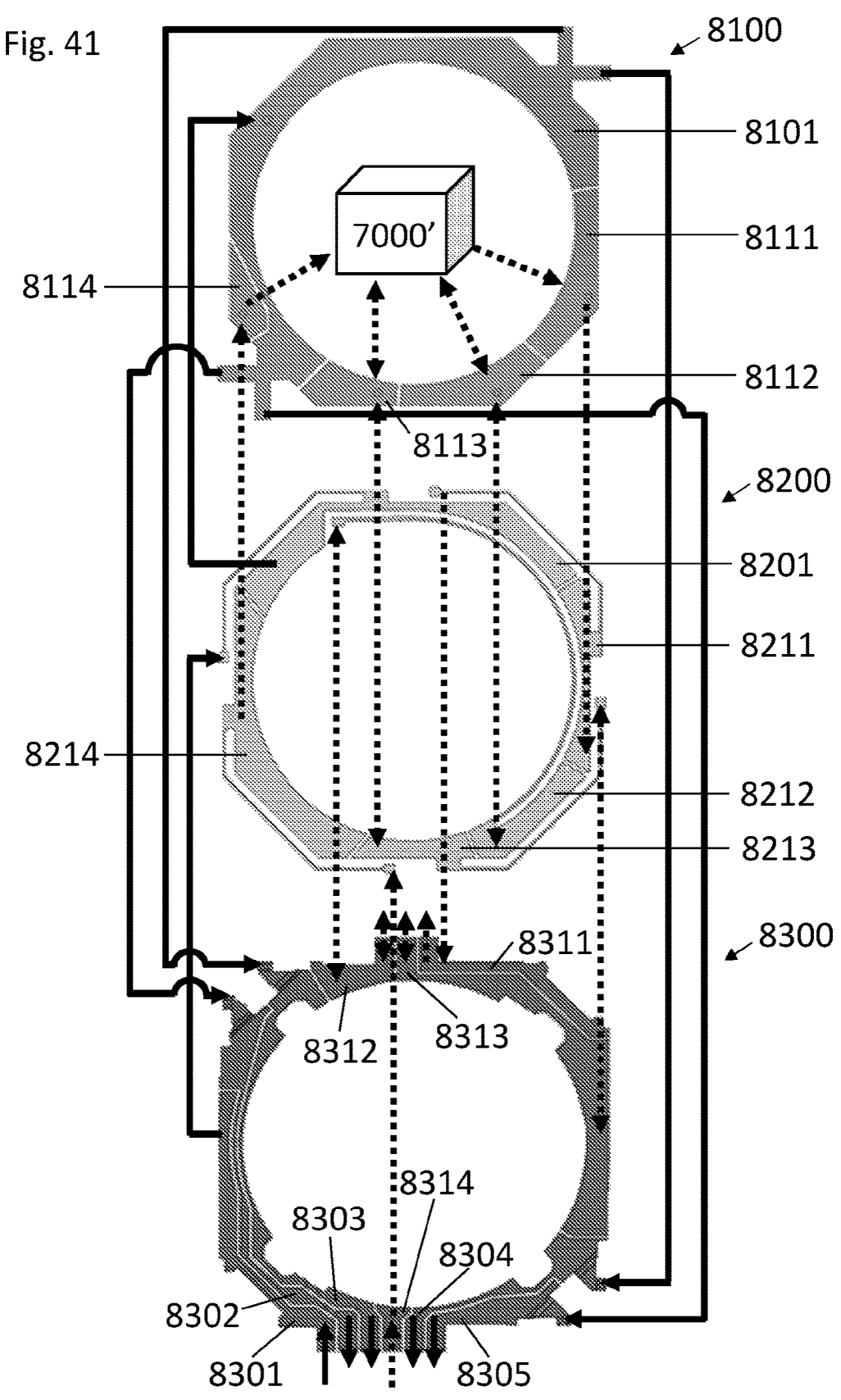
FIG. 41 is an exploded top view of the actuator assembly of FIGS. 35-37 showing current flow.

Furthermore, as illustrated by the dashed lines in FIG. 41, when the terminals of the static AF segments 8311, 8312, 8313, 8314 of the static part 8002 are connected to the IC 30 and the AF actuator 7000' is mounted on the movable part 8001 (i.e. the AF actuator 7000' is electrically connected to the terminals 8000*c*, etc.), current can flow between the IC 30 and the AF actuator 7000' via the actuator assembly 8000 through the four AF current paths 8000*b* provided by the four static AF segments 8311-8314, the four AF-connecting flexures 8211*a*-8214*a*, and the four movable AF segments 8111/8211, 8112/8212, 8113/8213, 8114/8214 (via the connections 9111-9114 between the static AF segments 8311-8314 and the AF-connecting flexures 8211*a*-8214*a* and via the connections 9211-9214 between the flexure layer 8200 and the crimp layer 8100 of the movable part 8001).

In this embodiment, the static AF segment 8314 and the movable AF segment 8114/8214 provide a power connection to the AF actuator 7000' via a first AF current path 8000*b*, the static AF segment 8311 and the movable AF segment 8111/8211 provide a ground connection to the AF actuator 7000' via a second AF current path 8000*b*, and the static AF segments 8312, 8313 and the movable AF segments 8112/8212, 8113/8213 provide two data connections to the AF actuator 7000' via respective third and fourth AF current paths 8000*b*. However, each of the connections to the AF actuator 7000' can be provided by any of the four AF current paths 8000*b*.

Figure 42:
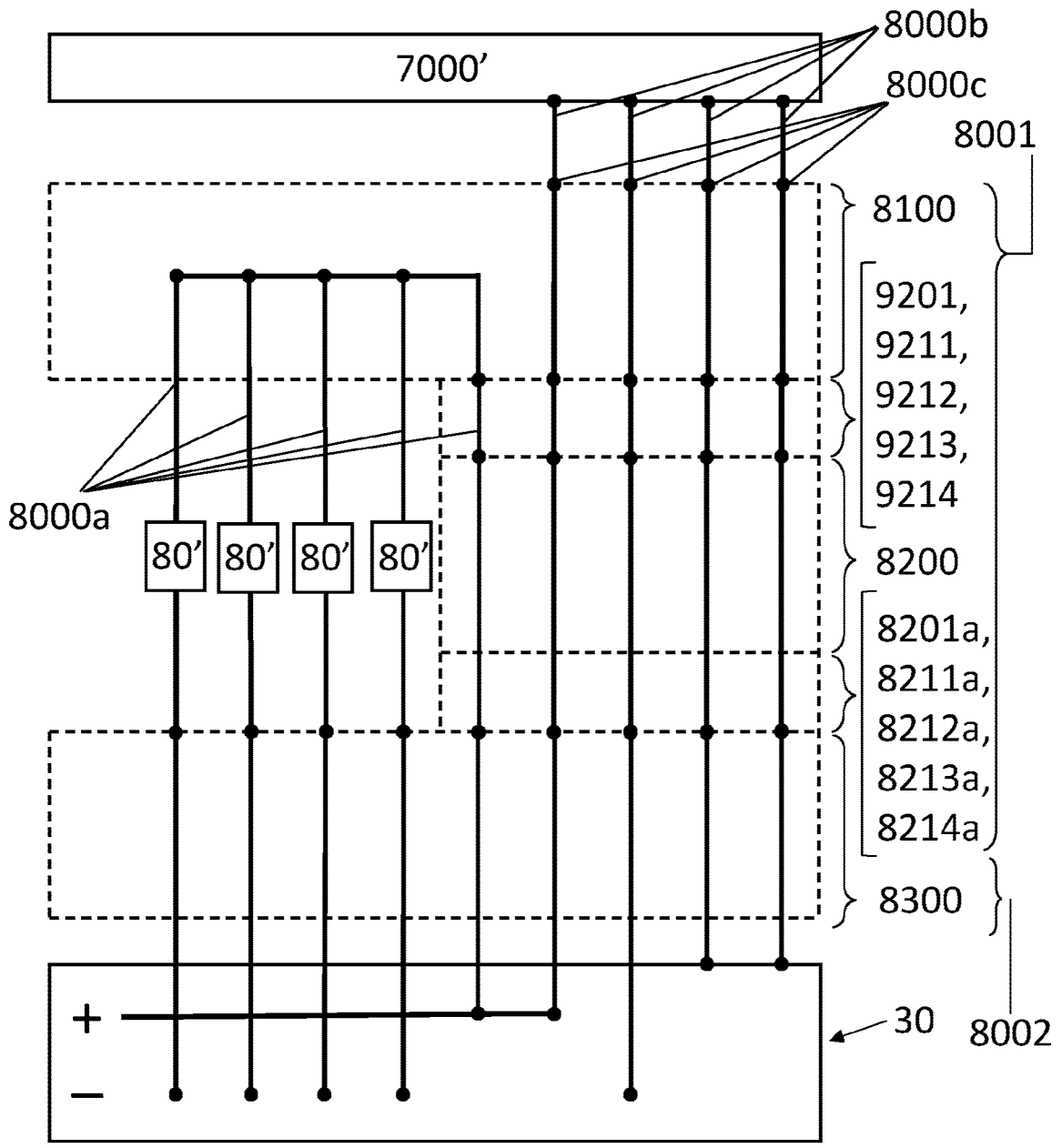
FIG. 42 is a schematic circuit diagram of the SMA actuator assembly of FIG. 41.

FIG. 42 shows a schematic circuit diagram of the actuator assembly 8000 when the AF actuator 7000' is mounted on the movable part 8001 of the actuator assembly 8000 (i.e. the AF actuator 7000' is electrically connected to the terminals 8000c, etc.). As described above, the static part 8002, the flexures (specifically the AF-connecting flexures 8211a-8214a), and the movable part 8001 (specifically the flexure layer 8200 and the crimp layer 8100) include four AF current paths 8000b within the actuator assembly 8000 for connecting the IC 30 and the AF actuator assembly 7000'. Also, as described above, the static part 8002, the flexures (specifically the common flexure 8201a), and the movable part 8001 (specifically the flexure layer 8200 and the crimp layer 8100) include four OIS current paths 8000a for driving/controlling the SMA wires 80'.

Alternative Embodiments

In the actuator assembly 8000 described above, all four AF current paths 8000b are provided via the actuator assembly 8000. However, one or more of the current paths to the AF actuator assembly 7000' can be provided in a different way, e.g. via an FPC. Hence the number of segments of the conductive component 8300, the number of segments of the movable part 8001, the number of AF-connecting flexures, and the number of connections therebetween would change (reduce) accordingly.

Figure 43:
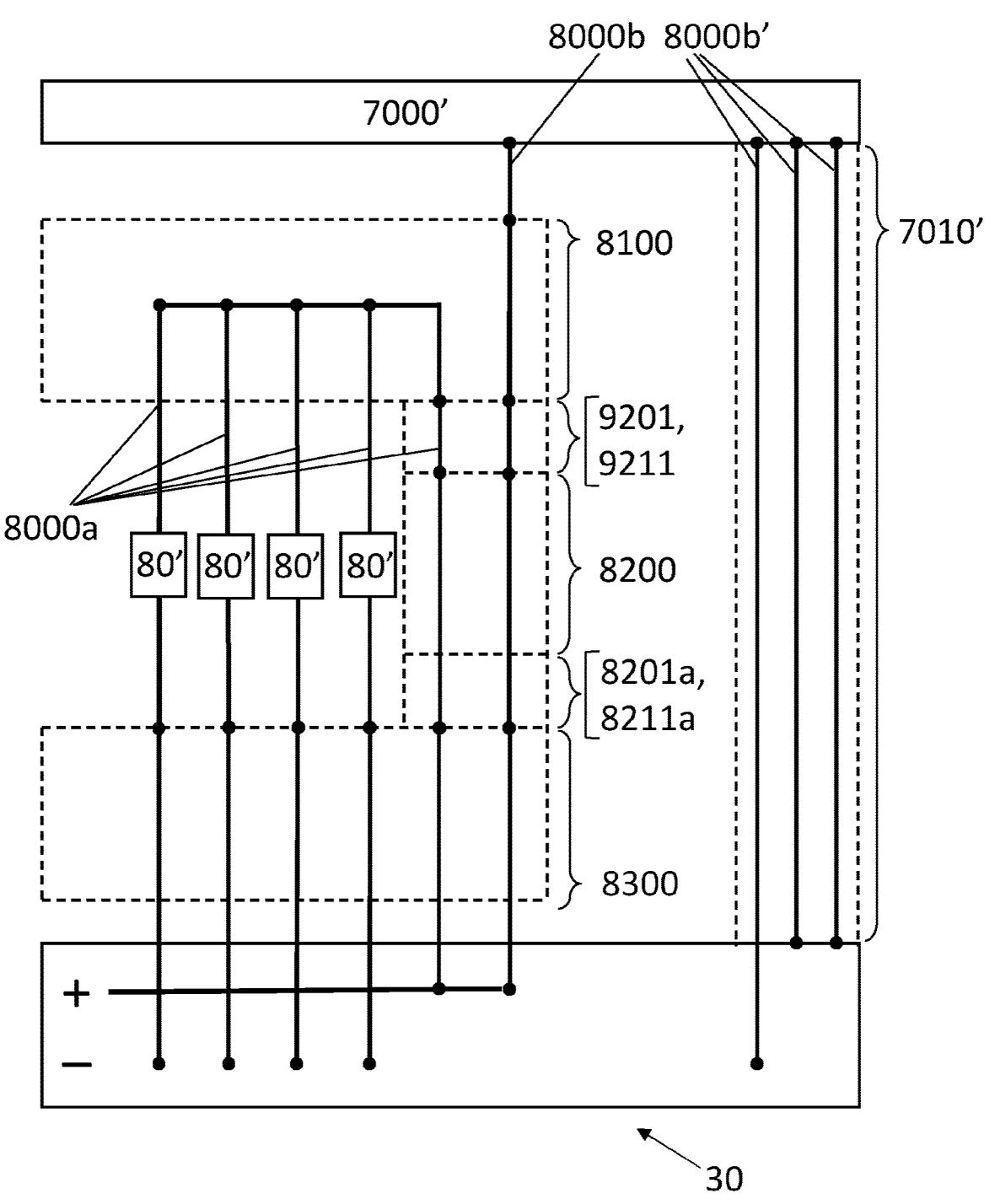
FIG. 43-47 are schematic circuit diagram of other SMA actuator assemblies.

For example, as illustrated in FIG. 43, only one AF current path 8000b may be provided and/or used to connect the IC 30 and the AF actuator assembly 7000' via the actuator assembly 8000. In this example, the remaining current paths are provided by an FPC 7010'. Hence, the conductive component 8300 would only need to be divided into six segments (five for the OIS current paths 8000a and one for the AF current path 8000b), the movable part 8001 would only need to be divided into two segments (one for the OIS current paths 8000a and one for the AF current path 8000b), and the flexures would only need to provide two current paths (one for the OIS current paths 8000a and one for the AF current path 8000b), e.g. there would only need to be two flexures.

Alternatively, only, two, or three AF current paths 8000b can be provided and/or used to connect the IC 30 and the AF actuator assembly 7000' via the actuator assembly 8000. Again, in such examples, the remaining current path(s) can be provided by an FPC. In a configuration with only two AF current paths, the conductive component 8300 would only need to be divided into seven segments, the movable part 8001 would only need to be divided into three segments, and e.g. only three flexures would be needed. In a configuration with only three AF current paths, the conductive component 8300 would only need to be divided into eight segments, the movable part 8001 would only need to be divided into four segments, and e.g. only four flexures would be needed.

In the embodiments described above, the four AF current paths 8000b are separate from the OIS current paths 8000a. However, one of the AF current paths 8000b and one of the OIS current paths 8000a can be shared.

Figure 44:
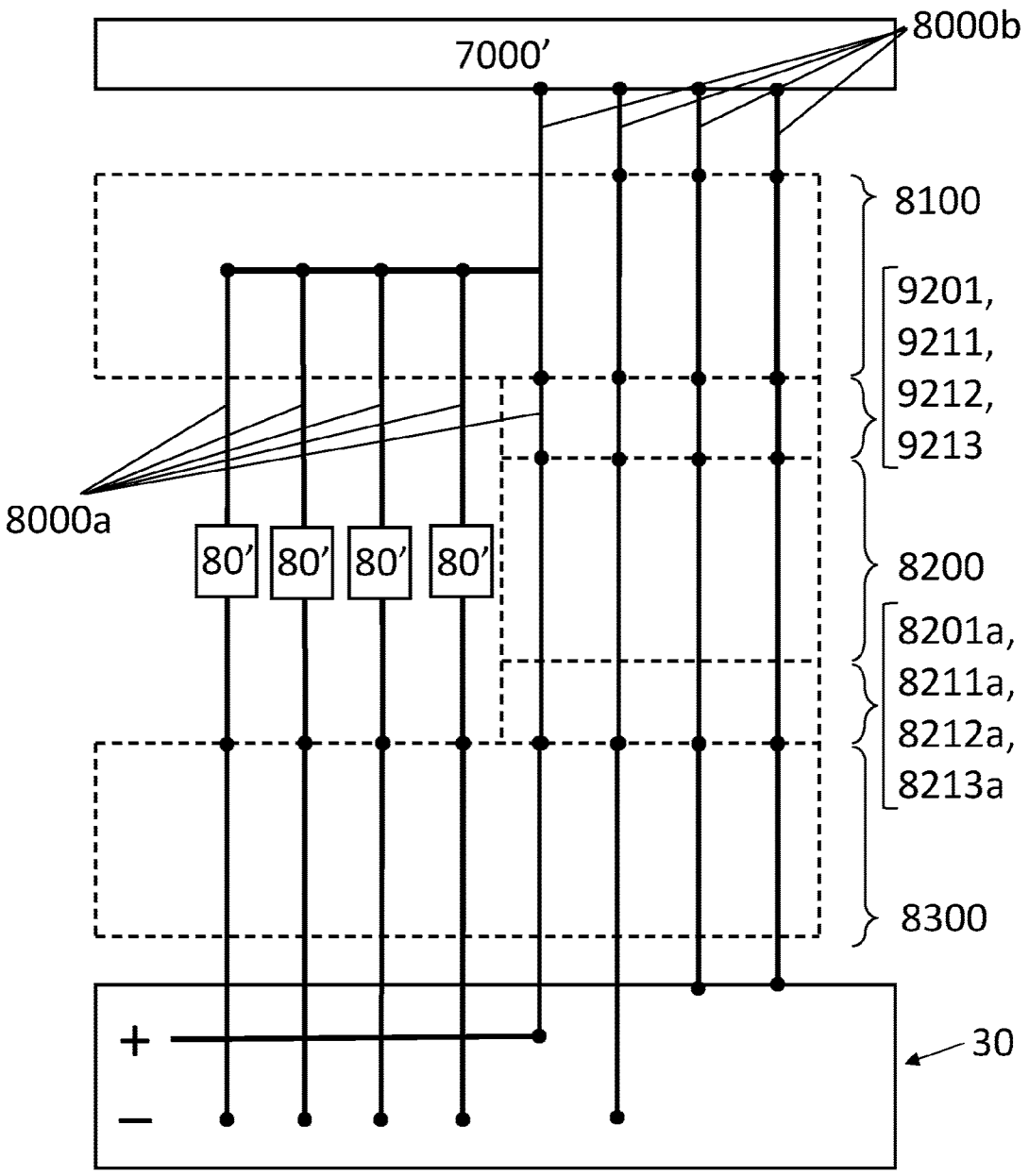

For example, as illustrated in FIG. 44, the OIS current path 8000a (hereinafter referred to as the 'common current path') provided by the common static segment 8301, the common flexure 8201a, and the common movable segment 8201/8101 can be configured to also connect to the AF actuator assembly 7000'. In other words, the common current path can also provide an AF current path 8000b (e.g. providing the power connection to the AF actuator assembly 7000'). In this example, the conductive component 8300 would only need to be divided into eight segments, the movable part 8001 would only need to be divided into four segments, and the flexures would only need to provide four current paths (e.g. only four flexures would be needed, wherein each flexure provides a separate current path).

The above embodiments of actuator assembly 8000 describe that four AF current paths are required for the AF actuator assembly 7000'. However, the actuator assembly 8000 can be electrically connected to an AF actuator requiring less than four connections to the IC 30 or more than four connections to the IC 30. Hence the number of segments of the movable part 8001, the number of flexures, and the number of connections required to be provided in the actuator assembly 8000 would change accordingly.

Figure 45:
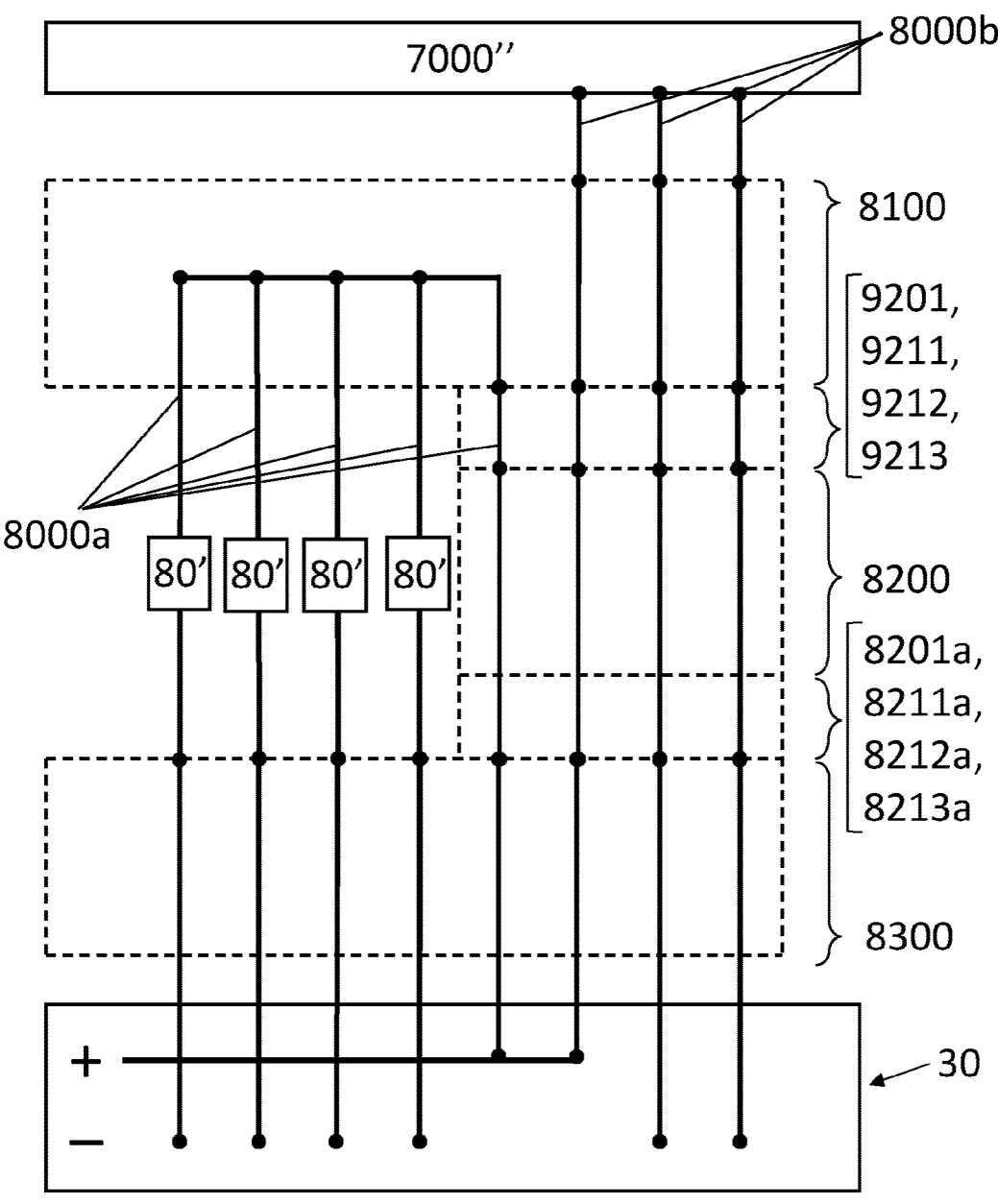

For example, as shown in FIG. 45, the actuator assembly 8000 can be electrically connected to an AF actuator assembly 7000'' only requiring three AF current paths connecting the IC 30 and the AF actuator assembly 7000'' (e.g. an SMA auto-focus actuator comprising two SMA wires). In which case, the conductive component 8300 would only need to be divided into eight segments, each providing a separate current path; the movable part 8001 would only need to be divided into four segments, of which three segments would be for the three AF current paths; and the flexures would only need to provide four current paths (i.e. only four flexures would be needed, wherein each flexure provides a separate current path).

Figure 46:
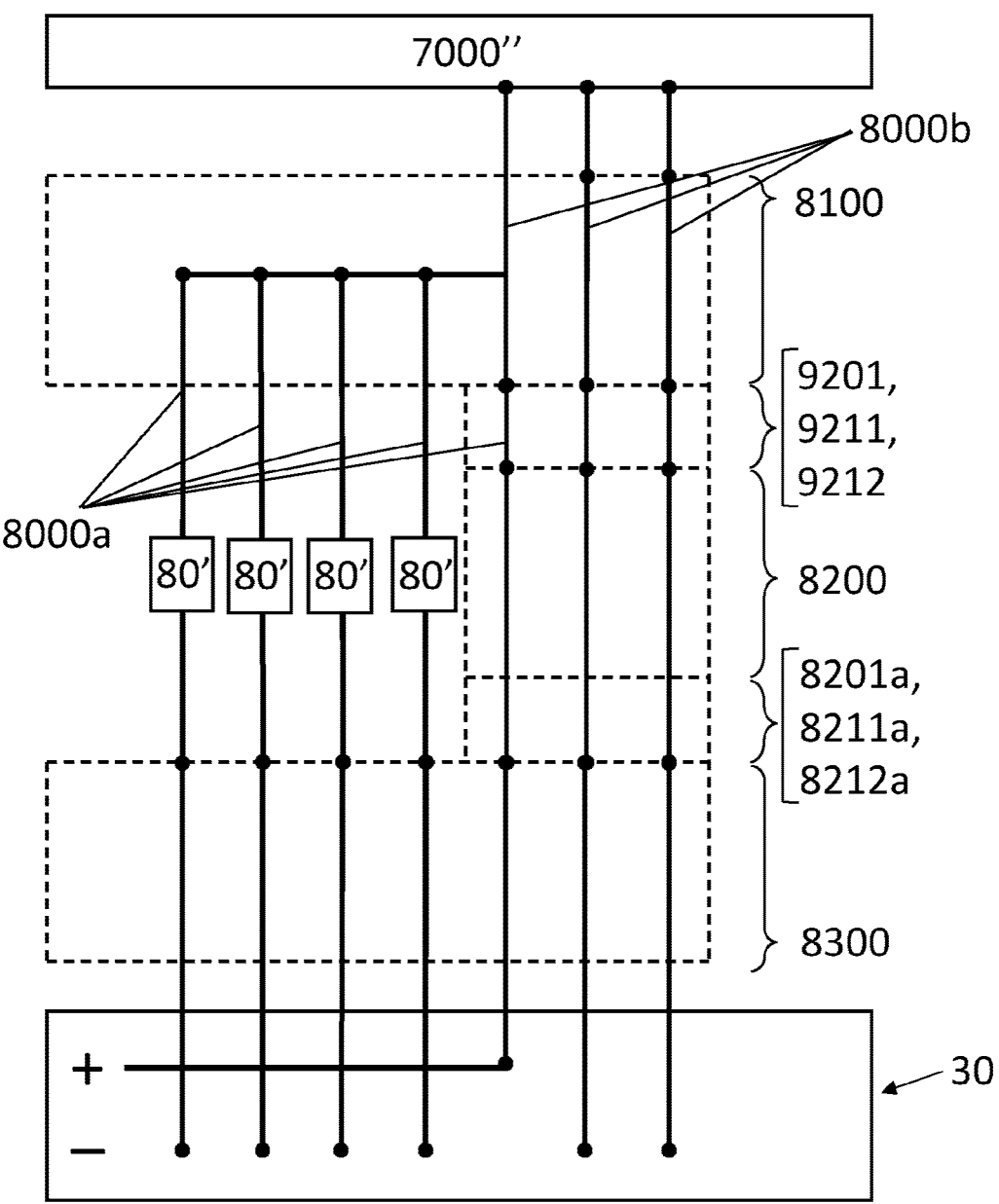

Alternatively, as shown in FIG. 46, the actuator assembly 8000 can be electrically connected to the AF actuator assembly 7000'' and the AF current path providing the power connection to the AF actuator 7000' and the current path providing the power connection to the SMA wires 80' can be shared. In which case, the conductive component 8300 would only need to be divided into seven segments, each providing a separate current path; the movable part 8001 would only need to be divided into three segments, of which all three segments would be for the three AF current paths; and the flexures would only need to provide three current paths (i.e. only three flexures would be needed, wherein each flexure provides a separate current path).

Where there are three flexures, these may be arranged as described above in relation to flexure plate 3060 (see FIG. 26). Where there are four flexures, these may be arranged as described above in relation to the actuator assembly 1040 or 2040 (see FIGS. 18-20D, 23A-23C; FIGS. 21-22).

Other Variations

It will be appreciated that there may be many other variations of the above-described embodiments.

For example, the crimp layer 8100 may be an upper layer and the flexure layer 8200 may be a lower layer of the movable part 8001.

The actuator assemblies described above with reference to FIGS. 35 to 47 are only described as configured to be connectable to an AF actuator. However, as the person skilled in the art would appreciate, these actuator assemblies can instead be configured to be connectable to any other device with electronic connections.

The OIS current paths 8000a and the AF current paths 8000b in the actuator assemblies 8000 described above are described as being provided by having the conductive component 8300 and the movable part 8001 divided into a number of electrically conductive segments, and having the segments of the conductive component 8300 and respective segments of the movable part 8001 electrically connected via electrically conductive flexures 8211a-8214a (wherein each of the segments of the conductive component 8300 are electrically isolated from each other within the conductive component 8300, each of the segments of the movable part 8001 are electrically isolated from each other within the movable part 8001, and each flexure 8211a-8214a provides one current path). However, the OIS current paths 8000*a* and the AF current paths 8000*b* can instead be provided by electrically conductive tracks running on (or through, or in) the conductive component 8300, the movable part 8001 and at least one of the flexures 8211*a*-8214*a*, wherein the conductive tracks are electrically isolated from each other within the parts of the actuator assembly 8000 they sit on. Alternatively, the OIS current paths 8000*a* and the AF current paths 8000*b* can be provided by a combination of both (i.e. provided by electrically conductive tracks, electrically conductive segments of the conductive component 8300, electrically conductive segments of the movable part 8001, and electrically conductive flexures 8211*a*-82114*a*).

The invention claimed is:

1. An actuator assembly comprising:

a first part and a second part, wherein a first axis is defined with reference to the second part;

a shape memory alloy (SMA) wire connected to the first and second parts, the SMA wire for moving the first part relative to the second part in any of a set of directions that are at least partly perpendicular to the first axis, wherein the set of directions includes first and second directions;

a set of arms, each of which is connected to the first and second parts and extends partly around the first axis, the set of arms configured to provide a biasing force that biases the first part towards a first position relative to the second part;

wherein the set of arms has a first stiffness when the first part is moved away from the first position in the first direction and a second, lower stiffness when the first part is moved away from the first position in the second direction;

wherein at least one of the set of arms comprises a portion that is configured to decrease the first stiffness by a larger amount relative to the amount that the portion decreases the second lower stiffness; and wherein the portion extends in a direction that is at least partly perpendicular to the first direction and at least partly parallel to the second direction, wherein the portion corresponds to at least one hairpin-shaped portion of the set of arms, wherein the hairpin-shaped portion comprises at least one pair of arm segments that extend alongside and generally parallel to each other and are connected to each other at one of the ends of the at least one pair of arm segments by a 180 degree turn.

2. The actuator assembly according to claim 1, wherein the portion comprises at least one pair of arm segments that generally extend parallel, or at an acute angle, to each other and are connected to each other at one of the ends of the at least one pair of arm segments; and:

wherein the at least one pair of arms segments extend alongside each other; and/or wherein each of the at least one pair of arm segments comprises at least one hairpin-shaped portion; and/or wherein a separation between the at least one pair of arm segments is increased in a region near the one of the ends.

3. The actuator assembly according to claim 1, wherein the portion comprises a length of arm that meanders within an envelope that extends away from or towards the first axis; and/or comprising a damping substance connecting the portion to the second part or to another part of the actuator assembly that is fixed relative to the second part.

4. The actuator assembly according to claim 1, wherein each arm is limited to the inside or outside of a space around the first axis, wherein the boundary of the space has at least one recess into which the portion extends; and:

wherein the boundary is at least partly defined by a footprint of the actuator assembly and/or one or more features of the actuator assembly; and/or wherein the recess corresponds to a gap between two connectors each of which connects a length of SMA wire to the first part or the second part, and:

the actuator assembly comprises four lengths of SMA wire, each of which is connected to a first connector on the first part and a second connector on the second part, wherein the first connectors are grouped in pairs and the second connectors are grouped in pairs, with the four pairs being substantially equally angularly spaced around the first axis and alternating between pairs of first connectors and pairs of second connectors, and wherein the boundary has two recesses each of which corresponds to a gap between a pair of first connectors or a pair of second connectors.

5. The actuator assembly according to claim 1, comprising two arms having substantially two-fold rotational symmetry about the first axis.

6. The actuator assembly according to claim 1, wherein the first direction is parallel with a first plane through the first axis, the second direction is parallel with a second plane through the first axis, and wherein the first and second planes are substantially perpendicular to each other; and:

wherein the portion is elongated in a direction that is substantially parallel to the second plane.

7. The actuator assembly according to claim 1, wherein the ratio of the first stiffness to the second, lower stiffness is less than 3:1.

8. The actuator assembly according to claim 1, wherein the at least one hairpin-shaped portion of the set of arms comprises a kinked arm.

* * * * *